(12) United States Patent
Okuno et al.

(10) Patent No.: US 11,074,103 B2
(45) Date of Patent: Jul. 27, 2021

(54) SCHEDULING METHOD AND SCHEDULING DEVICE

(71) Applicant: FUJITSU LIMITED, Kawasaki (JP)

(72) Inventors: Shingo Okuno, Kawasaki (JP);
Yukihiro Watanabe, Kawasaki (JP);
Fumi Iikura, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 16/665,078

(22) Filed: Oct. 28, 2019

(65) Prior Publication Data
US 2020/0142732 A1 May 7, 2020

(30) Foreign Application Priority Data
Nov. 1, 2018 (JP) .............................. JP2018-206810

(51) Int. Cl.
*G06F 9/48* (2006.01)
*G06F 9/455* (2018.01)
*G06F 9/50* (2006.01)

(52) U.S. Cl.
CPC ........ *G06F 9/4856* (2013.01); *G06F 9/45558* (2013.01); *G06F 9/5038* (2013.01); *G06F 9/5044* (2013.01); *G06F 2009/4557* (2013.01)

(58) Field of Classification Search
CPC .................................................. G06F 9/4856
See application file for complete search history.

(56) References Cited

U.S. PATENT DOCUMENTS

| | | | | |
|---|---|---|---|---|
| 5,640,194 A | * | 6/1997 | Suzuki ............... | H04N 7/17336 348/E7.073 |
| 2012/0136967 A1 | * | 5/2012 | Ito .......................... | H04L 47/10 709/217 |
| 2013/0346973 A1 | | 12/2013 | Oda et al. | |

FOREIGN PATENT DOCUMENTS

| | | |
|---|---|---|
| JP | 2013-182303 | 9/2013 |
| JP | 2014-006739 | 1/2014 |
| JP | 2015-161956 | 9/2015 |

OTHER PUBLICATIONS

D.S. Johnson, "Near-Optimal Bin Packing Algorithms", Ph.D. Thesis, Massachusetts Institute of Technology, Jun. 1973.
(Continued)

*Primary Examiner* — Charlie Sun
(74) *Attorney, Agent, or Firm* — Fujitsu Patent Center

(57) ABSTRACT

The scheduling device divides the execution duration into a plurality of unit periods. The scheduling device then allocates each of the plurality of physical machines to a physical machine group that may execute, while satisfying the constraint conditions, migration of the virtual machine operating on the allocated physical machine and maintenance work on the allocated physical machine within one or more unit periods of the plurality of unit periods. Thereafter, for each of the plurality of physical machine groups, the scheduling device creates individual schedule information indicating a work execution duration of migration of the virtual machine operating on the allocated physical machine and that of maintenance work on the allocated physical machine within one or more unit periods of the plurality of unit periods, and outputs overall schedule information obtained by integrating the individual schedule information on each of the plurality of physical machine groups.

18 Claims, 42 Drawing Sheets

(56) References Cited

OTHER PUBLICATIONS

A. Caprara et al., "Lower Bounds and Algorithms for the 2-Dimensional Vector Packing Problem", Discrete Applied Mathematics, vol. 111, No. 3, pp. 231-262, Aug. 1, 2001.
G. Brewka et al., "Answer set programming at a glance", Communications of the ACM, vol. 54, No. 12, pp. 92-103, 2011.

* cited by examiner

FIG. 21

| START DATE AND TIME | END DATE AND TIME | DIVISION UNIT OF TIME GROUP | LM START TIME | LM END TIME | MAINTENANCE START TIME | MAINTENANCE END TIME |
|---|---|---|---|---|---|---|
| 2018-06-16T00:00:00.000Z | 2018-06-30T23:59:00.000Z | 1 DAY (24 HOURS) | 09:00:00.000Z | 11:59:00.000Z | 12:00:00.000Z | 17:59:00.000Z |

MAINTENANCE EXECUTION DURATION INFORMATION M1

FIG. 22

| MAINTENANCE TARGET MACHINE INFORMATION | | M2 |
|---|---|---|
| PHYSICAL MACHINE NAME | MAINTENANCE TURNAROUND TIME | |
| PM01 | 02:00:00.000 | |
| PM02 | 02:00:00.000 | |
| PM03 | 02:00:00.000 | |
| ... | ... | |

FIG. 23

| PHYSICAL MACHINE CONFIGURATION TABLE | | | | 121 |
|---|---|---|---|---|
| PHYSICAL MACHINE NAME | NUMBER OF CPU CORES | MEMORY CAPACITY | DISK CAPACITY | |
| PM01 | 64 | 256 GB | 32 TB | |
| PM02 | 32 | 128 GB | 128 TB | |
| ... | ... | ... | ... | |

FIG. 24

| VIRTUAL MACHINE CONFIGURATION TABLE | | | | | |
|---|---|---|---|---|---|
| VIRTUAL MACHINE NAME | USER ID | NUMBER OF CPU CORES | MEMORY CAPACITY | DISK CAPACITY | LM TURNAROUND TIME |
| accounting-db-13 | user1 | 2 | 32 GB | 2 TB | 16 MINUTES |
| vm-67 | user2 | 2 | 2 GB | 32 TB | 1 MINUTE |
| server-90 | user3 | 8 | 8 GB | 64 TB | 4 MINUTES |
| mysql-67 | user3 | 4 | 4 GB | 128 TB | 2 MINUTES |
| accounting-db-03 | user1 | 2 | 16 GB | 2 TB | 8 MINUTES |
| accounting-web-03 | user1 | 4 | 16 GB | 256 TB | 8 MINUTES |
| ... | ... | ... | ... | ... | ... |

FIG. 25

VIRTUAL MACHINE OPERATION TABLE 123

| PHYSICAL MACHINE NAME | VIRTUAL MACHINE NAME | USER ID |
|---|---|---|
| PM01 | accounting-db-13 | user1 |
| | vm-67 | user2 |
| PM02 | server-90 | user3 |
| | mysql-67 | user3 |
| | accounting-db-03 | user1 |
| | accounting-web-03 | user1 |
| PM03 | web-253 | user1 |
| ... | ... | ... |

FIG. 26

DEPENDENCY RELATION TABLE 124

| GROUP NAME | VIRTUAL MACHINE NAME | RULE |
|---|---|---|
| G01 | accounting-db-13 | anti-affinity |
| | accounting-db-03 | |
| ... | ... | ... |

| LM TURNAROUND TIME TABLE | |
|---|---|
| VIRTUAL MACHINE NAME | LM TURNAROUND TIME |
| ... | ... |
| ... | ... |
| server-90 | 00:04:00.000 |
| mysql-67 | 00:02:00.000 |
| accounting-db-03 | 00:08:00.000 |
| accounting-web-03 | 00:08:00.000 |
| ... | ... |

FIG. 29

| LM EXECUTION AVOIDANCE DATE AND TIME INFORMATION | | | M3 |
|---|---|---|
| VIRTUAL MACHINE NAME | START DATE AND TIME | END DATE AND TIME |
| ... | ... | ... |
| mysql-67 | 2018-06-20T11:50:00.000Z | 2018-06-20T17:59:00.000Z |
| ... | ... | ... |

FIG. 30

| TIME GROUP INFORMATION | | | M4 |
|---|---|---|
| GROUP NUMBER | START TIME | END TIME |
| 0 | 2018-06-16T00:00:00.000Z | 2018-06-16T23:59:00.000Z |
| 1 | 2018-06-17T00:00:00.000Z | 2018-06-17T23:59:00.000Z |
| ... | ... | ... |

FIG. 33

LM SCHEDULE TABLE 192

| VIRTUAL MACHINE NAME | START DATE AND TIME | END DATE AND TIME | MIGRATION SOURCE | MIGRATION DESTINATION |
|---|---|---|---|---|
| ... | ... | ... | ... | ... |
| server-90 | 2018-06-20T11:06:00.000Z | 2018-06-20T11:09:00.000Z | PM02 | PM01 |
| mysql-67 | 2018-06-20T11:10:00.000Z | 2018-06-20T11:11:00.000Z | PM02 | PM01 |
| accounting-db-03 | 2018-06-20T11:08:00.000Z | 2018-06-20T11:15:00.000Z | PM02 | PM01 |
| accounting-web-03 | 2018-06-20T11:16:00.000Z | 2018-06-20T11:22:00.000Z | PM02 | PM01 |
| ... | ... | ... | ... | ... |

PRESENT TO USER (columns: VIRTUAL MACHINE NAME, START DATE AND TIME, END DATE AND TIME)

PRESENT TO OPERATOR (all columns)

SCHEDULING METHOD AND SCHEDULING DEVICE

CROSS-REFERENCE TO RELATED APPLICATION

This application is based upon and claims the benefit of priority of the prior Japanese Patent Application No. 2018-206810, filed on Nov. 1, 2018, the entire contents of which are incorporated herein by reference.

FIELD

The embodiments discussed herein are related to a scheduling method and a scheduling device.

BACKGROUND

In virtualization technology used in the field of information processing, a plurality of virtual computers (also referred to as virtual machines or virtual hosts) operate on a physical computer (also referred to as a physical machine or a physical host). Software such as an operating system (OS) is executed on each virtual machine. A physical machine using the virtualization technology executes software for managing a plurality of virtual machines. For example, software called hypervisor allocates the processing capacity of a central processing unit (CPU) and a storage region of a random-access memory (RAM) as computation resources to the plurality of virtual machines.

In some systems including a plurality of physical machines, it is possible to change physical machines on which a virtual machine is executed. For example, such a system uses a technology of enabling migration of data related to the virtual machine between hypervisors after or without halting the virtual machine. The process of moving the virtual machine in this way is called migration. The virtual machine migration is executed, for example, during maintenance of the physical machine. That is, since the operation of the physical machine under maintenance is suspended, the operator migrates the virtual machine executed on the physical machine as the maintenance target to another physical machine, and then performs maintenance work on the physical machine.

For migration of a virtual machine executed on a physical machine, there are various constraint conditions on migration time and migration destination. For example, since performance degradation of a virtual machine occurs during migration, the migration period of the virtual machine should be limited to a period during which the load on the virtual machine is low. In addition, the physical machine to which the virtual machine is migrated is limited to a physical machine that may allocate sufficient resources to the migration target virtual machine. The system operator generates a maintenance schedule for all physical machines so as to satisfy various constraint conditions related to the migration of virtual machines.

Maintenance scheduling may also be performed by a computer. For example, the system operator inputs information such as the system configuration, the operation status of the virtual machine, and the time required for maintenance of one physical machine to a scheduler for maintenance scheduling. The scheduler outputs a maintenance schedule that satisfies the constraint conditions.

As a technique related to virtual machine migration, for example, there has been proposed a virtual machine migration control method that suppresses the future instability of a physical server predicted to have insufficient resource usage.

There has also been proposed a maintenance management device that requests a scheduled migration date of a virtual host inputted by a user to be corrected again if the scheduled migration date is later than a scheduled maintenance date, and reserves migration of the virtual host to a destination server device on the scheduled migration date.

Related techniques are disclosed in, for example, Japanese Laid-open Patent Publication Nos. 2014-006739 and 2015-161956.

SUMMARY

According to an aspect of the embodiments, a computer-readable recording medium having stored therein a program that, when executed by a processor, causes the processor to be configured to: upon acquisition of a maintenance execution duration for a plurality of physical machines, divide the execution duration into a plurality of time periods; select each of the plurality of physical machines as an allocation target physical machine to be allocated to any of a plurality of physical machine groups; allocate the selected allocation target physical machine based on configuration information and time information, the configuration information being related to the plurality of physical machines and a plurality of virtual machines operating on the plurality of physical machines, the time information indicating a migration turnaround time required to migrate each of the plurality of virtual machines to different physical machines, and a maintenance turnaround time required for maintenance work of each of the plurality of physical machines, and then allocating the allocation target physical machine to a physical machine group in which migrating a virtual machine operating on the allocated physical machine and performing maintenance work on the allocated physical machine are to be performed when a predetermined constraint condition is satisfied within one or more time periods of the plurality of time periods; create individual schedule information indicating a work execution duration satisfying the constraint condition for the migration of the virtual machine operating on the allocated physical machine and the maintenance work of the allocated physical machine for each of the plurality of physical machine groups, based on the configuration information and the time information; and output overall schedule information that integrates the individual schedule information created for each of the plurality of physical machine groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is a diagram illustrating exemplary maintenance execution duration information;

FIG. 22 is a diagram illustrating exemplary maintenance target machine information;

FIG. 23 is a diagram illustrating an exemplary physical machine configuration table;

FIG. 24 is a diagram illustrating an exemplary virtual machine configuration table;

FIG. 25 is a diagram illustrating an exemplary virtual machine operation table;

FIG. 26 is a diagram illustrating an exemplary dependency relation table;

FIG. 29 is a diagram illustrating exemplary LM execution avoidance date and time information;

FIG. 30 is a diagram illustrating exemplary time group information;

FIG. 33 is a diagram illustrating an exemplary LM schedule table;

DESCRIPTION OF EMBODIMENTS

For example, an execution framework (infrastructure) of a cloud computing system includes a large number of physical machines, and a plurality of virtual machines are executed on each physical machine. Therefore, in order to perform maintenance scheduling of a physical machine, a very complicated and large-scale problem is solved by a computer. Such a large-scale problem is difficult to solve by related techniques from the viewpoint of calculation time and memory usage.

The present embodiments will be described below with reference to the accompanying drawings. Note that each embodiment may be implemented by combining a plurality of embodiments without any inconsistency.

First Embodiment

Figure 1:
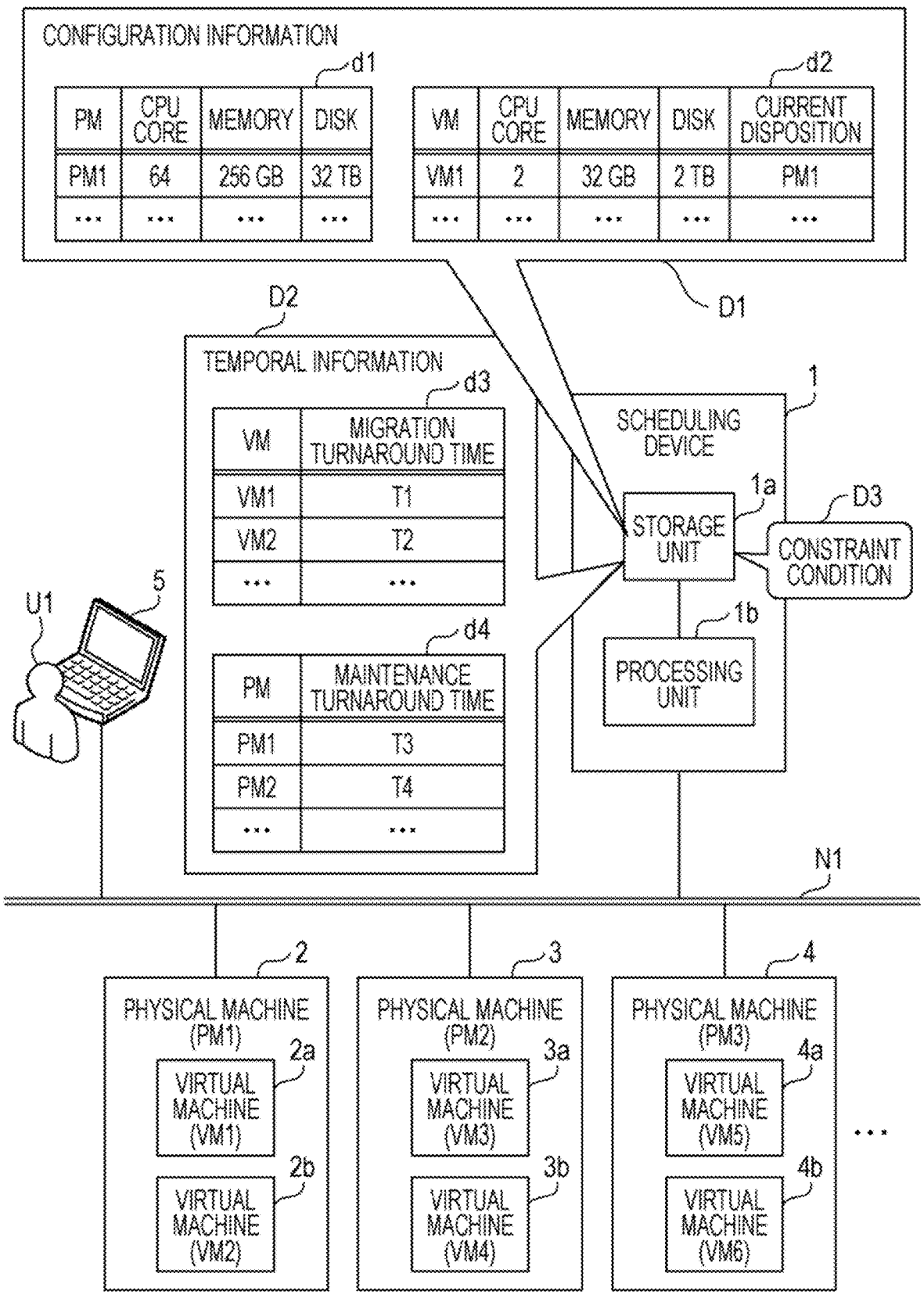
FIG. 1 is a diagram illustrating an information processing system according to a first embodiment.

FIG. 1 is a diagram illustrating an information processing system according to a first embodiment. The information processing system according to the first embodiment includes a scheduling device 1 and physical machines 2, 3, 4, . . . . The scheduling device 1 and the physical machines 2, 3, 4, . . . are connected to a network N1. The scheduling device 1 creates a migration schedule of virtual machines on the physical machines 2, 3, 4, . . . and a maintenance work schedule for the physical machines 2, 3, 4, . . . . The physical machines 2, 3, 4, . . . each include computation resources such as a CPU and a memory, and manage virtual machines by using the computation resources. For example, the physical machines 2, 3, 4, . . . each run a hypervisor to allocate the computation resources to the virtual machines through the function of the hypervisor. Each physical machine is also abbreviated as a PM. Each virtual machine is also abbreviated as a VM.

The network N1 is also connected with a terminal device 5. The terminal device 5 is a client used by an operator U1 who operates and manages the system. The terminal device 5 may be connected with the network N1 via another network such as the Internet.

The physical machines 2, 3, 4, . . . each have a function to migrate a virtual machine operating on the physical machine to another physical machine. For example, the physical machines 2, 3, 4, . . . each execute the virtual machine migration by using a technology called live migration. The live migration moves a virtual machine while maintaining an activation state of the virtual machine by copying information of the CPU and memory resources of a physical machine as a migration source, which is allocated to the virtual machine to be migrated, to a physical machine as a migration destination. The virtual machine may be migrated by using an alternative technology of cold migration in which the virtual machine is stopped and then the corresponding information of the virtual machine is copied to the physical machine as a migration destination.

In a system operation, maintenance such as security patch application and OS upgrade is executed on a physical machine as an infrastructure for managing a virtual machine. In maintenance of a physical machine, the physical machine often has to be stopped. When the physical machine is stopped, any virtual machine on the physical machine is stopped and may not be used.

To avoid this, that is, to reduce the impact on virtual machines caused by the maintenance, any virtual machine on the physical machine as a maintenance target is migrated to another physical machine before the maintenance of the physical machine. To achieve this, the scheduling device 1 supports the virtual machine migration and generation of maintenance work schedule. The scheduling device 1 includes a storage unit 1a and a processing unit 1b.

The storage unit 1a may be a volatile storage device such as a RAM, or a non-volatile storage device such as a hard disk drive (HDD) or a flash memory. The processing unit 1b may include a CPU, a digital signal processor (DSP), an application specific integrated circuit (ASIC), a field-programmable gate array (FPGA), and the like. The processing unit 1b may be a processor configured to execute a program. The processor may include a set (multiprocessor) of a plurality of processors. The storage unit 1a is also referred to as a memory. The processing unit 1b is also referred to as a processor.

The storage unit 1a stores configuration information D1 related to any physical machine and any virtual machine operating on the physical machine. The configuration information D1 includes information related to the infrastructure. For example, the configuration information D1 includes physical machine configuration information d1 indicating the configuration of each physical machine, and virtual machine configuration information d2 indicating the configuration of each virtual machine.

For example, the physical machines 2, 3, and 4 and the virtual machines 2a, 2b, 3a, 3b, 4a, and 4b have identification information as follows. The identification information of the physical machine 2 is denoted by "PM1". The identification information of the physical machine 3 is denoted by "PM2". The identification information of the physical machine 4 is denoted by "PM3". The identification information of the virtual machine 2a is denoted by "VM1". The identification information of the virtual machine 2b is denoted by "VM2". The identification information of the virtual machine 3a is denoted by "VM3". The identification information of the virtual machine 3b is denoted by "VM4". The identification information of the virtual machine 4a is denoted by "VM5". The identification information of the virtual machine 4b is denoted by "VM6".

The physical machine configuration information d1 includes information of the number of CPU cores, a memory capacity, and a disk capacity of each physical machine. Specifically, the physical machine configuration information d1 registers, for the physical machine 2 (identification information "PM1"), a record indicating that the number of CPU cores is "64", the memory capacity is "256 gigabytes (GB)", and the disk capacity is "32 terabytes (TB)". The physical machine configuration information d1 registers a similar record for any other physical machine.

The virtual machine configuration information d2 includes information of the number of CPU cores, a memory capacity, and a disk capacity allocated to each virtual machine, and current disposition (physical machine as a current disposition target) of the virtual machine. Specifically, the virtual machine configuration information d2 registers, for the virtual machine 2a (identification information "VM1"), a record indicating that the number of CPU cores is "2", the memory capacity is "32 GB", the disk capacity is "2 TB", and the current disposition is "PM1" (physical machine 2). The virtual machine configuration information d2 registers a similar record for any other virtual machine.

The storage unit 1a stores time information D2 indicating the time required for maintenance work. For example, the time information D2 includes virtual machine time information d3 indicating the time required for migrating the virtual machine from the physical machine to another physical machine, and physical machine time information d4 indicating the time required for the maintenance work of the physical machine.

In the virtual machine time information d3, the time required for migrating the virtual machine (migration turnaround time) is registered in association with the identification information of the virtual machine. The migration turnaround time is a value obtained from the time required to move the virtual machine in the past, for example.

In the physical machine time information d4, the time required for maintenance work of the physical machine (maintenance turnaround time) is registered in association with the identification information of the physical machine. The maintenance turnaround time is a value set by the system operator according to the content of the maintenance work, for example.

The storage unit 1a further stores a constraint condition D3 indicating constraints on the migration of the virtual machine operating on the allocated physical machine and the maintenance work of the allocated physical machine. The constraint condition D3 includes, for example, a constraint that the total resources required for virtual machines on a certain physical machine does not exceed the resources of the physical machine. The constraint condition D3 also include, for example, a constraint by which, when an avoidance time slot to avoid migration of the virtual machine is inputted by a user of a virtual machine, the virtual machine is not migrated in the avoidance time slot (migration time slot constraint).

Figure 2:
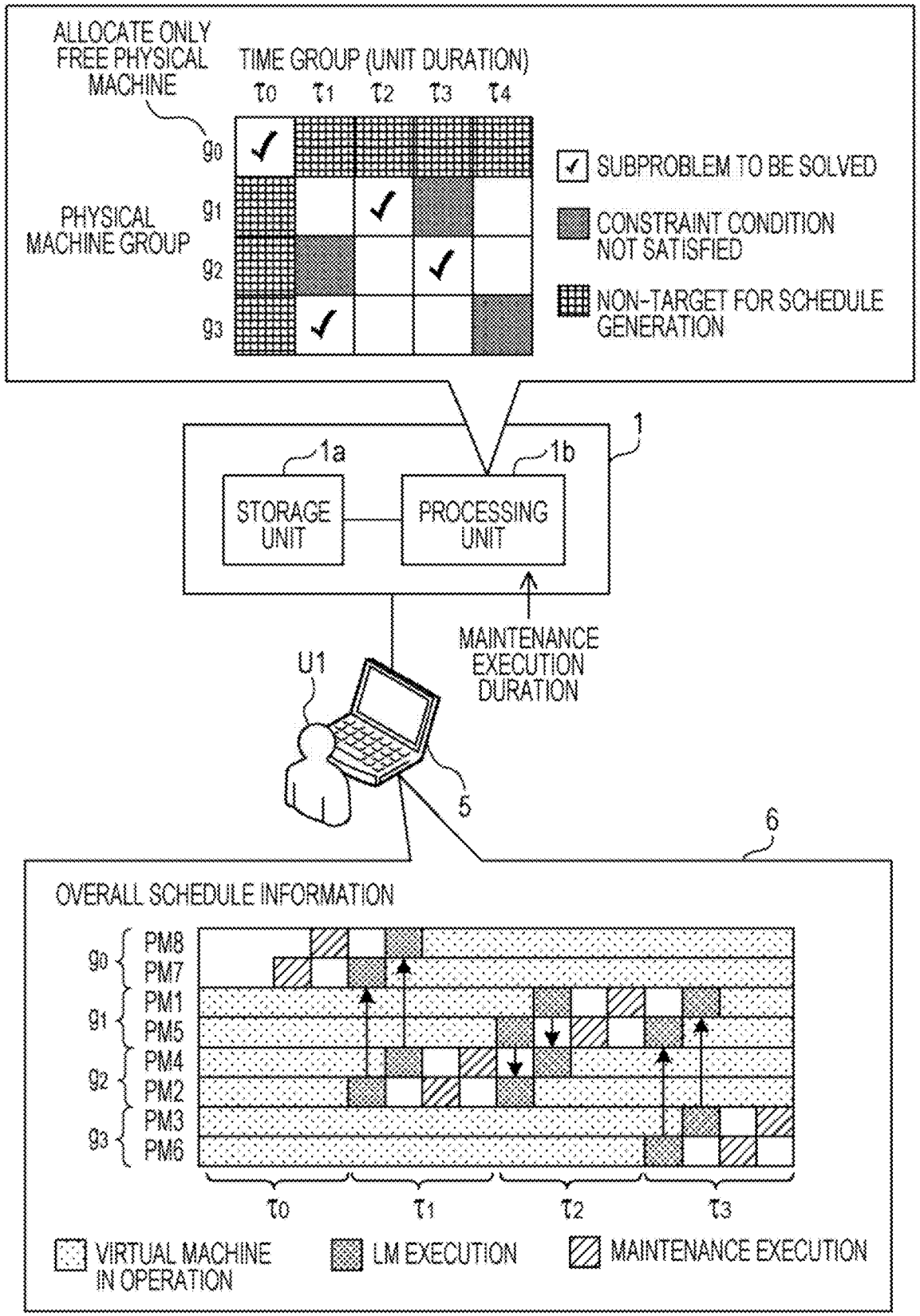
FIG. 2 is a diagram illustrating exemplary production of a maintenance schedule.

FIG. 2 is a diagram illustrating exemplary production of a maintenance schedule. Upon receipt of a maintenance execution duration, the scheduling device 1 starts a maintenance schedule generation process. For example, the operator U1 inputs a maintenance execution duration to the terminal device 5. The terminal device 5 transmits the inputted maintenance execution duration to the scheduling device 1.

Upon acquisition of the maintenance execution duration for the physical machine set including the plurality of physical machines 2, 3, 4, . . . , the processing unit 1b of the scheduling device 1 divides the execution duration into a plurality of unit periods. For example, when the execution duration of several days or several weeks is specified, the processing unit 1b divides the execution duration into unit periods of one day. The processing unit 1b sets the time of a given interval (for example, by the minute) within the execution duration as the unit indicating a virtual machine migration execution duration (start time and end time) or a maintenance work execution duration (start time and end time). Each unit period includes a plurality of times used for specifying the execution duration. Therefore, the unit period may be rephrased as a time group that is a set of a plurality of times. In the example of FIG. 2, the processing unit 1b divides the maintenance execution duration into five unit periods ($\tau_0$, $\tau_1$, $\tau_2$, $\tau_3$, $\tau_4$).

Next, the processing unit 1b divides the physical machine set into a plurality of physical machine groups that are subsets of the physical machine set. Each physical machine group includes physical machines allocated to the physical machine group.

For example, the processing unit 1b sets each of a plurality of physical machines as an allocation target physical machine. Next, the processing unit 1b allocates the allocation target physical machine to a physical machine group that may satisfy the constraint condition D3 in one or more unit periods of the plurality of unit periods after the allocation of the allocation target physical machine among the plurality of physical machine groups. When allocation of all the physical machines is completed, the physical machine set is divided into a plurality of physical machine groups. In the example of FIG. 2, the processing unit 1b divides the physical machine set into four physical machine groups ($g_0$, $g_1$, $g_2$, $g_3$).

When dividing the physical machine set, the processing unit 1b allocates only an empty physical machine to one physical machine group. The empty physical machine is a physical machine on which no virtual machine is running. The processing unit 1b searches through, for example, the physical machine set for an empty physical machine and allocates a part of the empty physical machine to one physical machine group. In the example of FIG. 2, empty physical machines with identification information "PM7" and "PM8" are allocated to the physical machine group "$g_0$".

The processing unit 1b allocates the physical machine on which the virtual machine is operating to a physical machine group that satisfies the constraint condition D3 in one or more unit periods among the remaining physical machine groups ($g_1$, $g_2$, $g_3$). Note that, for the earliest unit period $\tau_0$ within the maintenance execution duration, maintenance work is performed for the physical machine group $g_0$ including only empty physical machines. Therefore, the processing unit 1b allocates the physical machine on which the virtual machine is operating to the physical machine group that may satisfy the constraint condition in at least one unit period of the second and subsequent unit periods ($\tau_1$, $\tau_2$, $\tau_3$, $\tau_4$) among the other physical machine groups ($g_1$, $g_2$, $g_3$). In the example of FIG. 2, the physical machines with the identification information "PM1" and "PM5" are allocated to the physical machine group "$g_1$". The physical machines with the identification information "PM4" and "PM2" are allocated to the physical machine group "$g_2$". The physical machines with the identification information "PM3" and "PM6" are allocated to the physical machine group "$g_3$".

Note that the processing unit 1b may minimize the number of divisions of the physical machine set (the number of physical machine groups). In this case, the processing unit 1b divides the physical machine set into a minimum number of physical machine groups, each of which may satisfy the constraint condition in one or more unit periods of the plurality of unit periods after the allocation of the plurality of physical machines.

For example, the processing unit 1b first generates a predetermined number of temporary physical machine groups, and determines whether or not the constraint condition may be satisfied when all the plurality of physical machines are allocated to any temporary physical machine group. When it is determined that the constraint condition may not be satisfied, the processing unit 1b increases the number of temporary physical machine groups, and repeats the determination of whether or not the constraint condition may be satisfied and the increase in the number of temporary physical machine groups when the constraint condition may not be satisfied. The processing unit 1b sets the temporary physical machine group when it is first determined that the constraint condition may be satisfied as a plurality of physical machine groups.

Note that the number of temporary physical machine groups generated first is a theoretical minimum value based on, for example, the amount of resources of empty physical machines. The processing unit 1b divides the total amount of resources of the physical machine on which the virtual machine is running by the total amount of resources of the empty physical machines, and rounds up the remainder to obtain the theoretical minimum value.

By reducing the number of physical machine groups as much as possible, the number of physical machines on which maintenance work may perform per unit period increases, and the time required for overall maintenance work may be shortened.

When the division of the physical machine set is completed, the processing unit 1b specifies a constraint satisfaction unit period in which the constraint condition D3 may be satisfied for each of the plurality of physical machine groups. The processing unit 1b creates individual schedule information indicating work execution durations of the migration of the active virtual machine operating on the allocated physical machine and the maintenance work for the allocated physical machine in the constraint satisfaction unit period. Such creation of individual schedule information for each unit period related to the physical machine group is a solution to a subproblem for the scheduling problem of the entire system.

Note that the processing unit 1b may solve subproblems of some unit periods for each physical machine group. For example, the processing unit 1b selects one subproblem to be solved at a time for each of a plurality of physical machine groups so that the unit periods of the subproblems to be solved do not overlap between the physical machine groups. In this case, during division of the physical machine set, the unit period that is found to be unable to satisfy the constraint condition is excluded from the solution of the subproblem.

Specifically, as for the physical machine group $g_0$ including only empty physical machines, the processing unit 1b sets the subproblem corresponding to the earliest unit period $\tau_0$ within the maintenance execution duration as a solution target. As for the other physical machine groups ($g_1$, $g_2$, $g_3$), the processing unit 1b sets the subproblem corresponding to the unit period in the earliest possible time slot as a solution target. Accordingly, the time required for maintenance may be shortened.

Upon completion of solving the subproblem for each of the plurality of physical machine groups, the processing unit 1b creates overall schedule information 6 indicating work execution durations of the migration of each of the plurality of virtual machines operating on the plurality of physical machines and the maintenance work for each of the plurality of physical machines. For example, the processing unit 1b creates the overall schedule information 6 by integrating the individual schedule information created for each of the plurality of physical machine groups.

The processing unit 1b transmits the generated overall schedule information 6 to the terminal device 5 used by the operator U1, for example. The terminal device 5 displays the contents of the received overall schedule information 6 on the monitor. Thus, the operator U1 may grasp the maintenance schedule.

As described above, the scheduling device 1 subdivides the problem related to the maintenance scheduling into subproblems, finds a solution for each subproblem for each physical machine group, and generates the overall schedule information 6 by integrating the solution results. By dividing the problem into the subproblems, the scheduling processing load is reduced to enable a maintenance schedule to be created in a short time.

The scheduling device 1 may also set the number of divisions when dividing the physical machine set to the smallest possible number for division. As a result, the number of physical machines that may be maintained per unit period increases, and the overall maintenance duration is shortened.

In the allocation of the allocation target physical machine, the scheduling device 1 may be able to detect a plurality of allocatable physical machine groups. In this case, the scheduling device 1 may allocate the allocation target physical machine to the physical machine group specified according to predetermined criteria from among the allocatable physical machine groups. For example, the scheduling device 1 allocates an allocation target physical machine to a physical machine group having a minimum empty capacity among the allocatable physical machine groups.

Note that the constraint condition D3 may include a migration time slot constraint that constrains the migration time of the virtual machine upon specification by the user. For example, the processing unit 1b acquires an avoidance time slot to avoid migration inputted by the user or an allowable time slot to allow the migration. The processing unit 1b determines a migration avoidance time slot in which the virtual machine used by the user is not migrated, based on the avoidance time slot or the allowable time slot. The processing unit 1b includes, in the constraint condition D3, a migration time slot constraint to migrate the virtual machine to be used while avoiding the migration avoidance time slot.

When there is a migration time slot constraint, the processing unit 1b determines a time slot to be a migration avoidance time slot for at least one of the virtual machines operating on one physical machine as a migration execution avoidance time slot in which no virtual machine may be migrated to one physical machine. The processing unit 1b determines whether or not the migration time slot constraint is satisfied, based on the migration execution avoidance time slot of each of the physical machines allocated to the same physical machine group.

During division of the physical machine set, the processing unit 1b also allocates a physical machine having a longer migration avoidance time slot first to any of the plurality of physical machine groups as the allocation target physical machine. Thus, physical machines with strict allocation destination restrictions may be preferentially allocated to the physical machine group, resulting in higher possibility that the allocation destination physical machine group may be determined for all the physical machines. As a result, the physical machine set may be divided into a smaller number of physical machine groups.

The scheduling device 1 solves the maintenance scheduling problem by dividing the problem into a plurality of subproblems. Therefore, the amount of calculation for scheduling is reduced to enable a schedule to be created in a short time.

The scheduling device 1 also reduces the number of physical machine groups as much as possible. Therefore, it is possible to create an appropriate schedule that may complete maintenance in a short period of time.

Second Embodiment

Next, a second embodiment will be described. In the second embodiment, appropriate scheduling of maintenance that satisfies various constraint conditions may be executed in a short time, including the constraint condition that a virtual machine is not migrated within a period specified by the user of the virtual machine.

Figure 3:
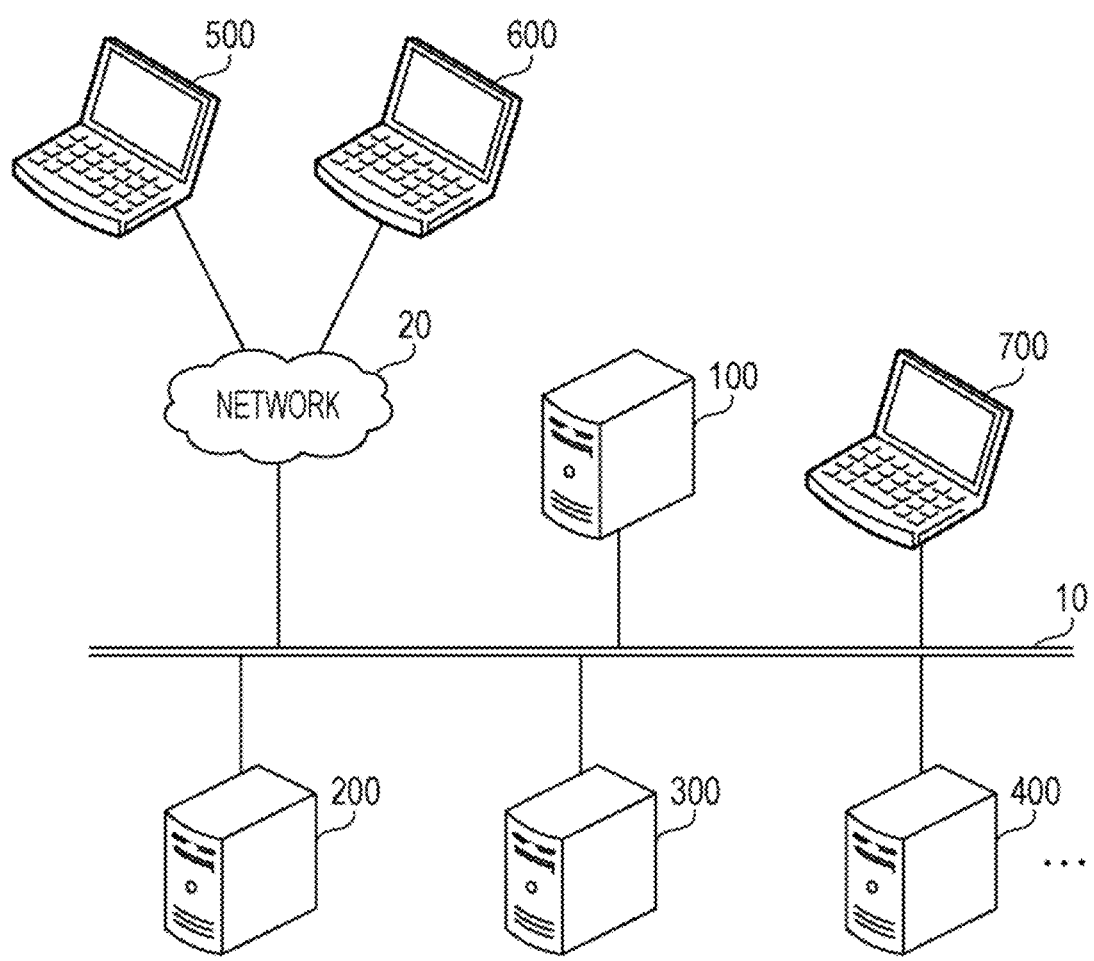
FIG. 3 is a diagram illustrating an exemplary information processing system according to a second embodiment.

FIG. 3 is a diagram illustrating an exemplary information processing system according to a second embodiment. The information processing system according to the second embodiment includes a management server 100 and physical machines 200, 300, 400, . . . . The management server 100 and the physical machines 200, 300, 400, . . . are connected to a network 10. The network 10 is, for example, a local area network (LAN). The network 10 is also connected to a network 20. The network 20 is a network outside of the network 10, such as the Internet or a wide area network (WAN). The network 20 is connected with user terminals 500 and 600. The network 10 is connected with an operator terminal 700.

The information processing system according to the second embodiment provides a service called Infrastructure as a Service (IaaS). In the IaaS, an operator of the system provides hardware resources on the system to a plurality of users (tenants) through a network. The users of the system establish virtual machines by using the provided hardware resources, and run various kinds of work applications on the virtual machines.

The system operator operates the system infrastructure (physical machine, network device, and the like), monitors, and maintains the operating status of each device. For example, the operator performs maintenance on an infrastructure side (for example, security patch application and OS upgrade at the physical machines 200, 300, 400, . . . ) to maintain service quality. Before the maintenance is performed on a physical machine, processing of migrating any virtual machine operating on the physical machine to another physical machine is performed. In an example described in the second embodiment, the live migration technology is used to migrate a virtual machine (however, the virtual machine migration may be achieved by cold migration).

The management server 100 is a server computer configured to manage a schedule of maintenance of any virtual machine at the physical machines 200, 300, 400, . . . . Upon inputting of a physical machine as a maintenance target and a maintenance execution duration, the management server 100 produces a schedule of live migration and maintenance work for any virtual machine operating on the physical machine as a maintenance target. The management server 100 transmits the produced schedule to the user terminals 500 and 600 and the operator terminal 700. Upon confirmation of the produced schedule, the management server 100 instructs, in accordance with the confirmed schedule, the physical machine as a maintenance target to perform live migration of any virtual machine. The management server 100 is an exemplary scheduling device 1 according to the first embodiment.

The physical machines 200, 300, 400, . . . are server computers each including computation resources such as a CPU and a memory and configured to execute virtual machines by using the computational resources. For example, the physical machines 200, 300, 400, . . . each execute a hypervisor to allocate the computational resources to the virtual machines through the function of the hypervisor. The physical machines 200, 300, 400, . . . are exemplary physical machines 2, 3, 4, . . . according to the first embodiment.

The user terminals 500 and 600 are client computers used by users. The user terminals 500 and 600 are used by different users. The users use virtual machines on the physical machines 200, 300, 400, . . . by operating the respective user terminals 500 and 600. The user of the user terminal 500 may check, by using the user terminal 500, a schedule of live migration (live migration of a virtual machine used by the user), which is provided by the management server 100. Similarly, the user of the user terminal 600 may check a live migration schedule provided by the management server 100 by using the user terminal 600. The user terminals 500 and 600 are exemplary terminal devices 5 according to the first embodiment.

The operator terminal 700 is a client computer used by an operator (system administrator) of the information processing system according to the second embodiment. The operator uses the operator terminal 700 to check a physical-machine maintenance schedule provided by the management server 100 and a schedule of live migration along with maintenance.

Figure 4:
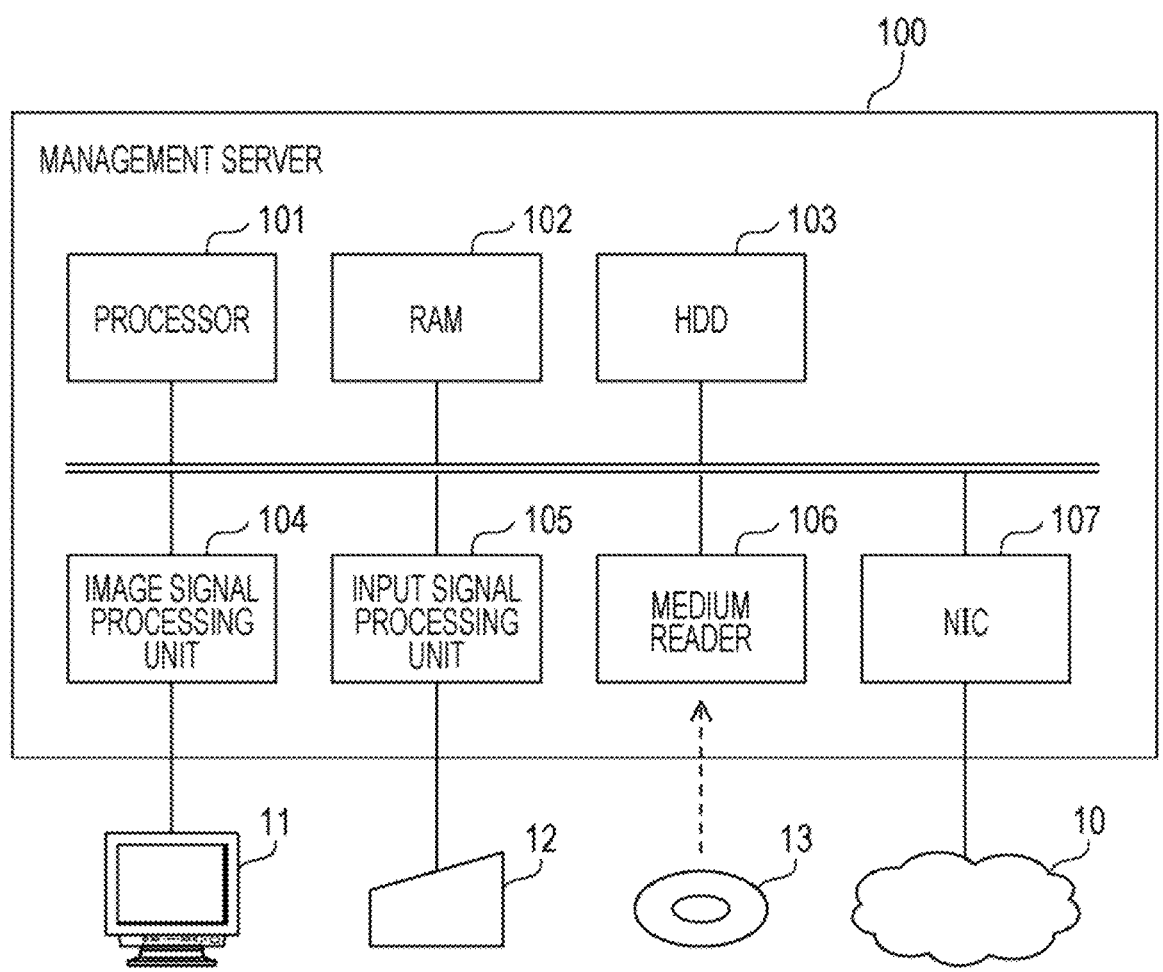
FIG. 4 is a diagram illustrating exemplary hardware of a management server.

FIG. 4 is a diagram illustrating exemplary hardware of the management server. The management server 100 includes a processor 101, a RAM 102, an HDD 103, an image signal processing unit 104, an input signal processing unit 105, a medium reader 106, and a network interface card (NIC) 107. Each hardware component is connected to a bus of the management server 100.

The processor 101 is a hardware component configured to control information processing at the management server 100. The processor 101 may be a multiprocessor. The processor 101 is, for example, a CPU, a DSP, an ASIC, or an FPGA. The processor 101 may be a combination of two or more components of the CPU, DSP, ASIC, FPGA, and the like.

The RAM 102 is a main storage device of the management server 100. The RAM 102 temporarily stores at least part of an OS program and an application program executed by the processor 101. The RAM 102 also stores various kinds of data used for processing by the processor 101.

The HDD 103 is an auxiliary storage device of the management server 100. The HDD 103 magnetically writes and reads data to and from the built-in magnetic disk. The HDD 103 stores an OS program, an application program, and various kinds of data. The management server 100 may include an auxiliary storage device of another kind such as a flash memory or a solid state drive (SSD), and may include a plurality of auxiliary storage devices.

The image signal processing unit 104 outputs an image to a display 11 coupled with the management server 100 in accordance with a command from the processor 101. The display 11 may be, for example, a cathode ray tube (CRT) display or a liquid crystal display.

The input signal processing unit 105 acquires an input signal from an input device 12 connected with the management server 100, and outputs the input signal to the processor 101. The input device 12 may be, for example, a pointing device such as a mouse or a touch panel, or a keyboard.

The medium reader 106 is a device configured to read computer programs and data recorded in a recording medium 13. The recording medium 13 may be, for example, a magnetic disk such as a flexible disk (FD) or an HDD, an optical disk such as a compact disc (CD) or a digital versatile disc (DVD), or a magneto-optical disc (MO). The recording medium 13 may be, for example, a non-transitory semiconductor memory such as a flash memory card. The medium reader 106 stores, in accordance with, for example, a command from the processor 101, computer programs and data read from the recording medium 13 in the RAM 102 or the HDD 103.

The NIC 107 performs communication with another device through the network 10. The NIC 107 may be a wired communication interface or a wireless communication interface.

The management server 100 may realize the processing functions of the second embodiment with the hardware configuration described above. The physical machines 200, 300, 400, . . . , the user terminals 500 and 600, and the operator terminal 700 may be achieved by using hardware components similar to those of the management server 100. The scheduling device 1 illustrated in the first embodiment may also be realized by using hardware components similar to those of the management server 100 illustrated in FIG. 4.

It is assumed that maintenance is performed on the physical machines 200, 300, and 400 in the system illustrated in FIG. 3. In order to maintain service quality, maintenance on the infrastructure side is important. The maintenance work includes, for example, application of security patches to the physical machines 200, 300, and 400, replacement of deteriorated devices, and the like.

For each physical machine, the operator performs maintenance work according to the following flow. (1) A virtual machine running on a physical machine as a maintenance target is migrated by live migration to a physical machine whose maintenance work has been done. (2) Maintenance work is performed on an empty physical machine.

Figure 5:
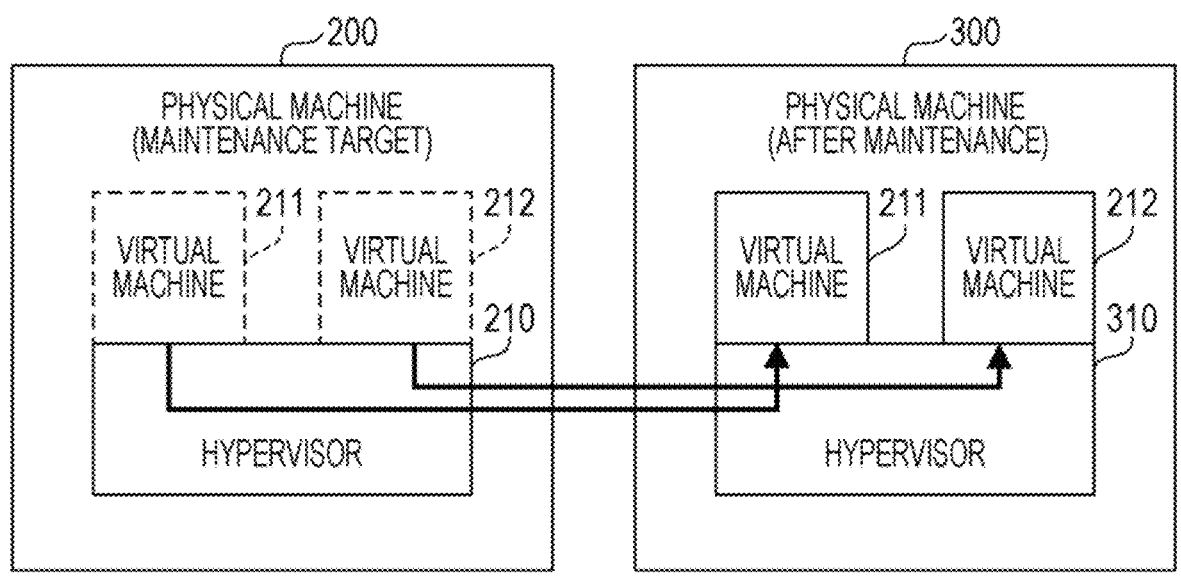
FIG. 5 is a diagram illustrating exemplary live migration.

FIG. 5 is a diagram illustrating exemplary live migration. In the example of FIG. 5, maintenance work for the physical machine 300 has been done, and the physical machine 200 is a maintenance target. The physical machines 200 and 300 include hypervisors 210 and 310, respectively. The hypervisors 210 and 310 allocate resources to virtual machines. For example, before the maintenance of the physical machine 200, the physical machine 200 includes the hypervisor 210 and virtual machines 211 and 212. The hypervisor 210 of the physical machine 200 allocates hardware resources such as a CPU and a memory included in the physical machine 200 to the virtual machines 211 and 212.

It is assumed, for example, that the virtual machines 211 and 212 are moved from the physical machine 200 to the physical machine 300. To move the virtual machines 211 and 212 by live migration, it is conceivable to follow the procedure as below.

(1) CPU and memory resources for the virtual machine 212 as a migration target are reserved on the physical machine 300. (2) The memory resource data allocated to the virtual machine 212 to be moved by the physical machine 200 is copied to the memory resource newly allocated for the virtual machine 212 by the physical machine 300. (3) The state of a CPU resource allocated to the virtual machine 212 is copied from the physical machine 200 to the physical machine 300, and the virtual machine 212 on the physical machine 200 is stopped. (4) The virtual machine 212 is restarted by the physical machine 300, and the resources allocated to the virtual machine 212 by the physical machine 200 are released. Accordingly, the virtual machine 212 operating on the physical machine 200 may be migrated to the physical machine 300. The above-described procedure is also called Pre-Copy. However, another procedure such as Post-Copy may be used for live migration.

By performing live migration, the virtual machines 211 and 212 on the physical machine 200 may be migrated while operating to another physical machine 300. The user of the virtual machines 211 and 212 may continue the processing without being aware that the physical machine executing the virtual machines 211 and 212 has been changed.

In the following description, live migration is also abbreviated as LM.

After migrating the virtual machines 211 and 212 by the LM, the operator performs maintenance work on the physical machine 200. When the operator performs maintenance on all the physical machines 200, 300, 400, . . . in the system, physical machines as maintenance targets are sequentially selected, and the LM and maintenance work are repeatedly performed on the physical machines as the maintenance targets.

The management server 100 performs scheduling of when to execute maintenance for each of the physical machines 200, 300, 400, . . . .

Information to be inputted and outputted during the scheduling process is as follows.

Input
Physical machine: P={$p_1$, $p_2$, . . . }
empty physical machine: $P_e \subset P$, $1 \leq |P_e|$
Virtual machine: V={$v_1$, $v_2$, . . . }
Time: T={$t_1$, $t_2$, . . . }
Time: T={$t_1$, $t_2$, . . . } is a start time of each period when the schedule target period is discretized. Note that the management server 100 may receive a schedule target period as an input, and the management server 100 may discretize the schedule target period and generate a time T={$t_1$, $t_2$, . . . }.

Figure 6:
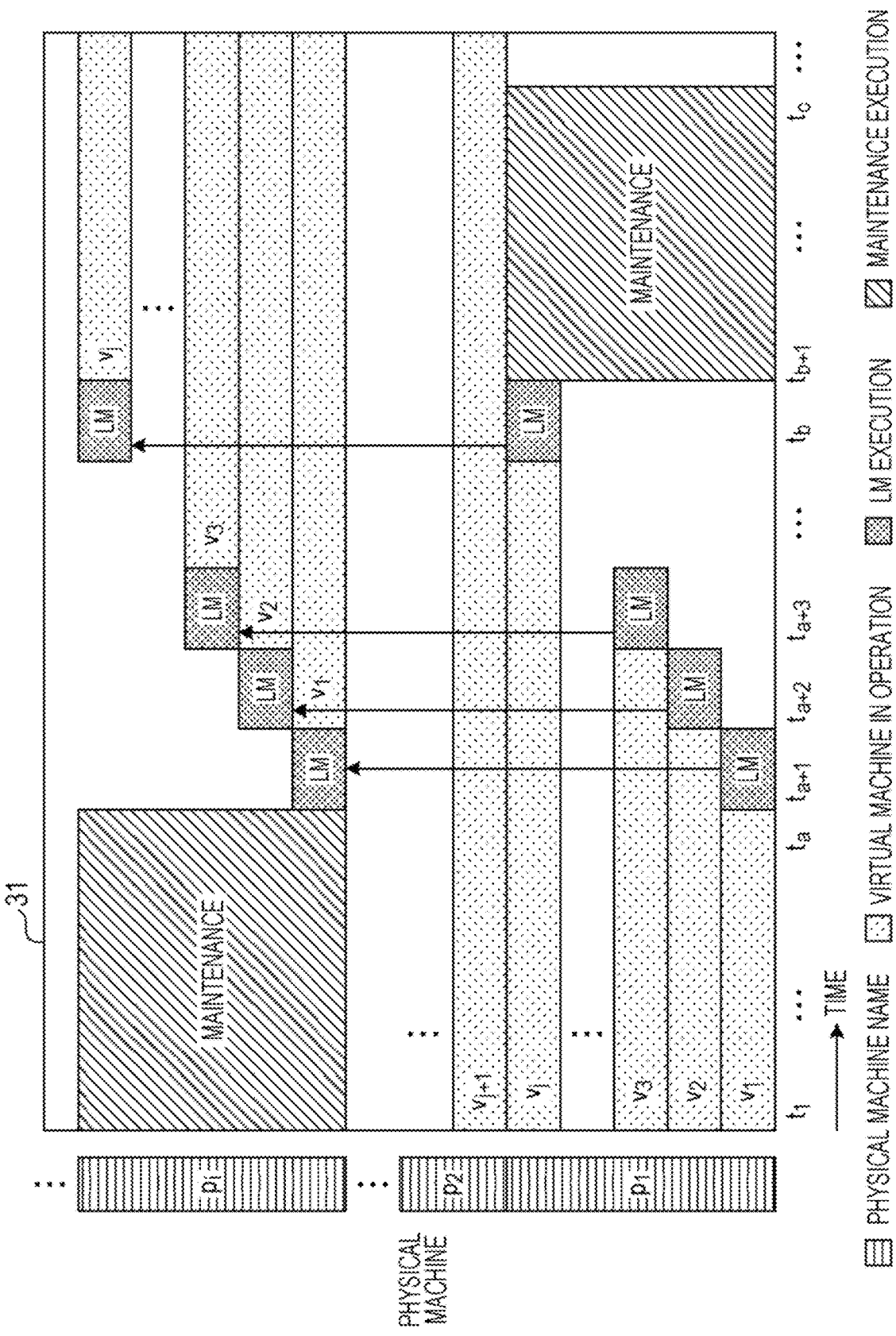
FIG. 6 is a diagram illustrating an exemplary maintenance schedule.

Output
Physical machine: Maintenance work start time
Virtual machine: LM start time and LM migration destination FIG. 6 is a diagram illustrating an exemplary maintenance schedule. In a schedule 31 illustrated in FIG. 6, the horizontal axis represents time, while the vertical axis represents physical machines. In association with each physical machine, a period during which the virtual machine is operating, an LM execution duration of the virtual machine, and an execution duration of maintenance work for the physical machine are illustrated.

At time $t_1$, no virtual machine is executed on the physical machine with the physical machine name "$p_i$". Therefore, the management server 100 first determines to perform maintenance work on the physical machine with the physical machine name "$p_i$". Next, after the maintenance work of the physical machine with the physical machine name "$p_i$" is completed, the management server 100 determines to migrate all virtual machines that operate on the physical machine with the physical machine name "$p_1$" to the physical machine with the physical machine name "$p_i$". By migrating all the virtual machines that have been operated on the physical machine with the physical machine name "$p_1$", the physical machine with the physical machine name "$p_1$" becomes an empty physical machine. Therefore, the management server 100 determines to perform maintenance work on the physical machine with the physical machine name "$p_1$" after the LM is completed.

The management server 100 continues the scheduling process until the maintenance work execution schedule is determined for all the physical machines 200, 300, 400, . . . in the system. In the management server 100, the time required for scheduling increases as the number of physical machines and that of virtual machines increase.

Maintenance work for each physical machine is performed only once within the scheduling target period. The LM of each virtual machine is executed only once within the scheduling target period. The LM migration destination candidates of the virtual machine are physical machines other than its migration source of the virtual machine, and the number of migration destination candidates is represented by "|P|−1". Note that |P| represents the number of elements of the set P.

In this case, the number (the size of the search space) of cases that may be output value candidates is expressed by the following expression.

$$\text{Number of cases} = (|T|)^{|P|} \cdot (|T| \cdot (|P|-1))^{|V|} \qquad (1)$$

"$(|T|)^{|P|}$" is the number of cases for the start time of the maintenance work for the physical machine, while "$(|T|\cdot(|P|-1))$" is the number of cases for the LM start time and the migration destination of the virtual machine.

As illustrated in FIG. 6, in order to perform maintenance work on a physical machine, the physical machine has to be an empty physical machine. In order to perform LM of a virtual machine, maintenance work for the physical machine as the migration destination has to have been done. In addition to these conditions, there are requirements that the operator has to meet during the maintenance work. Such requirements serve as restrictions for scheduling maintenance. Note that there are hard constraints and soft constraints. The hard constraints are constraints that have to be satisfied. The soft constraints are constraints that should be satisfied to the extent possible. When at least one of the hard constraints is not satisfied in search for a scheduling solution, scheduling fails due to the unsatisfiable constraints. Even if the soft constraint is not satisfied in search for the scheduling solution, the scheduling does not fall.

Examples of constraints applied to maintenance scheduling include: "Total amount of resources of virtual machines on physical machine ≤Amount of resources of the physical machine"; LM to a physical machine has to be executed after the maintenance of the physical machine is completed; The number of physical machines in which concurrent LM is executed simultaneously is equal to or less than a preset upper limit (max_lm); Concurrent LM within one physical machine is prohibited; A plurality of virtual machines having the same migration source have the same migration destination in LM; and LM of the virtual machine is avoided in the time slot specified by the user of the virtual machine.

The importance of being able to specify a time slot in which the user may avoid LM will be described.

The virtual machine has a time slot in which LM has to be avoided. For example, when LM is performed during a time slot in which the memory content of the virtual machine frequently changes, LM turnaround time increases. Even in the case of LM, there is a time (downtime) during which the operation of the virtual machine is temporarily stopped when the CPU state executing the virtual machine is transferred. When LM is performed in a time slot in which the memory content changes frequently, the downtime increases. Since the performance degradation of the virtual machine occurs during LM, an increase in turnaround time and downtime means an increase in time that affects the user's operations. The increase in LM turnaround time also leads to an increase in work time of the operator per physical machine.

The time slot in which the memory content of the virtual machine frequently changes may be determined based on, for example, the LM turnaround time predicted from the past operational status of the virtual machine. Such determination based on the past operational status is useful for a virtual machine whose operation pattern is periodic. It is also possible to determine a time slot in which the memory content of the virtual machine frequently changes based on operation schedule known to the user in advance (for example, whether to perform batch processing at night). The user's operation schedule may occur unexpectedly, and it is important that scheduling of maintenance may be executed in a short time so as to cope with unexpectedly occurring situations.

Thus, maintenance scheduling for cloud system infrastructure is a very complex and large-scale problem. Therefore, from the viewpoint of calculation time and the amount of memory used, it is difficult to find a solution within a practical time even if the 0-1 integer programming problem often used in the combinatorial optimization problem is straightforwardly applied. For example, if the total number of physical machines and virtual machines is in the range of 100 to several thousands, no solution may be found with a conventional method of searching for a combinatorial optimization problem.

Therefore, the management server 100 performs maintenance scheduling using the divide-and-conquer method. The divide-and-conquer method is a method of dividing a large problem that is difficult to solve straightforwardly into several small subproblems and then combining the solutions of the divided subproblems to finally solve the original problem. By reducing the computational complexity using the divide-and-conquer method, a schedule may be created that satisfies the constraints within a practical time (and memory usage).

Figure 7:
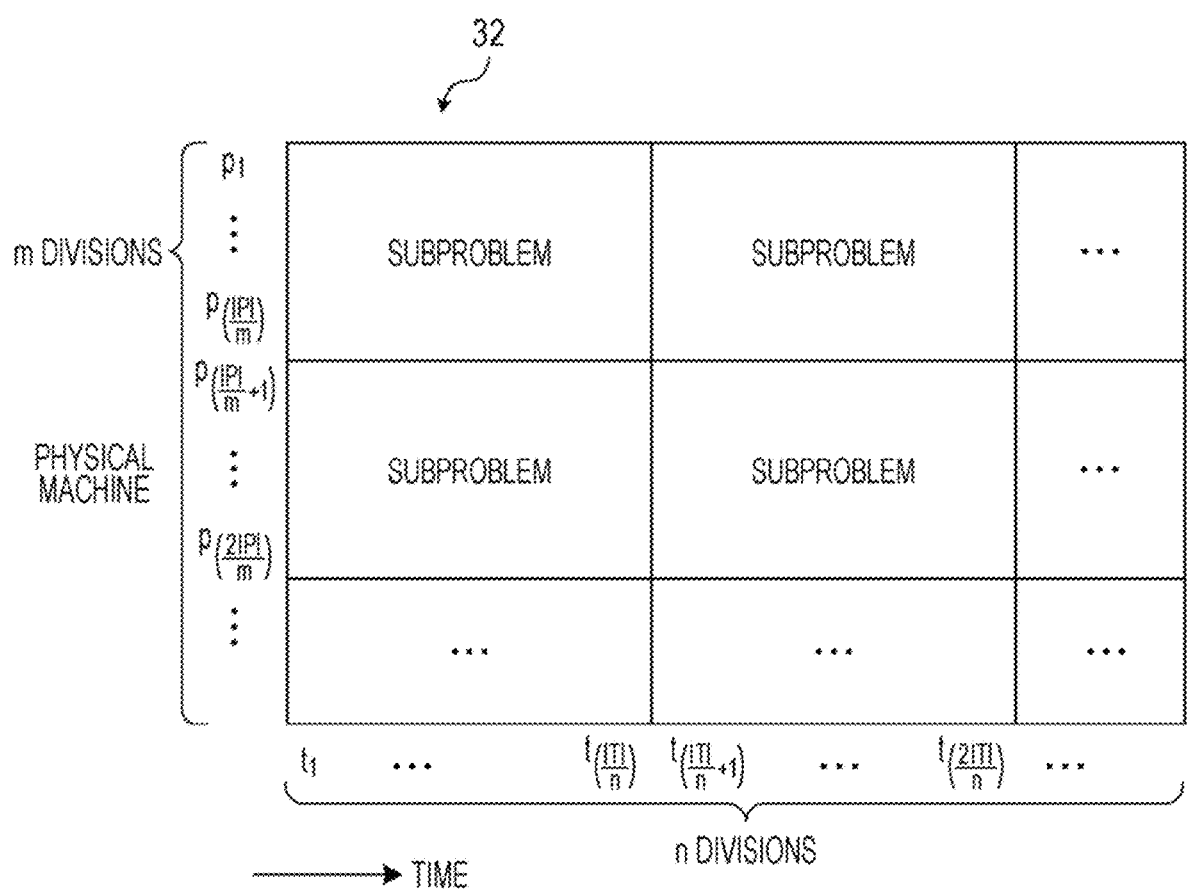
FIG. 7 is a diagram illustrating a method of applying a divide-and-conquer method to maintenance scheduling.

FIG. 7 is a diagram illustrating a method of applying the divide-and-conquer method to maintenance scheduling. When performing maintenance scheduling, the management server 100 divides a physical machine set and a time set, respectively. In the example of FIG. 7, the physical machine set is divided into m (m is an integer of 1 or more), and the time set generated by discretization is divided into n (n is an integer of m or more). Thus, a scheduling problem 32 of performing appropriate maintenance scheduling is divided into a plurality of subproblems.

By dividing the physical machine set into m, m subsets (physical machine groups) are generated. The physical machine group includes "|P|/m" physical machines. Likewise, n subsets (time groups) are generated by dividing the time set into n. The time group includes "|T|/n" times. A subproblem may be generated for each combination of a physical machine group and a time group. Assuming that the plurality of physical machines each include an equal number of virtual machines, the number of cases per subproblem is as follows.

$$\text{Number of cases per subproblem} = \left(\frac{|T|}{n}\right)^{\frac{|P|}{m}} \cdot \left(\frac{|T|}{n} \cdot \left(\frac{|P|}{m} - 1\right)\right)^{\frac{|V|}{m}} \quad (2)$$

By dividing the entire scheduling problem 32 into subproblems in this way, the number of cases is reduced exponentially according to the number of divisions.

Note that execution of system maintenance is based on the premise that there is an empty physical machine that is the migration destination of the virtual machine operated on the physical machine as the maintenance target. Therefore, when dividing a physical machine set, the management server 100 creates one physical machine group having only empty physical machines. A physical machine set not included in the physical machine group including only the empty physical machines is divided into a plurality of physical machine groups.

Figure 8:
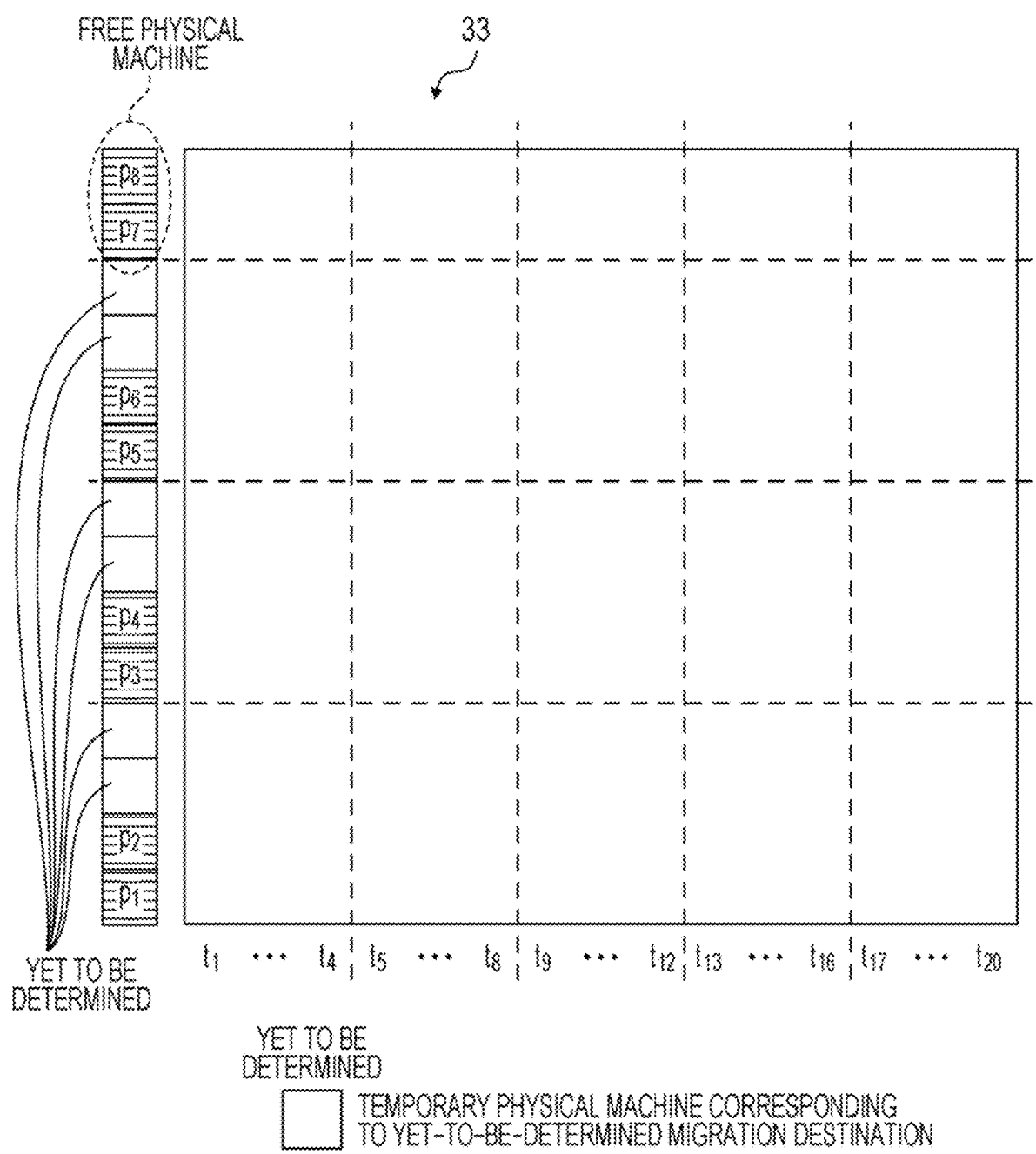
FIG. 8 is a diagram illustrating exemplary division of a physical machine set and a time set.

FIG. 8 is a diagram illustrating exemplary division of a physical machine set and a time set. In a scheduling problem 33 illustrated in FIG. 8, there are eight physical machines ($P=\{_1, p_2, p_3, \ldots, p_8\}$). Among these, two physical machines are empty physical machines ($P_e=\{p_7, p_8\}$). The scheduling target period is discretized into 20 time slots, and a time set ($T=\{t_1, t_2, t_3, \ldots, t_{20}\}$) indicating the start time of each time slot is generated. In FIG. 8, physical machine group boundaries and time group boundaries are indicated by dotted lines.

The physical machine set is divided into four physical machine groups, one of which includes only empty physical machines. The remaining three physical machine groups each include two physical machines. A temporary physical machine corresponding to an yet-to-be-determined migration destination is added to each of the three physical machine groups for solving a subproblem. The number of temporary physical machines to be added is the same as the number of physical machines in the physical machine group including only empty physical machines. In the example of FIG. 8, two temporary physical machines are added to each physical machine group.

The time set is divided into five time groups. In the scheduling, the management server 100 divides the period corresponding to the time group into an LM work period and a maintenance work period.

Figure 9:
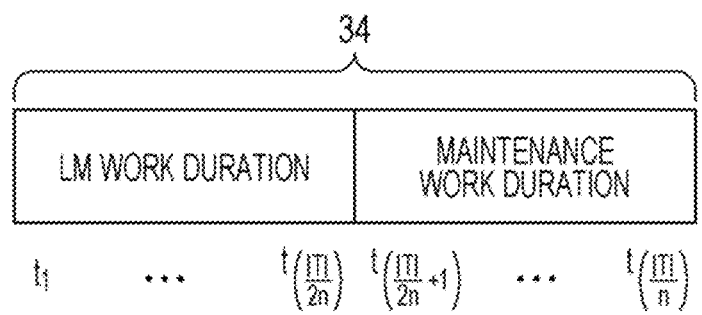
FIG. 9 is a diagram illustrating a division of work periods within a period corresponding to a time group.

FIG. 9 is a diagram illustrating division of work periods within the period corresponding to the time group. In the example of FIG. 9, the LM work period and the maintenance work period have the same length. In this case, a period from time $t_1$ to time $t_{|T|/2n}$ in a time group 34 is the LM work period, while a period from time $t_{|T|/2n+1}$ to time $t_{|T|/n}$ is the maintenance work period.

The management server 100 solves a subproblem under the conditions illustrated in FIGS. 8 and 9. When the management server 100 solves all the subproblems, a solution result as illustrated in FIG. 10 is obtained.

Figure 10:
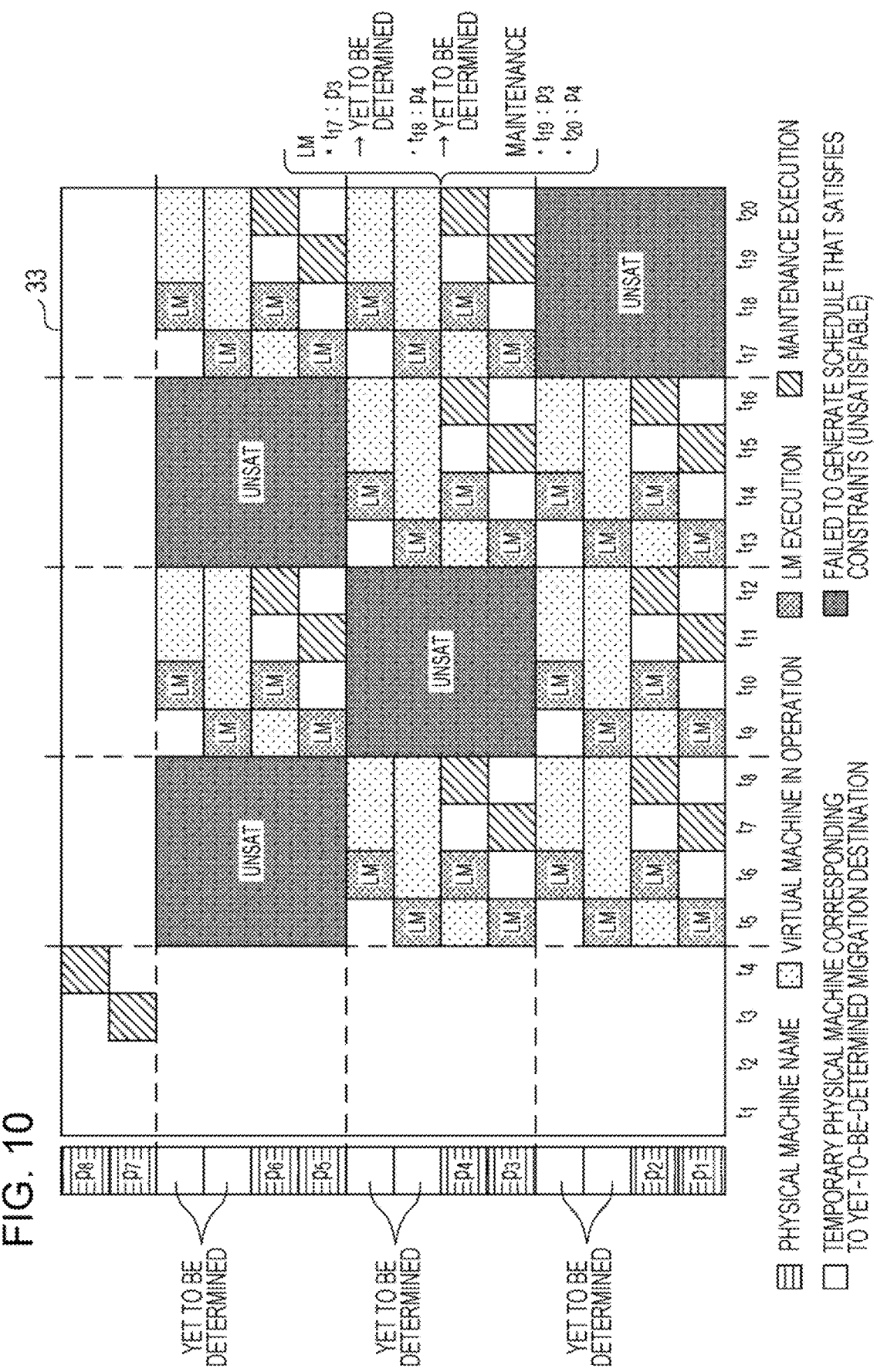
FIG. 10 is a diagram illustrating an example of a solution that satisfies a constraint for each subproblem.

FIG. 10 is a diagram illustrating an exemplary solution result of a schedule that satisfies constraints for each subproblem. In the first time group "$t_1$ to $t_4$" of a scheduling problem 33, maintenance work is performed on the physical machines "$p_7$ to $p_8$" in the physical machine group including only empty physical machines. Therefore, as for this time group, no solution is found for other physical machine groups. Furthermore, as for a physical machine group including only empty physical machines, no solution is found for the period after the maintenance is executed.

As for the subproblem that may satisfy the constraints among the subproblems that have been solved, a physical machine maintenance duration and a virtual machine LM execution duration are determined as a result of the solution. However, at this point, the migration destination of the virtual machine by LM is yet to be determined.

For example, in the scheduling result when the physical machines in the physical machine group $\{p_3, p_4\}$ are maintained in the time group $\{t_{17}, \ldots, t_{20}\}$, LM of the virtual machine on the physical machine with the physical machine name "$p_3$" is executed at time $t_{17}$. Next, at time $t_{18}$, LM of the virtual machine on the physical machine with the physical machine name "$p_4$" is executed. Then, at time $t_{19}$, maintenance work is performed on the physical machine with the physical machine name "$p_3$". At time $t_{20}$, maintenance work is performed on the physical machine with the physical machine name "$p_4$".

In the solution of the subproblem, generation of a schedule that satisfies the constraints may fail. The management server 100 manages subproblems that may not satisfy the constraints as unsatisfiable (UNSAT).

Although FIG. 10 illustrates the solution results when the management server 100 has solved all the subproblems, the management server 100 may in practice solve some of the subproblems. For example, the management server 100 may select one subproblem to be solved for each of a plurality of physical machine groups so that the unit periods of the subproblems to be solved do not overlap between the physical machine groups, and solve only the selected subproblem. The management server 100 extracts a schedule to be used (subproblem solution result) so that "maintenance may be performed on all physical machines" and the "work end date is earliest" from the solution result for each subproblem. The management server 100 edits the extracted schedule to create an overall schedule.

Figure 11:
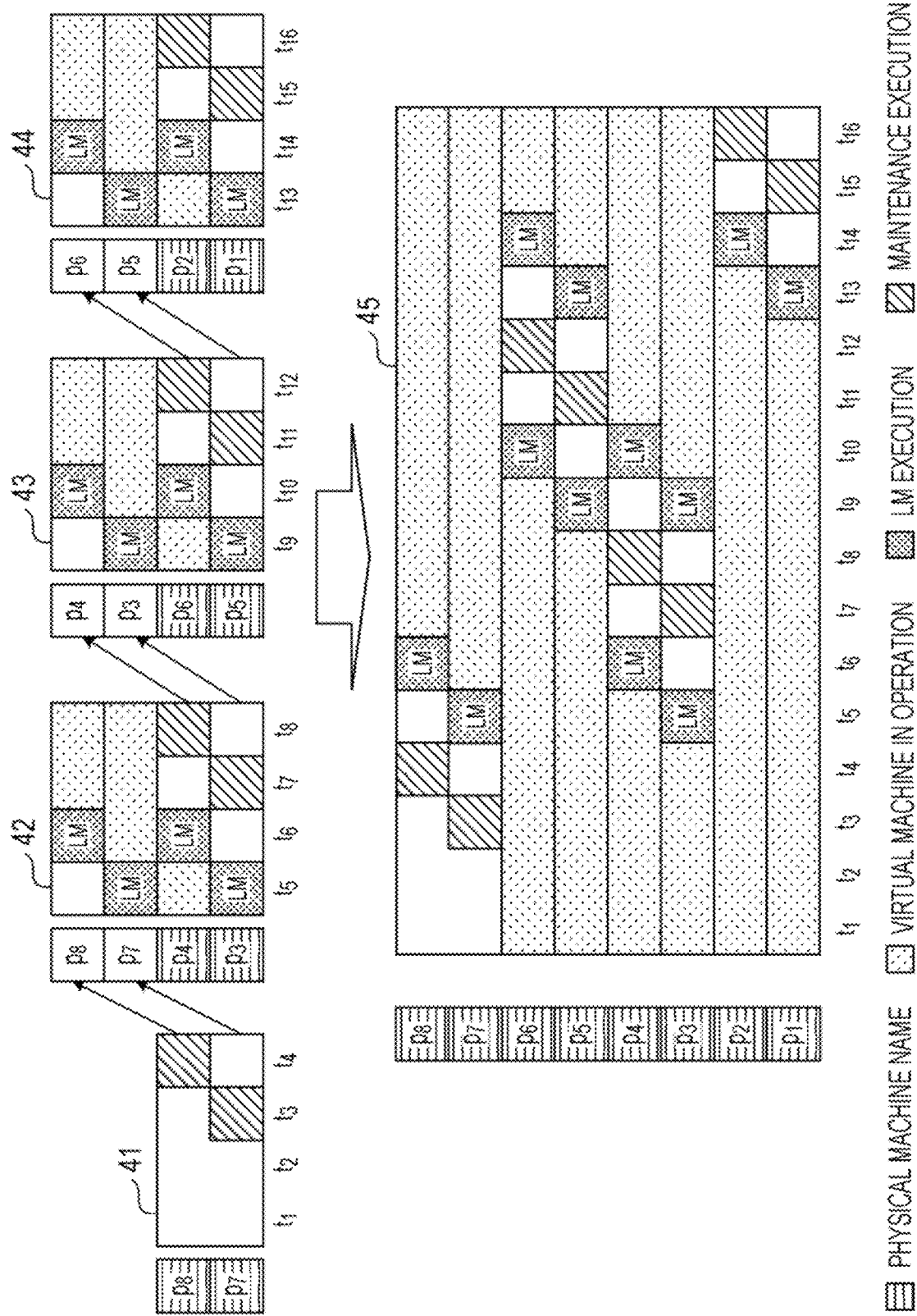
FIG. 11 is a diagram illustrating exemplary integration of solutions.

FIG. 11 is a diagram illustrating exemplary integration of solutions. Solution results from 41 to 44 are extracted, one for each of a plurality of physical machine groups. There are no overlapping time groups among the extracted solution results from 41 to 44. The management server 100 integrates the extracted solution results from 41 to 44 to create a maintenance schedule 45 for the entire system.

For example, the management server 100 acquires the physical machine names "$p_7, p_8$" of the physical machines on which the maintenance work is performed, from the solution result 41 of the time group $\{t_1, \ldots, t_4\}$ with the earliest time. The management server 100 sets the acquired physical machine names "$p_7, p_8$" as the physical machine names of the yet-to-be-determined physical machines in the solution result 42 of the next time group $\{t_5, \ldots, t_8\}$.

Next, the management server 100 acquires the physical machine names "$p_3, p_4$" of the physical machines on which the maintenance work is performed, from the solution result 42 of the time group $\{t_5, \ldots, t_8\}$. The management server 100 sets the acquired physical machine names "$p_3, p_4$" as the physical machine names of the yet-to-be-determined physical machines in the solution result 43 of the next time group $\{t_9, \ldots, t_{12}\}$.

Then, the management server 100 acquires the physical machine names "$p_5, p_6$" of the physical machines on which the maintenance work is performed, from the solution result 43 of the time group $\{t_9, \ldots, t_{12}\}$. The management server 100 sets the acquired physical machine names "$p_5, p_6$" as the physical machine names of the yet-to-be-determined physical machines in the solution result 44 of the next time group $\{t_{13}, \ldots, t_{16}\}$.

The management server 100 creates a schedule 45 in which an LM execution schedule and a maintenance work execution schedule are set for each physical machine indicated in each of the solution results from 41 to 44. In the initial state, the physical machines other than the empty physical machines (physical machine names "$p_7, p_8$") are in a state where the virtual machines are in operation until the virtual machine is migrated by LM before the maintenance work is performed. As for all the physical machines, once a virtual machine is migrated from another physical machine by LM after execution of the maintenance work, the virtual machine is set in an operating state.

In this way, the divide-and-conquer method may be applied to the maintenance scheduling. The application of the divide-and-conquer method is expected to reduce the computational complexity, but the nature of the problem changes depending on the number of divisions of the physical machine set and the appropriate number of divisions of the time set.

Figure 12:
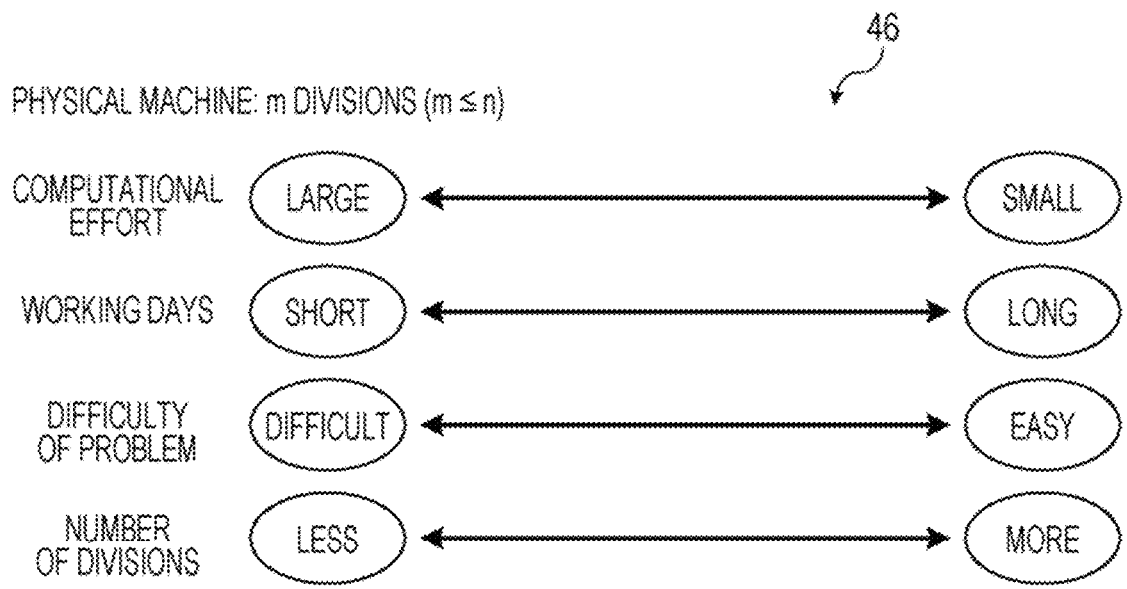
FIG. 12 is a diagram illustrating a relationship between the number of divisions of a physical machine set and the nature of the problem.

FIG. 12 is a diagram illustrating a relationship between the number of divisions of the physical machine set and the nature of the problem. FIG. 12 illustrates changes in the computational complexity, the number of work days, and the difficulty level of the problem as a relationship 46 between the number of divisions and the nature of the problem for the physical machine set. The difficulty level of a problem is the ease of finding a satisfiable solution to a subproblem. That is, the higher (the more difficult) the problem is, the more likely it is that a satisfiable solution of a subproblem may not be found.

The smaller the number of divisions of the physical machine set, the larger the computational complexity, the shorter the work days, and the more difficult the problem. The greater the number of divisions of the physical machine set, the smaller the computational complexity, the longer the work days, and the easier the problem. The reason why the smaller the number of divisions, the shorter the work days is because the number of physical machines under maintenance increases per time group. The reason why the smaller the number of divisions, the more difficult the problem is because the number of physical machines that take into account constraints increases.

Thus, when the physical machine is divided too much, the number of days required for the operator to complete the work increases. The number of divisions that may minimize the number of work days as long as the solution to the problem exists (schedule may be generated) varies significantly depending on the content of the constraints. Therefore, it is difficult to uniquely determine an appropriate number of divisions for a physical machine set.

Figure 13:
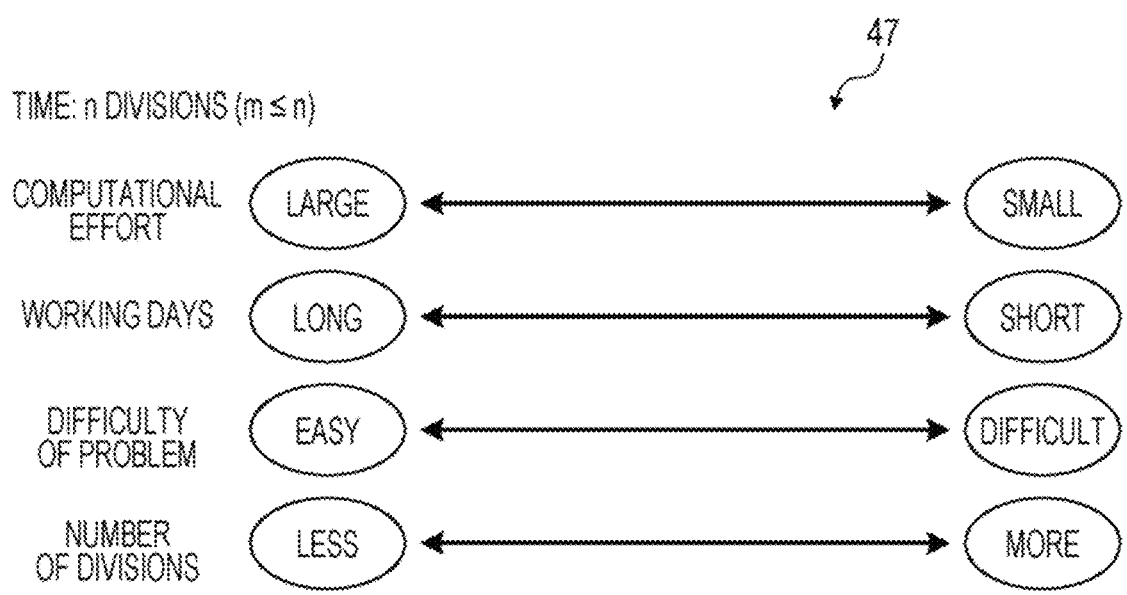
FIG. 13 is a diagram illustrating a relationship between the number of divisions of a time set and the nature of the problem.

FIG. 13 is a diagram illustrating a relationship between the number of divisions of the time set and the nature of the problem. FIG. 13 illustrates changes in the computational complexity, the number of work days, and the difficulty level of the problem according to the number of divisions as a relationship 47 between the number of divisions and the nature of the problem for the time set.

The smaller the number of divisions of the time set, the larger the computational complexity, the longer the work days, and the easier the problem. The larger the number of divisions of the time set, the smaller the computational complexity, the shorter the work days, and the more difficult the problem. The reason why the larger the number of divisions, the shorter the work days is because the possibility that the work may be completed earlier increases. The reason why the greater the number of divisions, the more difficult the problem is because time constraints become more difficult.

As described above, as in the case of the physical machine, the nature of the problem changes depending on the number of divisions of the time set. Therefore, it is also difficult to uniquely determine an appropriate number of divisions of the time set.

As one of the constraints to be satisfied in the scheduling, there is a time slot in which execution of LM on the virtual machine in the physical machine has to be avoided, making it more difficult to determine an appropriate number of divisions.

Figure 14:
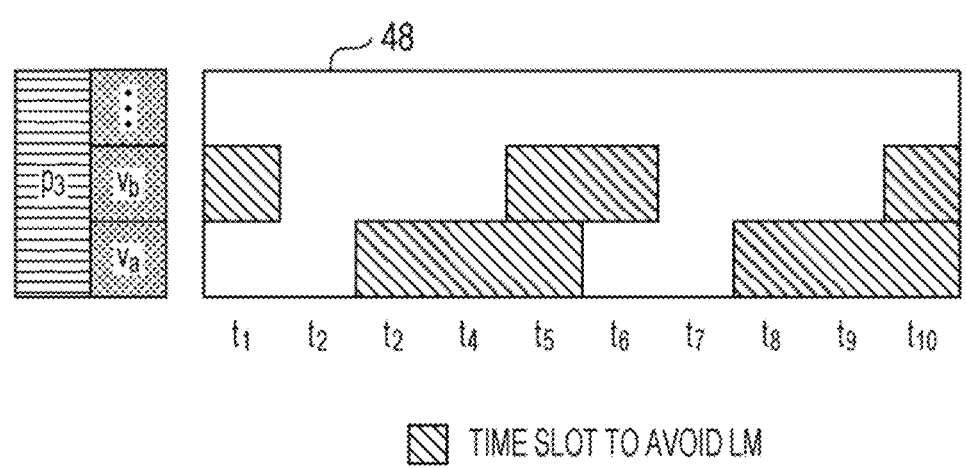
FIG. 14 is a diagram illustrating an exemplary LM avoidance time slot.

FIG. 14 is a diagram illustrating an exemplary LM avoidance time slot. When solving one subproblem, the management server 100 acquires information on the LM avoidance time slot 48 set for each virtual machine executed on the physical machine. When generating a physical machine group based on the LM avoidance time slot 48, the management server 100 determines whether or not LM of the virtual machine on the physical machine belonging to the physical machine group may be executed for each discretized time.

The management server 100 generates an LM execution avoidance time slot for all the physical machines belonging to the same physical machine group. When solving the subproblem for the physical machine group, the management server 100 determines the LM execution time slot of the physical machine while avoiding the LM execution avoidance time slot of each physical machine.

Figure 15:
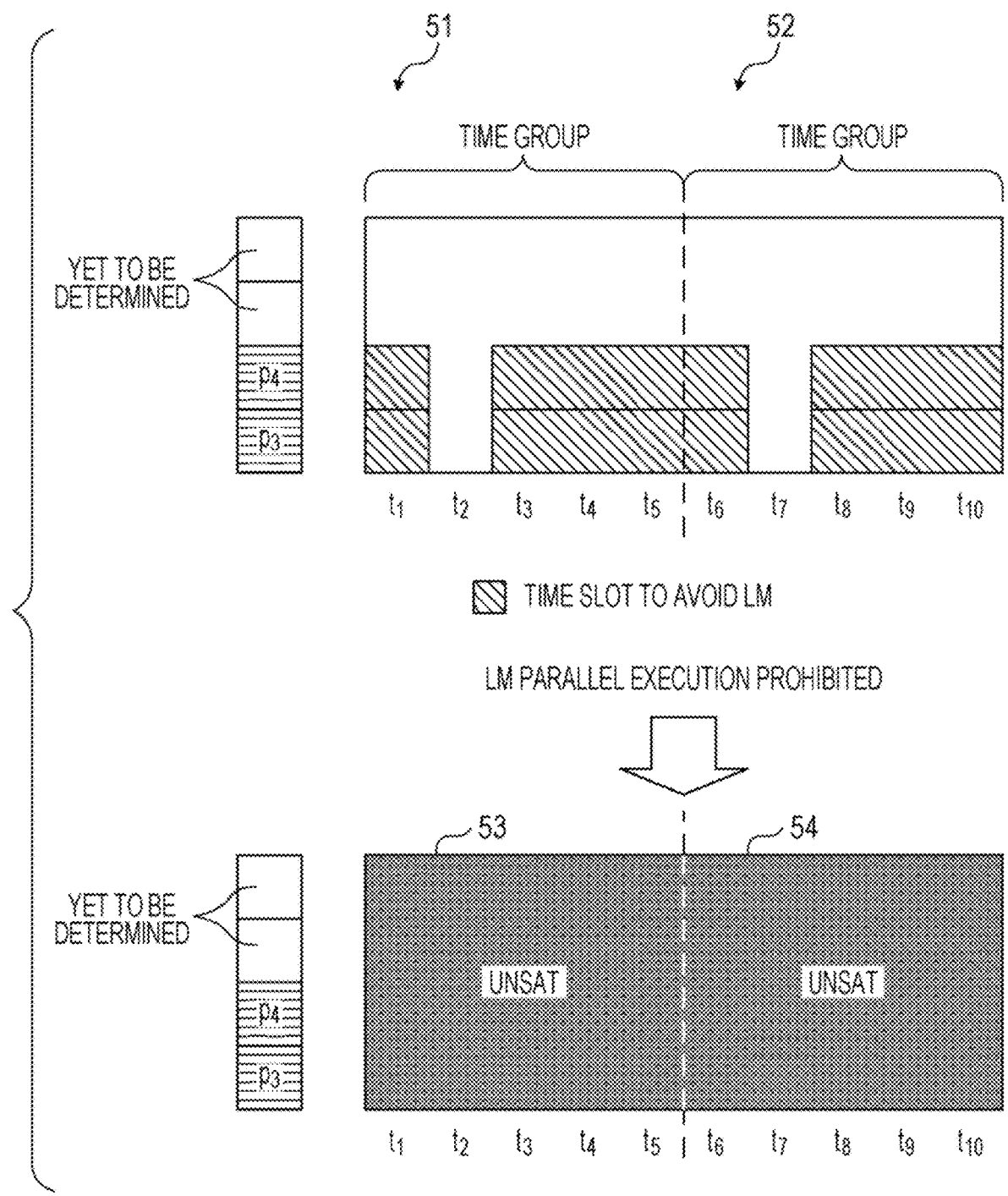
FIG. 15 is a diagram illustrating exemplary solution of a subproblem in consideration of the LM avoidance time slot.

FIG. 15 is a diagram illustrating exemplary solution of a subproblem in consideration of the LM avoidance time slot. In the example of FIG. 15, it is assumed that concurrent execution of LM in different physical machines is prohibited.

It is assumed that subproblems 51 and 52 of the physical machine group to which the physical machine names "$p_3$" and "$p_4$" belong are solved. For the physical machine with the physical machine name "$p_3$", the times $t_1$, $t_3$ to $t_6$, and $t_8$ to $t_{10}$ are LM execution avoidance time slots. For the physical machine with the physical machine name "$p_4$", the times $t_1$, $t_3$ to $t_5$, and $t_8$ to $t_{10}$ are LM execution avoidance time slots.

In the time group $\{t_1, t_2, t_3, t_4, t_5\}$, the period during which LM of the physical machine with the physical machine name "$p_3$" may be executed is only the period corresponding to the time $t_2$. Similarly, in the time group $\{t_1, t_2, t_3, t_4, t_5\}$, the period during which LM of the physical machine with the physical machine name "$p_4$" may be executed is only the period corresponding to the time $t_2$. When concurrent execution of LM in different physical machines is prohibited, if LM of one physical machine is executed at time $t_2$, there is no period during which LM of the other physical machine may be executed. Therefore, a solution result 53 of the subproblem 51 related to the time group $\{t_1, t_2, t_3, t_4, t_5\}$ is "UNSAT". Similarly, a solution result 54 of the subproblem 52 related to the time group $\{t_5, t_7, t_8, t_9, t_{10}\}$ is "UNSAT".

Thus, since the LM execution avoidance time slot exists, a solution that satisfies the constraints may not be found. If a physical machine set or a time set is divided without considering the LM execution avoidance time slot, there is a high possibility that a physical machine group in which no solution is found will occur. When the LM execution avoidance time slot is divided in consideration of the time series, the number of dimensions (the number of time slots) significantly increases. For this reason, unless some measures are taken, it is difficult to determine an appropriate number of divisions due to the increased calculation time and increased difficulty level of problems. Therefore, the management server 100 divides the time set and the physical machine set as follows.

The management server 100 sets the number of divisions of the time set based on, for example, a time slot in which the operator executes LM and maintenance work.

Figure 16:
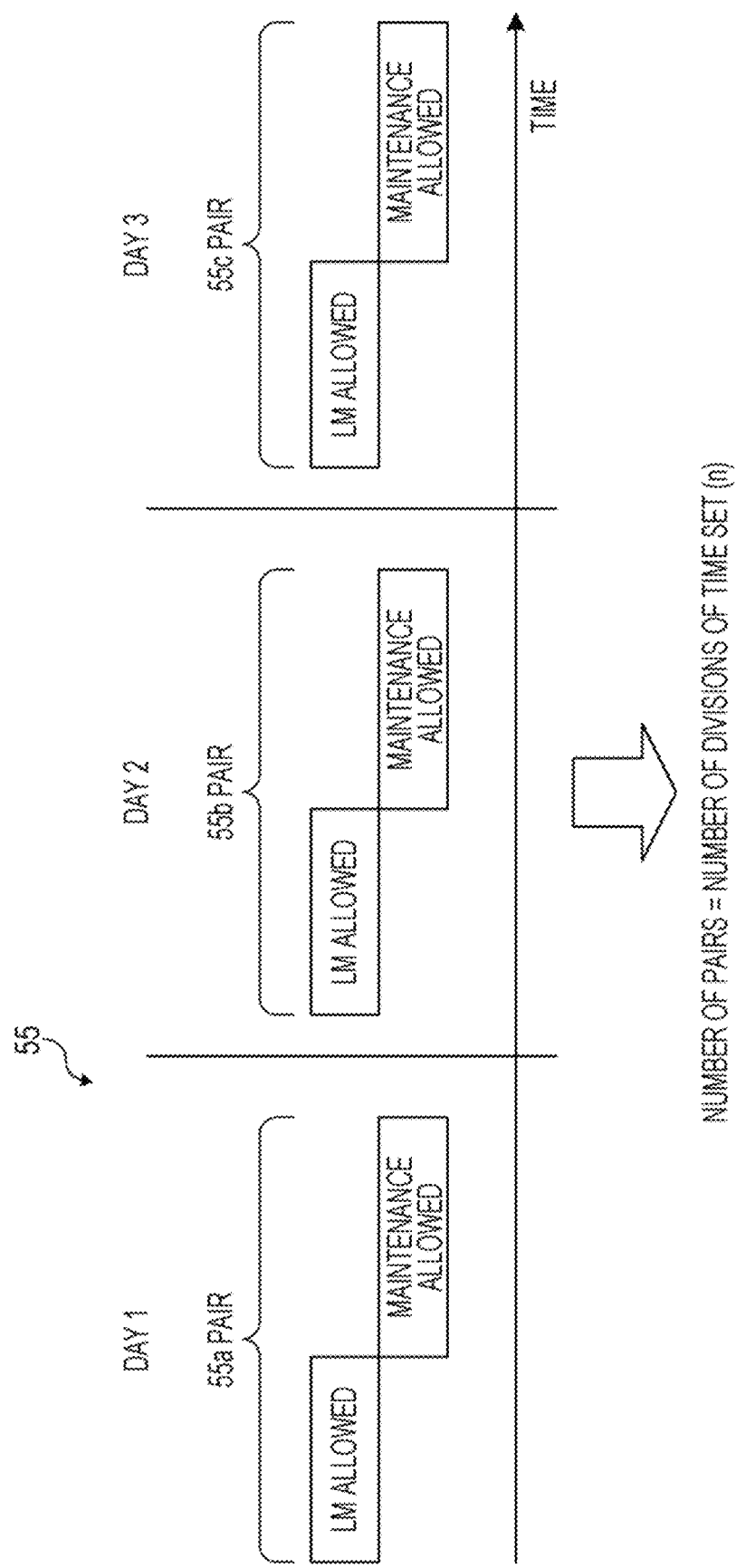
FIG. 16 is a diagram illustrating exemplary determination of the number of divisions of a time set.

FIG. 16 is a diagram illustrating exemplary determination of the number of divisions of a time set. FIG. 16 illustrates a division (time slot division 55) between a time slot in which LM may be executed (LM allowed) and a time slot in which maintenance work may be executed, for the entire system.

In execution of system maintenance, there is a time slot during which no work may be performed during the maintenance execution duration. For example, no maintenance work is executed in the early morning, late at night, or during lunch breaks. As for the work order for the physical machines, LM is performed first and then maintenance work except for the empty physical machines before execution of the maintenance. Therefore, the operator inputs a time slot during which LM and maintenance work may be executed into the management server 100. For example, the operator sets the daily working hours in the morning as an LM executable time slot, and sets the daily working hours in the afternoon as a maintenance work executable time slot. When having received the time slot 55, the management server 100 searches for pairs 55$a$, 55$b$, and 55$c$ of the LM executable time slot and the maintenance work executable time slot. The management server 100 sets the number of pairs found as the number (n) of divisions of the time set. In this case, the length of the time slot corresponding to one time group is, for example, 24 hours.

As for the division of the physical machine set, the management server 100 determines the number of divisions by treating the division as a vector packing problem including the following elements. The vector packing problem is a modification of a bin packing problem. The bin packing problem is a problem of finding the minimum number of boxes to be used when a set of items different in size is packed in a box of a fixed size.

Note that, as for the bin packing problem or the vector packing problem, the following documents are helpful.

(Document 1) D. S. Johnson, "Near-Optimal Bin Packing Algorithms", Ph.D. Thesis, Massachusetts Institute of Technology, June, 1973.

(Document 2) A. Caprara and P. Toth, "Lower Bounds and Algorithms for the 2-Dimensional Vector Packing Problem", Discrete Applied Mathematics, Vol. 111, No. 3, pp. 231-262, 1 Aug. 2001.

In the vector packing problem in the division of the physical machine set, the capacity of each element per physical machine group is determined, and the minimum number of divisions is determined such that the total for each element of the physical machines belonging to the same physical machine group is within the capacity of the following element: LM executable time, maintenance workable time, resource amount (the number of CPU cores, an amount of memory, and the like), and time slot to avoid LM execution.

The management server 100 determines the capacity of each element of LM work time, maintenance work time, and resource amount in order to solve the vector packing problem of the above elements. For example, the management server 100 determines the capacity of the migration work time according to the LM workable time per time group. The management server 100 also determines the capacity of the maintenance work time according to the maintenance workable time per time group. The management server 100 further determines the capacity of the resource amount according to the resource amount of the empty physical machine group.

Figure 17:
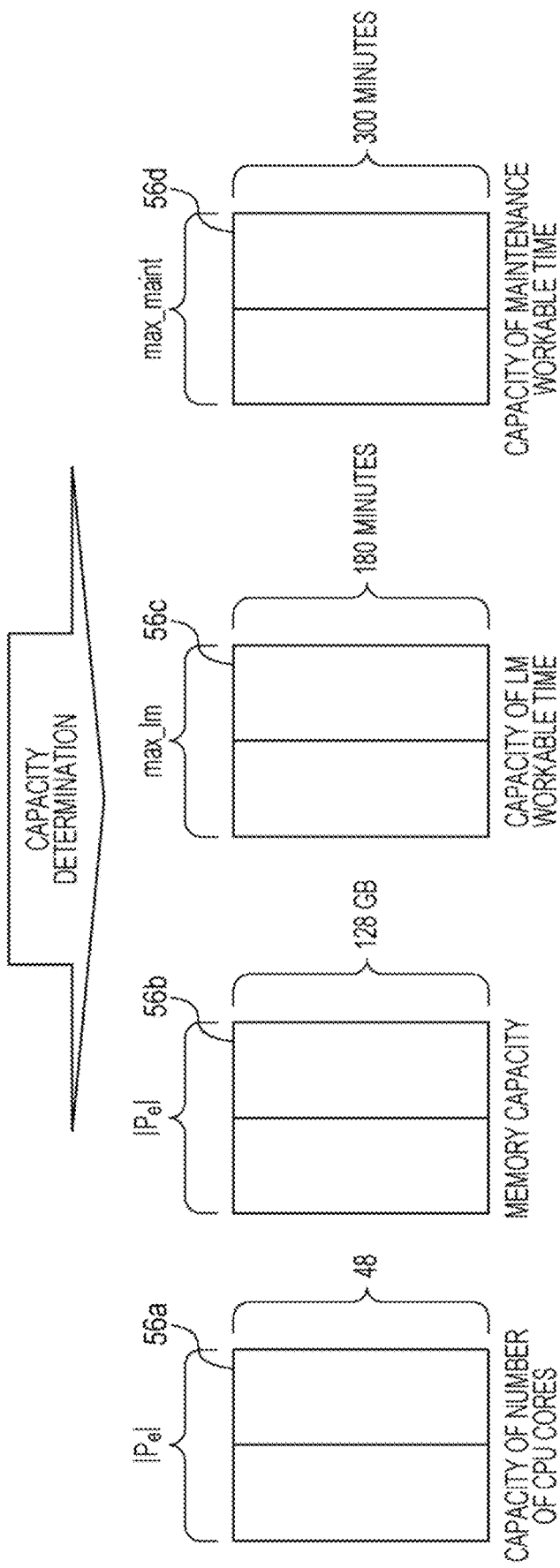
FIG. 17 is a diagram illustrating exemplary determination of a capacity.

FIG. 17 is a diagram illustrating exemplary determination of the capacity. In the example of FIG. 17, there are five physical machines in the system, two of which are empty physical machines. The management server 100 determines the capacity based on the following information. Physical machine resource amount: $p_i$=(number of CPU cores, memory amount [GB]) $p_0$=(52, 128), $p_1$=(52, 128), $p_2$=(52, 128), $p_3$=(48, 128), $p_4$=(48, 128), $p_5$=(52, 128); Empty physical machine: $P_e$={$p_4$, $p_5$}; LM workable time per time group: 180 minutes; Maintenance workable time per time group: 300 minutes; Upper limit of the number of physical machines that may be subjected to LM concurrently: max_lm=2; and Upper limit of the number of physical machines that may be maintained concurrently: max_maint=2.

The management server 100 sorts physical machines by the number of CPU cores in ascending order. The management server 100 sets the total number of CPU cores of the first |$P_e$| physical machines sorted as a capacity 56a of the number of CPU cores. In the example of FIG. 17, 48+48=96 is the capacity 56a of the number of CPU cores.

The management server 100 sorts the physical machines by the amount of memory in ascending order. The management server 100 sets the total memory amount of the first |$P_e$| physical machines sorted as a memory capacity 56b. In the example of FIG. 17, 128+128=256 (GB) is the memory capacity 56b.

The management server 100 sets the product of max_lm by the LM workable time per time group as an LM workable time capacity 56c. In the example of FIG. 17, 2×180=360 (minutes) is the LM workable time capacity 56c.

The management server 100 sets the product of max_maint by the maintenance workable time per time group as the maintenance workable time capacity 56d. In the example of FIG. 17, 2×300=600 (minutes) is the maintenance workable time capacity 56d.

When solving the vector packing problem, the management server 100 performs grouping of physical machines so that the total of each element of the physical machines belonging to the same physical machine group does not exceed the capacity of the corresponding element.

Figure 18:
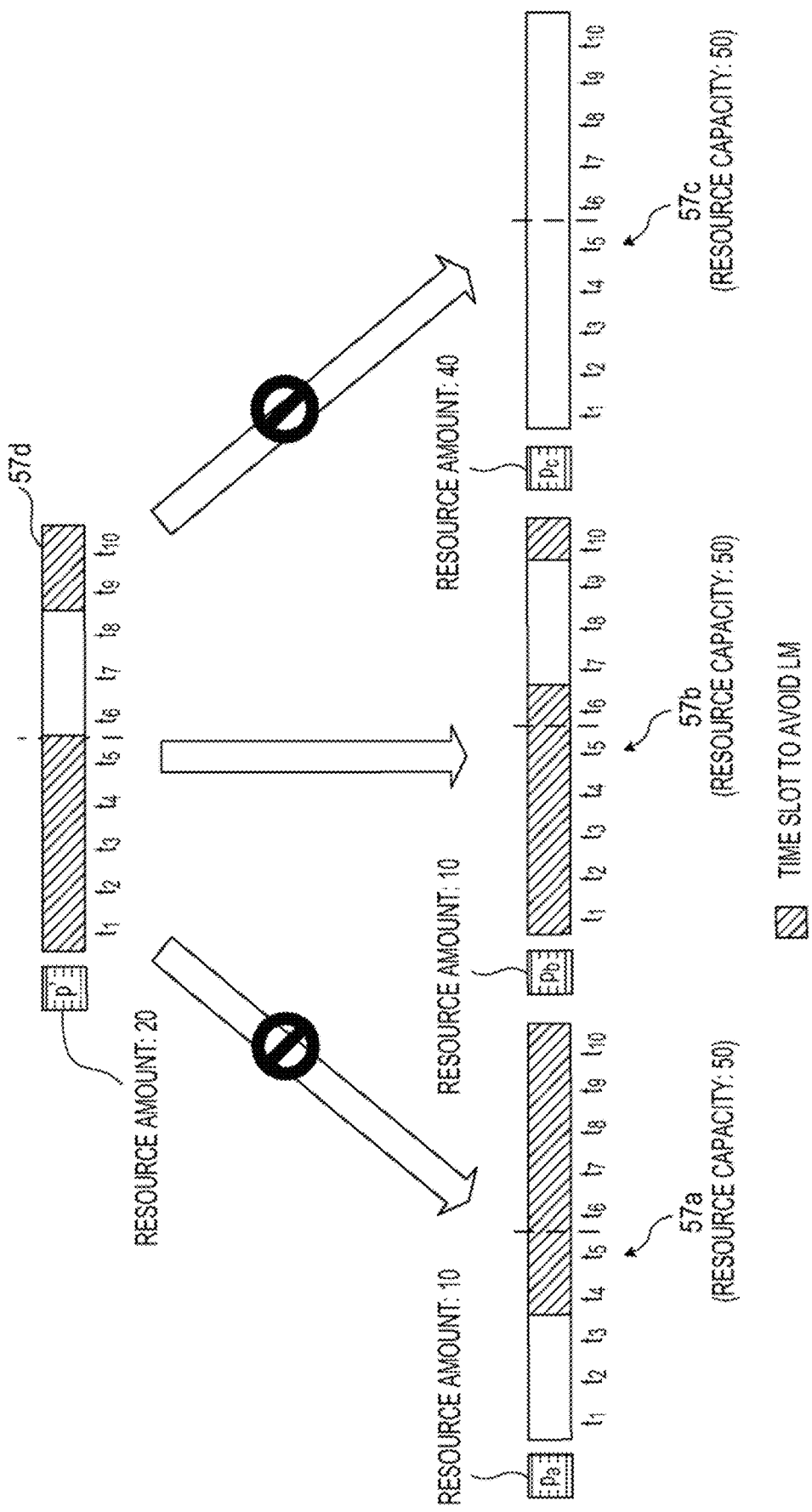
FIG. 18 is a diagram illustrating exemplary determination of an allocation destination of a physical machine.

FIG. 18 is a diagram illustrating exemplary determination of a physical machine allocation destination. When allocating a physical machine to a physical machine group, the management server 100 checks if there is a time group in which LM may be executed on all physical machines in the allocation destination physical machine group. The existence of the time group in which LM may be executed on all the physical machines in the allocation destination physical machine group means that there may be a solution to a subproblem for that physical machine group.

In the example of FIG. 18, one physical machine is allocated to each of the three physical machine groups 57a, 57b, and 57c. In this situation, it is assumed that the management server 100 newly searches for an allocation destination of the physical machine 57d with the physical machine name "p'".

We assume that LM turnaround time: 1, resource capacity: 50, time group: {$t_1, \ldots, t_5$}, {$t_6, \ldots, t_{10}$}, and physical machine resource amount: p'=20, $p_a$=$p_b$=10, $p_c$=40.

Note that the LM turnaround time has a unit of time length (difference between consecutive times) corresponding to one time generated by discretization.

The management server 100 first determines whether or not the physical machine 57d may be allocated to the physical machine group 57a. For the physical machine with the physical machine name "$p_a$" allocated to the physical machine group 57a, the period corresponding to the times from $t_4$ to $t_{10}$ is the LM execution avoidance time slot. On the other hand, the LM execution avoidance time slot of the physical machine 57d with the physical machine name "p'" is a period corresponding to the times from $t_1$ to $t_5$ and from $t_9$ to $t_{10}$. There is no LM executable period if the physical machine 57d is allocated to the physical machine group 57a. That is, in either of the two time groups, LM may not be performed for the physical machines {$p_a$, p'} belonging thereto. Therefore, the management server 100 determines that the physical machine 57d may not be allocated to the physical machine group 57a. In practice, the management server 100 determines whether or not the physical machine 57d may be allocated to the physical machine group 57a in consideration of the LM avoidance time slot in units of virtual machines.

Next, the management server 100 determines whether or not the physical machine 57d may be allocated to the physical machine group 57b. For the physical machine with the physical machine name "$p_b$" allocated to the physical machine group 57b, the period corresponding to the times from $t_1$ to $t_6$ and $t_{10}$ is the LM execution avoidance time slot. Even after the physical machine 57d is allocated to the physical machine group 57b, the period corresponding to the times $t_7$ to $t_8$ (period length "2") is the LM executable period. In practice, the management server 100 determines whether or not the physical machine 57d may be allocated to the physical machine group 57b in consideration of the LM avoidance time slot in units of virtual machines. In this case, LM may be executed for the two physical machines {$p_b$, p'} in the time group {$t_6, \ldots, t_{10}$}. The resource amounts of the two physical machines {$p_b$, p'} are "10" and "20", respectively, and do not exceed the resource capacity "50" even when added up. Therefore, the management server 100 determines that the physical machine 57d may be allocated to the physical machine group 57b.

Next, the management server 100 determines whether or not the physical machine 57d may be allocated to the physical machine group 57c. The physical machine with the physical machine name "$p_c$" allocated to the physical machine group 57c has no LM execution avoidance time slot. Therefore, even after the physical machine 57d is allocated to the physical machine group 57c, the period corresponding to the times $t_6$ to $t_8$ (period length "3") is the LM executable period. In practice, the management server 100 determines whether or not the physical machine 57d may be allocated to the physical machine group 57c in consideration of the LM avoidance time slot in units of virtual machines. In this case, LM may be executed for the two physical machines {$p_c$, p'} in the time group {$t_6, \ldots, t_{10}$}. The resource amounts of the two physical machines {$p_c$, p'} are "40" and "20", respectively, and exceed the resource capacity "50" when added up. Therefore, the management server 100 determines that the physical machine 57d may not be allocated to the physical machine group 57c.

The management server 100 allocates such physical machines to physical machine groups for all physical machines. In this event, the management server 100 sorts the physical machines according to the following criteria, and determines the allocation destination in order from the higher-order physical machine.

(First criterion) Length of time to avoid LM execution (descending order)

(Second criterion) Resource amount (the number of CPU cores, the amount of memory, and the like) (descending order)

The management server 100 sorts the physical machines according to the first criterion, and sorts the physical machines in the same order according to the second criterion. The second criterion is divided into criteria by resource type. The management server 100 normalizes the resource amount of each physical machine by the total capacity of the corresponding resources of the empty physical machines, and raises the sorting priority for the resource having the larger total resource amount after normalization. The total amount of resources after normalization of each resource is expressed by the following equation.

$$\Sigma_{i=1}^{|P|} a_{i,1}, \Sigma_{i=1}^{|P|} a_{i,2}, \ldots, \Sigma_{i=1}^{|P|} a_{i,D} \quad (3)$$

$a_{(i,j)}$ is the amount of the j-th element (resource) of the i-th physical machine. The amount of resources is a normalized value with the total capacity of the corresponding resources of the empty physical machines being "1". D is the number of element dimensions (the number of resource types used as a constraint). The management server 100 first sorts by the resource amount with the highest priority. Next, the management server 100 sorts the physical machines having the same priority by the resource amount having the next highest priority.

In this way, the management server 100 determines the physical machine group (allocation destination) to which the physical machines belong in order from the physical machine having the long LM execution avoidance time slot. This is because allocating first the physical machine with the long time slot to be avoided to the physical machine group increases the number of candidate physical machine groups when determining the allocation destination of the physical machine that comes later in the order of determination.

That is, when the number of physical machines in a physical machine group increases, the LM execution avoidance time slot for the physical machine group increases, leading to shorter LM executable time slot. By newly allocating a physical machine to a physical machine group, the LM executable time slot of the physical machine group is reduced in each time group. As in the case of the physical machine group 57a in FIG. 18, no physical machine may be allocated. Therefore, the management server 100 suppresses the occurrence of a physical machine group that may not be a candidate destination, by performing allocation to a physical machine group in order from a physical machine having a long LM execution avoidance time slot.

The management server 100 also tries allocation of physical machines to physical machine groups (grouping of physical machines), starting from a smaller number of divisions. This is because the operator's work end date is likely to be earlier as there are fewer physical machine groups. When having failed in grouping, the management server 100 sequentially increases the number of groups to retry physical machine grouping.

Note that, as for the number of divisions of the physical machine set (number of physical machine groups), the theoretical lower limit $m_0$ may be calculated, for example, by the following equation.

$$m_0 = \max(\lceil \Sigma_{i=1}^{|P|} a_{i,1} \rceil, \lceil \Sigma_{i=1}^{|P|} a_{i,2} \rceil, \ldots, \lceil \Sigma_{i=1}^{|P|} a_{i,D} \rceil) \quad (4)$$

In Equation (4), a ceiling function value of the total value (normalized value) of the physical machine resource amount is obtained for each resource, and the maximum value is set as the theoretical lower limit $m_0$. The ceiling function is a function for obtaining a minimum integer equal to or greater than a real number. In actual physical machine grouping, the number of physical machine groups may be larger than the theoretical lower limit $m_0$.

Figure 19:
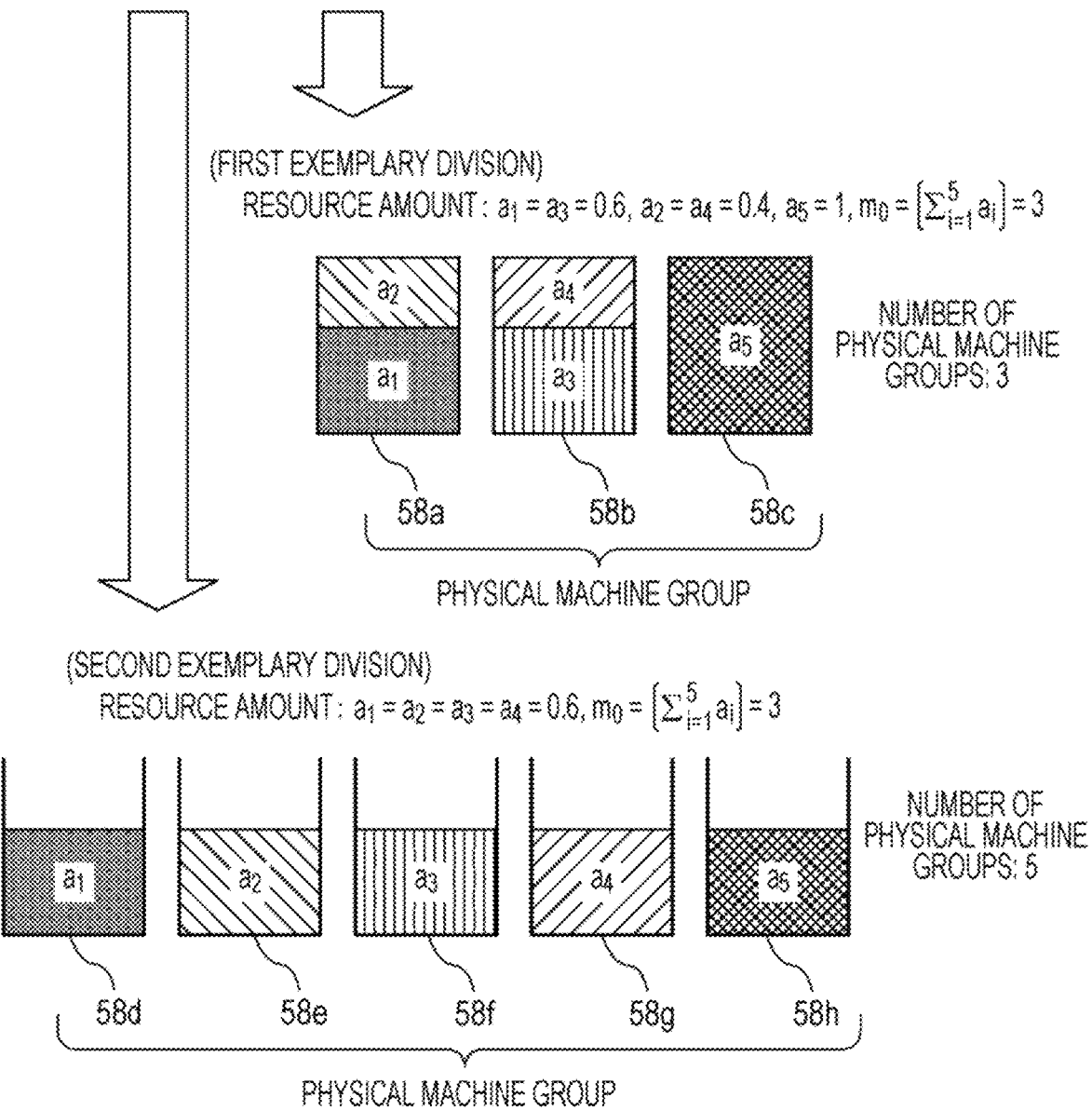
FIG. 19 is a diagram illustrating a relationship between a theoretical lower limit of the number of divisions of a physical machine set and the number of physical machine groups.

FIG. 19 is a diagram illustrating a relationship between the theoretical lower limit of the number of divisions of the physical machine set and the number of physical machine groups. In the example of FIG. 19, attention is focused on only one type of resource amount.

In the first division example, the resource amount of each of the five physical machines $\{a_1, a_2, a_3, a_4, a_5\}$ is "0.6, 0.4, 0.6, 0.4, 1". The total amount of resources is "3", and the theoretical lower limit $m_0$ of the number of divisions is "3". In this case, all the physical machines may be allocated to the three physical machine groups 58a to 58c so that the total resource amount of the physical machines belonging to the three physical machine groups 58a to 58c does not exceed the capacity "1". In each of the physical machine groups 58a to 58c, the total resource amount of the allocated physical machines is equal to the capacity "1". Therefore, the number of physical machine groups may not be reduced any more, and the number of physical machine groups is equal to the theoretical lower limit value.

In the second division example, the resource amounts of the five physical machines $\{a_1, a_2, a_3, a_4, a_5\}$ are "0.6, 0.6, 0.6, 0.6, 0.6". The total amount of resources is "3", and the theoretical lower limit $m_0$ of the number of divisions is "3". Only one physical machine may be allocated to one physical machine group. Therefore, five physical machines are distributed to five physical machine groups from 58d to 58h. That is, the actual number of physical machine groups "5" is larger than the theoretical lower limit "3".

The management server 100 may suppress the occurrence of useless grouping process by starting to try physical machine grouping from the theoretical lower limit $m_0$ of the number of divisions of physical machines, and may improve the processing efficiency.

Hereinafter, detailed description is given of a maintenance scheduling process performed by the management server 100.

Figure 20:
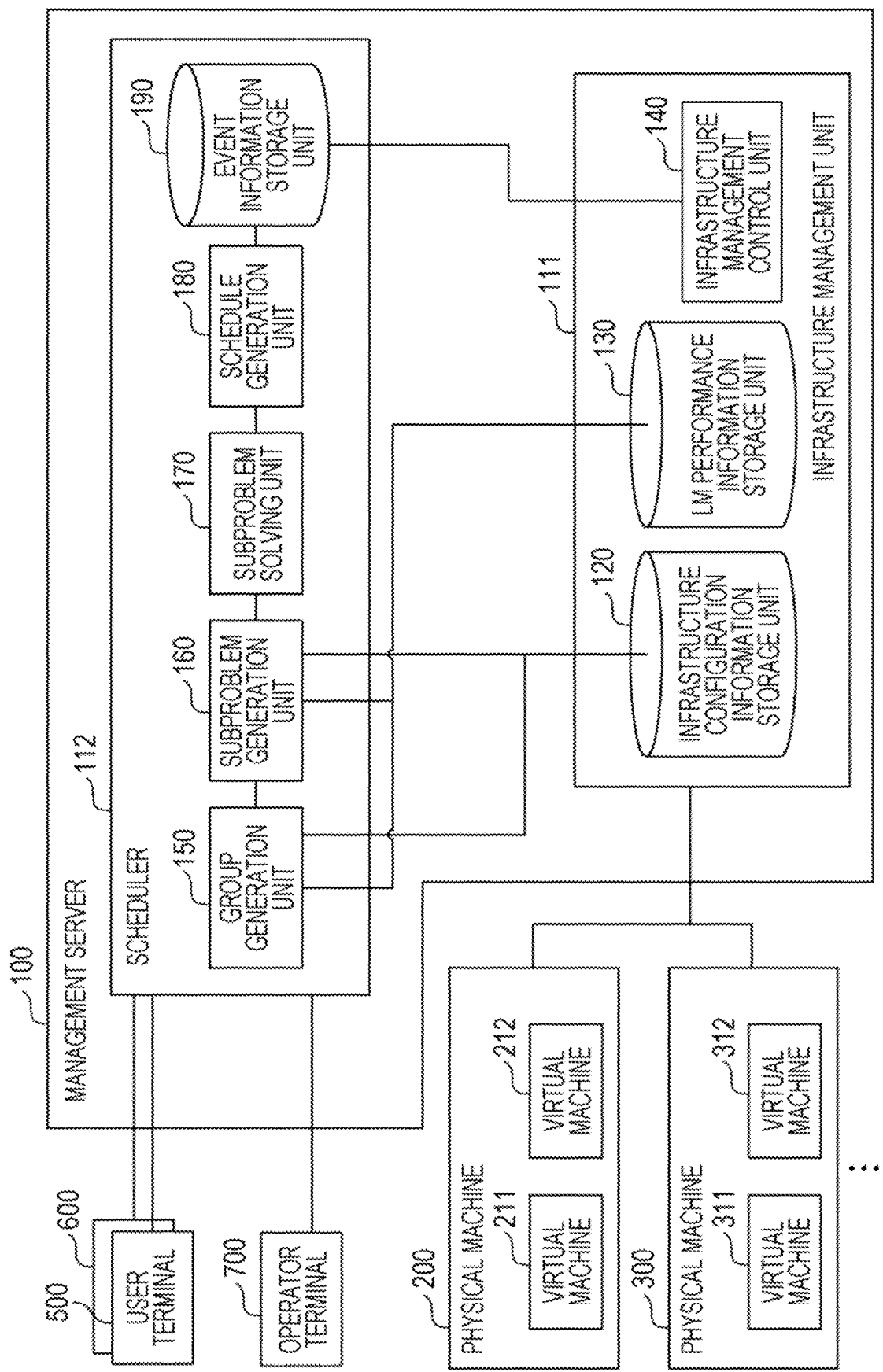
FIG. 20 is a diagram illustrating an exemplary function of the management server.

FIG. 20 is a diagram illustrating an exemplary function of the management server. The management server 100 includes an infrastructure management unit 111 and a scheduler 112. Functions of the infrastructure management unit 111 and the scheduler 112 are achieved by the processor 101. For example, the processor 101 achieves the functions of the infrastructure management unit 111 and the scheduler 112 by executing predetermined computer programs stored in the RAM 102. Alternatively, the infrastructure management unit 111 and the scheduler 112 may be each achieved by a hard wired logic such as an FPGA or an ASIC.

The infrastructure management unit 111 manages the hardware configuration of each physical machine and the configuration of resources allocated to each virtual machine. For example, the physical machine 200 includes virtual machines 211 and 212. The physical machine 300 includes virtual machines 311 and 312.

The infrastructure management unit 111 includes an infrastructure configuration information storage unit 120, a VM performance information storage unit 130, and an infrastructure management control unit 140. The infrastructure configuration information storage unit 120 and the VM performance information storage unit 130 are achieved by using, for example, storage regions of the RAM 102 and the HDD 103.

The infrastructure configuration information storage unit 120 stores infrastructure configuration information. The infrastructure configuration information is information related to the hardware configuration of each physical machine and the configuration of resources allocated to each virtual machine.

The VM performance information storage unit 130 stores VM performance information. The VM performance information is information related to the performance of the virtual machine, and includes information related to LM turnaround time for each virtual machine. The VM performance information may include a load history of each virtual machine (load history of each virtual machine at each past time) used for obtaining a prediction result of the LM turnaround time. LM turnaround time prediction based on the history of a load on each virtual machine may be performed by the management server 100.

The infrastructure management control unit 140 instructs virtual-machine LM to each physical machine in accordance with an LM schedule determined by the scheduler 112.

When physical-machine maintenance is to be performed, the scheduler 112 determines a schedule of LM and maintenance work for any virtual machine operating on a physical machine as a maintenance target. When having received a maintenance execution duration information from the operator terminal 700, the scheduler 112 determines an LM schedule based on information stored in the infrastructure configuration information storage unit 120 and the VM performance information storage unit 130.

The scheduler 112 includes a group generation unit 150, a subproblem generation unit 160, a subproblem solving unit 170, a schedule generation unit 180, and an event information storage unit 190. The event information storage unit 190 are achieved by using, for example, storage regions of the RAM 102 and the HDD 103.

The event information storage unit 190 stores information on the LM schedule for virtual machines and maintenance work schedule for physical machines.

The group generation unit 150 generates a physical machine group and a time group for dividing a maintenance scheduling problem of the entire system into subproblems. For example, the group generation unit 150 determines the number of divisions of the time set, and generates a time group by dividing the time set by the determined number of divisions. The group generation unit 150 determines the number of divisions of the physical machine set, and generates a physical machine group by dividing the physical machine set by the determined number of divisions. Note that the group generation unit 150 tries to group physical machines in ascending order of the number of divisions for the number of divisions of the physical machine set. The group generation unit 150 sets the minimum number of divisions in which the physical machine group that may not satisfy constraints for all the time groups does not occur as the final number of divisions.

The subproblem generation unit 160 divides the maintenance scheduling problem into subproblems based on the determined number of divisions of the physical machine set and the determined number of divisions of the time set.

The subproblem solving unit 170 solves the subproblem generated by the division. A maintenance schedule for each subproblem is generated by solving the subproblem.

The schedule generation unit 180 integrates the solution results of the subproblems to create a maintenance schedule for the entire system. The event information storage unit 190 stores the generated schedule in the schedule generation unit 180.

Further, the scheduler 112 provides information outputted from each element in the scheduler 112 to the operator terminal 700 used by the operator, and receives information to be inputted from the operator terminal 700 to each element in the scheduler 112. For example, the scheduler 112 receives a maintenance execution duration and a maintenance target physical machine from the operator terminal 700. The scheduler 112 transmits the received maintenance execution duration and the maintenance target physical machine to the group generation unit 150. The scheduler 112 also acquires the created schedule from the event information storage unit 190 and transmits the schedule to the operator terminal 700.

Note that the line coupling between the elements illustrated in FIG. 20 represents a part of communication path, and any communication path other than the illustrated communication path may also be set. The function of each element illustrated in FIG. 20 may be achieved, for example, by causing a computer to execute a program module corresponding to the element.

FIG. 21 is a diagram illustrating exemplary maintenance execution duration information. Maintenance execution duration information M1 is transmitted to the management server 100 by the operator terminal 700. In the management server 100, the scheduler 112 receives the maintenance execution duration information M1.

The maintenance execution duration information M1 is information of maintenance execution durations related to a plurality of physical machines included in the system. The maintenance execution duration information M1 includes items of start date and time, end date and time, time group division unit, LM start time, LM end time, maintenance start time, and maintenance end time.

The start date and time of a maintenance execution duration is registered to the item of start date and time. The end date and time of a maintenance execution duration is registered to the item of end date and time. For example, the maintenance execution duration information M1 includes information such as the start date and time of "2018-06-16T00:00:00.000Z" and the end date and time of "2018-06-30T23:59:00.000Z". This indicates that the maintenance execution duration extends from 00:00 on Jun. 16, 2018 to 23:59 on Jun. 30, 2018.

The length of time corresponding to one time group when the time set is divided into a plurality of time groups is registered to the item of time group division unit. For example, the maintenance execution duration information M1 includes information such as a division unit "1 day (24 hours)" of the time group. This indicates that the time set is divided into time groups (Including 24 hours) corresponding to the length of one day.

The start time of the LM executable duration within one time group registered to the item of LM start time. The end time of the LM executable duration within one time group registered to the item of LM end time. For example, the maintenance execution duration information M1 includes information such as LM start time "09:00:00.000Z" and LM end time "11:59:00.000Z". This indicates that the duration from 9:00 to 11:59 in one day is the LM executable duration.

The start time of the maintenance executable duration within one time group is registered to the item of maintenance start time. The end time of the maintenance executable duration within one time group is registered to the item of maintenance end time. For example, the maintenance execution duration information M1 includes information such as the maintenance start time of "12:00:00.000Z" and the maintenance end time of "17:59:00.000Z". This indicates that the duration from 12:00 to 17:59 in one day is the maintenance executable duration.

Maintenance work on one physical machine is performed by using a time range in part of a maintenance execution duration. The management server 100 performs scheduling so that maintenance work on each physical machine is completed during an input maintenance execution duration.

For example, before maintenance work is performed on a first physical machine, the management server 100 migrates all virtual machines on the first physical machine to a second physical machine so that maintenance work is performed on the first physical machine.

FIG. 22 is a diagram illustrating exemplary maintenance target machine information. Maintenance target machine information M2 is transmitted to the management server 100 by the operator terminal 700. In the management server 100, the scheduler 112 receives the maintenance target machine information M2.

The maintenance target machine information M2 includes the item of physical machine name and the item of maintenance turnaround time.

The name of a physical machine is registered to the item of physical machine name. A maintenance turnaround time of the physical machine is registered to the item of maintenance turnaround time. For example, the maintenance target machine information M2 includes information such as the physical machine name "PM01" and the maintenance turnaround time of "02:00:00.000". This indicates that a turnaround time for maintenance work on a physical machine indicated by the physical machine name "PM01" is two hours.

Similarly, the maintenance target machine information M2 registers a physical machine name and a maintenance turnaround time for another physical machine as a maintenance target.

FIG. 23 is a diagram illustrating an exemplary physical machine configuration table. A physical machine configuration table 121 is stored in the infrastructure configuration information storage unit 120 in advance. The physical machine configuration table 121 includes items of physical machine name, the number of CPU cores, memory capacity, and disk capacity.

The name of a physical machine is registered to the item of physical machine name. The number of CPU cores included in the physical machine is registered to the item of the number of CPU cores. The capacity of a memory (RAM) included in the physical machine is registered to the item of memory capacity. The capacity of an HDD included in the physical machine (or an auxiliary storage region allocated to an external storage for the physical machine) is registered to the item of disk capacity.

For example, the physical machine configuration table 121 registers a record with the physical machine name "PM01", the number of CPU cores of "64", the memory capacity of "256 GB", and the disk capacity of "32 TB". This record indicates that the number of CPU cores included in a physical machine indicated by the physical machine name "PM01" is 64, the memory capacity of the physical machine is 256 GB, and the disk capacity thereof is 32 TB.

Similarly, the physical machine configuration table 121 registers a physical machine name, the number of CPU cores, a memory capacity, and a disk capacity for another physical machine.

FIG. 24 is a diagram illustrating an exemplary virtual machine configuration table. A virtual machine configuration table 122 is stored in the infrastructure configuration information storage unit 120 in advance. The virtual machine configuration table 122 includes items of virtual machine name, user identifier (ID), the number of CPU cores, memory capacity, disk capacity, and LM turnaround time.

The name of a virtual machine is registered to the item of virtual machine name. The user ID of a user using this virtual machine is registered to the item of user ID. The number of CPU cores allocated to the virtual machine is registered to the item of the number of CPU cores. The capacity of a memory allocated to the virtual machine is registered to the item of memory capacity. The capacity of an HDD (or an auxiliary storage device of an external storage of the physical machine) allocated to the virtual machine is registered to the item of disk capacity. The time required for LM of the virtual machine is registered to the item of LM turnaround time. The required time set in the item of LM turnaround time is the same as the LM turnaround time indicated by the VM performance information storage unit 130, for example. When the VM performance information storage unit 130 includes a load history of each virtual machine, the LM turnaround time predicted from the load history may be set in the item of LM turnaround time.

For example, the virtual machine configuration table 122 registers a record with the virtual machine name of "accounting-db-13", the user ID of "user1", the number of CPU cores of "2", the memory capacity of "32 GB", the disk capacity of "2 TB", and the LM turnaround time of "16 minutes". This record indicates that the user with the user ID of "user1" is using the virtual machine indicated by the virtual machine name of "accounting-db-13". This record also indicates that the number of CPU cores used for operating the virtual machine is 2, the memory capacity is 32 GB, and the disk capacity is 2 TB. This record further indicates that the time required for the LM of the corresponding virtual machine is 16 minutes.

Similarly, the virtual machine configuration table 122 registers a virtual machine name, a user ID, the number of CPU cores, a memory capacity, a disk capacity, and LM turnaround time for another virtual machine.

FIG. 25 is a diagram illustrating an exemplary virtual machine operation table. A virtual machine operation table 123 is stored in the infrastructure configuration information storage unit 120 in advance. The virtual machine operation table 123 is information indicating a physical machine as an initial disposition target of each virtual machine. The virtual machine operation table 123 includes items of physical machine name, virtual machine name, and user ID.

The name of a physical machine is registered to the item of physical machine name. The name of a virtual machine operating on this physical machine is registered to the item of virtual machine name. The user ID of a user using this virtual machine is registered to the item of user ID.

For example, the virtual machine operation table 123 registers a record with the physical machine name "PM01", the virtual machine name "accounting-db-13", and the user ID of "user1". This record indicates that a virtual machine indicated by the virtual machine name "accounting-db-13" operates on a physical machine indicated by the physical machine name "PM01", and this virtual machine is used by a user with the user ID of "user1".

Similarly, the virtual machine operation table 123 registers the name of a physical machine as a disposition target, a virtual machine name, and a user ID for another virtual machine.

FIG. 26 is a diagram illustrating an exemplary dependency relation table. A dependency relation table 124 is stored in the infrastructure configuration information storage unit 120 in advance. The dependency relation table 124 is. Information indicating a dependency relation in a group of virtual machines. The dependency relation table 124 includes items of group name, virtual machine name, and rule.

The name of a group of virtual machines is registered to the item of group name. A set of the names of virtual machines belonging to the group is registered to the item of virtual machine name. Information indicating whether to operate the virtual machines belonging to the group on an identical physical machine is registered to the item of rule. For example, the rule "anti-affinity" indicates that the virtual machines are not operated on the identical physical machine (referred to as an anti-affinity rule).

For example, the dependency relation table 124 registers a record with the group name of "G01", the virtual machine names of "accounting-db-13" and "accounting-db-03", the rule of "anti-affinity". This record indicates that two virtual machines with the virtual machine names "accounting-db-13" and "accounting-db-03" belong to the group. Indicated by the group name "G01" and these virtual machines are not to be operated on an identical physical machine.

Similarly, the dependency relation table 124 registers a group name, a virtual machine name, and a rule for another group of virtual machines.

Note that the anti-affinity rule may be treated as one of graph coloring problems, for example. That is, the group generation unit 150 may calculate the minimum number of physical machines that may satisfy the anti-affinity rule by using the graph coloring problem solving method.

Figures 27, 28:
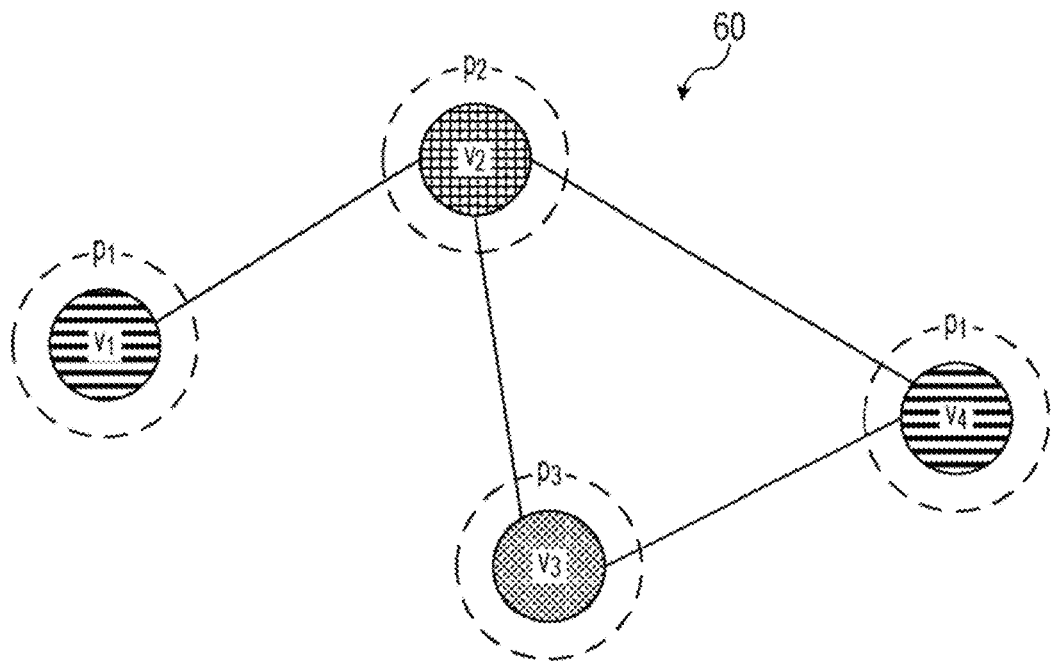
FIG. 27 is a diagram illustrating exemplary application of an anti-affinity rule to a graph coloring problem.
FIG. 28 is a diagram illustrating an exemplary LM turnaround time table.

FIG. 27 is a diagram illustrating exemplary application of the anti-affinity rule to the graph coloring problem. When the anti-affinity group is treated as a graph coloring problem, the virtual machine serves as a vertex in the graph coloring problem. In the example of FIG. 27, virtual machine names ($v_1$, $v_2$, $v_3$, $v_4$) of virtual machines are allocated to the vertices of a graph 60. The edges of the graph 60 couple to virtual machines where anti-affinity rules exist. An example of heuristics of the graph coloring problem for such a graph 60 is the Welsh-Powell algorithm. The heuristics mean an algorithm that may obtain a solution close to a correct answer at a certain level.

When the Welsh-Powell algorithm is used, the group generation unit 150 sorts and colors the vertices in descending order according to the degree (the number of edges coupled to the vertices). According to this algorithm, the maximum number of colors is at most +1 as the maximum degree of the graph.

In the example of FIG. 27, coloring is possible with three colors. Note that, in FIG. 27, the difference in coloring is replaced with the difference in hatching. It may be seen from FIG. 27 that, by operating virtual machines corresponding to the vertices of the same color on the same physical machine, the anti-affinity rule may be satisfied with at least three physical machines ($p_1$, $p_2$, $p_3$).

Next, the VM performance information stored in the VM performance information storage unit 130 will be described. For example, the VM performance Information storage unit 130 stores an LM turnaround time table representing VM performance in terms of LM turnaround time.

FIG. 28 is a diagram illustrating an exemplary LM turnaround time table. An LM turnaround time table 131 is stored in the VM performance information storage unit 130 in advance. The LM turnaround time table 131 includes items of virtual machine name and LM turnaround time.

The name of a virtual machine is registered to the item of virtual machine name. An LM turnaround time predicted for the corresponding virtual machine at the time is registered to the item of LM turnaround time.

For example, the LM turnaround time table 131 registers a record with the virtual machine name of "server-90" and the LM turnaround time of "00:04:00.000". This record indicates that the LM turnaround time is 4 minutes when LM of a virtual machine having the virtual machine name of "server-90" is completed.

The LM turnaround time table 131 also registers a record with the virtual machine name of "accounting-db-03" and the LM turnaround time of "00:08:00.000". This record indicates that the LM turnaround time is 8 minutes when LM of a virtual machine having the virtual machine name of "accounting-db-03" is completed.

Similarly, the LM turnaround time table 131 registers a virtual machine name and an LM turnaround time for another virtual machine.

Next, LM execution avoidance date and time information indicating the LM execution avoidance date and time specified by the user will be described.

FIG. 29 is a diagram illustrating an exemplary LM execution avoidance date and time information. LM execution avoidance date and time Information M3 is input to the scheduler 112 by the user terminals 500 and 600. The LM execution avoidance date and time information M3 includes items of virtual machine name, start date and time, and end date and time.

The name of a virtual machine is registered to the item of virtual machine name. The start date and time of a duration (LM execution avoidance duration) in which LM execution is avoided is registered to the item of start date and time. The end date and time of the LM execution avoidance duration is registered to the item of end date and time. For example, the LM execution avoidance date and time information M3 includes information such as the virtual machine name of "mysql-67", the start date and time of "2018-06-20T11:50:00.000Z", and the end date and time of "2018-06-20T17:59:00.000Z". This indicates that the LM execution avoidance duration of a virtual machine having the virtual machine name of "mysql-67" extends from 11:50 on Jun. 20, 2018 to 17:59 on Jun. 20, 2018.

Similarly, the LM execution avoidance date and time information M3 may include a virtual machine name, start date and time, and end date and time for another virtual machine.

FIG. 30 is a diagram illustrating exemplary time group information. The time group information M4 is generated by the subproblem generation unit 160. The subproblem generation unit 160 transmits the generated time group information M4 to the subproblem solving unit 170. The subproblem solving unit 170 stores the received time group information M4 in a memory, and solves the subproblem based on the time group information M4. The time group information M4 includes items of group number, start time, and end time.

The identification number of the time group is registered to the item of group number. The start time of a time slot corresponding to this time group is registered to the item of start time. The end time of the time slot corresponding to this time group is registered to the item of end time. For example, the time group information M4 includes information such as the group number of "0", the start time of "2018-06-16T00:00:00.000Z", and the end time of "2018-06-16T23:59:00.000Z". This indicates that the time group having the group number of "0" includes a time generated by discretization from 00:00 on Jun. 16, 2018 to 23:59 on Jun. 16, 2018.

Similarly, the time group information M4 may include a group number, start time, and end time for another time group.

Figure 31:
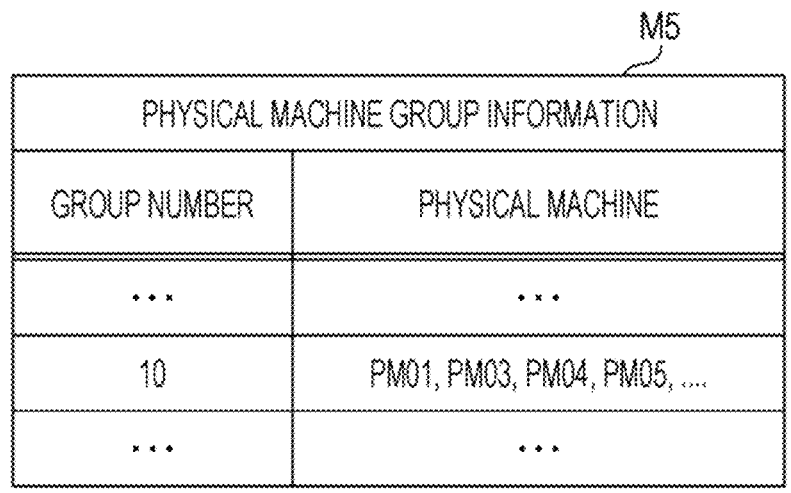
FIG. 31 is a diagram illustrating exemplary physical machine group information.

FIG. 31 is a diagram Illustrating exemplary physical machine group information. Physical machine group information M5 is generated by the subproblem generation unit 160. The subproblem generation unit 160 transmits the generated physical machine group information M5 to the subproblem solving unit 170. The subproblem solving unit 170 stores the received physical machine group information M5 in a memory, and solves the subproblem based on the physical machine group information M5. The physical machine group information M5 includes items of group number and physical machine.

The identification number of the physical machine group is registered to the item of group number. The physical machine names of physical machines belonging to this physical machine group are registered to the item of physical machine. For example, the physical machine group information M5 includes information such as the group number of "10" and the physical machines of "PM01, PM03, PM04, PM05, . . . ". This indicates that the physical machine group with the group number of "10" includes physical machines corresponding to the physical machine names "PM01, PM03, PM04, PM05, . . . ".

Similarly, the physical machine group information M5 may include a group number and physical machines for another physical machine group.

Figure 32:
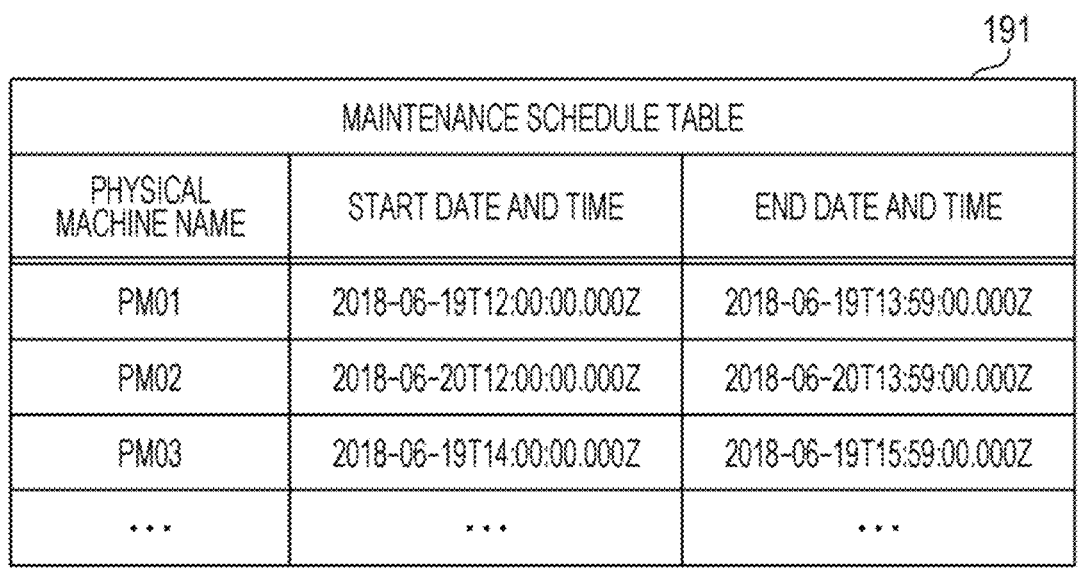
FIG. 32 is a diagram illustrating an exemplary maintenance schedule table.

FIG. 32 is a diagram illustrating an exemplary maintenance schedule table. A maintenance schedule table 191 is generated by the schedule generation unit 180 and stored in the event information storage unit 190. The maintenance schedule table 191 includes items of physical machine name, start date and time, and end date and time.

The name of a physical machine as a maintenance target is registered to the item of physical machine name. The start date and time of maintenance of the physical machine is registered to the item of start date and time. The end date and time of maintenance of the physical machine is registered to the item of end date and time.

For example, the maintenance schedule table 191 registers a record with the physical machine name of "PM01", the start date and time of "2018-06-19T12:00:00.000Z", and the end date and time of "2018-06-19T13:59:00.000Z". This record indicates that maintenance of a physical machine having the physical machine name "PM01" is scheduled to be performed between 12:00 and 13:59 on Jun. 19, 2018.

Similarly, the maintenance schedule table 191 registers a physical machine name, start date and time, and end date and time for another physical machine as a maintenance target.

FIG. 33 is a diagram illustrating an exemplary LM schedule table. An LM schedule table 192 is generated by the schedule generation unit 180 and stored in the event information storage unit 190. The LM schedule table 192 includes items of virtual machine name, start date and time, end date and time, migration source, and migration destination.

The name of a virtual machine as an LM target is registered to the item of virtual machine name. The start date and time of LM of the virtual machine is registered to the item of start date and time. The end date and time of LM of the virtual machine is registered to the item of end date and time. The name (physical machine name) of a physical machine as an LM migration source is registered to the item of migration source. The name (physical machine name) of a physical machine as an LM migration destination is registered to the item of migration destination.

For example, the LM schedule table 192 registers a record with the virtual machine name of "server-90", the start date and time of "2018-06-20T11:06:00.000Z", the end date and time of "2018-06-20T11:09:00.000Z", the migration source of "PM02", and the migration destination of "PM01". This record indicates that LM of the virtual machine with the virtual machine name of "server-90" starts at 11:06 on Jun. 20, 2018 and ends at 11:09 on Jun. 20, 2018. The record also indicates that the migration source of the LM is the physical machine with the physical machine name of "PM02" and the migration destination is the physical machine with the physical machine name of "PM01".

The LM schedule table 192 also registers a virtual machine name, start date and time, end date and time, a migration source, and a migration destination for another virtual machine.

The contents of the items of virtual machine name, start date and time, and end date and time in the LM schedule table 192 are presented to the user. The contents of the items of virtual machine name, the item of start date and time, end date and time, migration source, and migration destination in the LM schedule table 192 are presented to the operator.

The following describes the procedure of processing performed by the management server 100.

Figure 34:
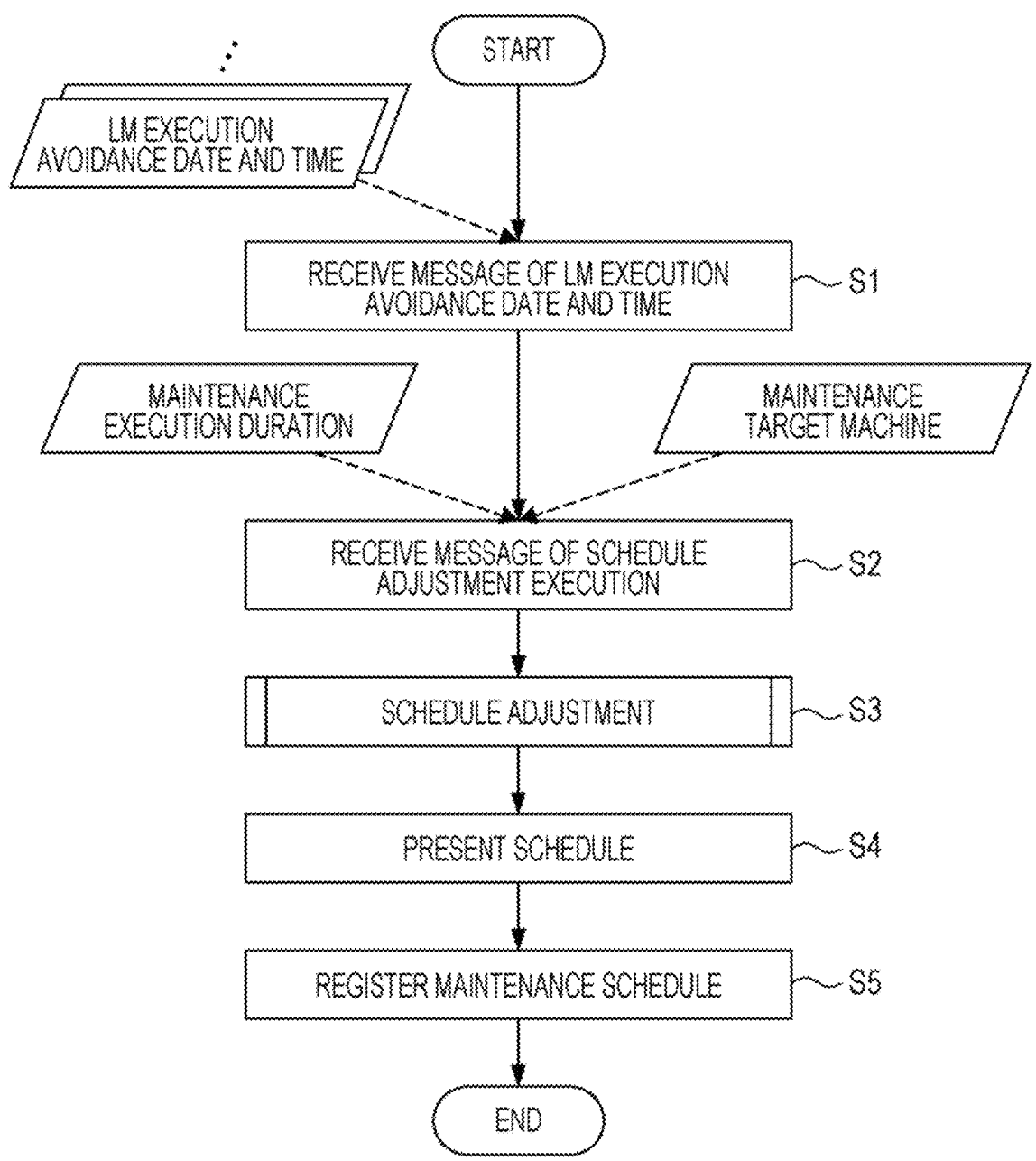
FIG. 34 is a flowchart illustrating exemplary processing at the management server.

FIG. 34 is a flowchart illustrating exemplary processing performed by the management server. The processing illustrated in FIG. 34 will be described below with reference to step numbers.

(S1) The scheduler 112 receives a message indicating the VM execution avoidance date and time from the user terminals 500 and 600 used by all users. This message includes LM execution avoidance date and time Information M3.

(S2) The scheduler 112 receives a message Indicating schedule adjustment execution from the operator terminal 700 used by the operator. This message includes maintenance execution duration information M1 and maintenance target machine information M2.

(S3) The scheduler 112 executes a maintenance schedule adjustment process. The schedule adjustment process will be described in detail later. As a result of schedule adjustment, the scheduler 112 creates a maintenance schedule table 191 for each physical machine and an LM schedule table 192 for each virtual machine.

(S4) The scheduler 112 presents a maintenance schedule to the user and the operator. Specifically, the scheduler 112 creates, for each user, screen information indicating the LM execution date and time of the virtual machine used by the user, based on the maintenance schedule table 191 and the LM schedule table 192. The scheduler 112 transmits the created screen information to the user terminal of the corresponding user. Note that the scheduler 112 may identify the user who uses each virtual machine, by the item of user ID in the virtual machine configuration table 122 or the virtual machine operation table 123.

The scheduler 112 also creates screen information indicating an LM schedule for each virtual machine and a maintenance work schedule for the physical machines, based on the maintenance schedule table 191 and the LM schedule table 192. The scheduler 112 transmits the created screen information to the operator terminal 700.

(S5) The scheduler 112 registers the generated maintenance schedule to the infrastructure management unit 111. Specifically, the scheduler 112 sets the infrastructure management unit 111 to perform LM for each virtual machine according to the schedule indicated by the LM schedule table 192.

The infrastructure management unit 111 instructs the physical machines 200, 300, 400, . . . to perform LM of each virtual machine according to the schedule. That is, based on the created LM schedule table 192 (schedule information), the management server 100 instructs the maintenance target physical machine to perform LM (migration) of the corresponding virtual machine. Thus, the maintenance work of the physical machine by the operator may be made more efficient.

Figure 35:
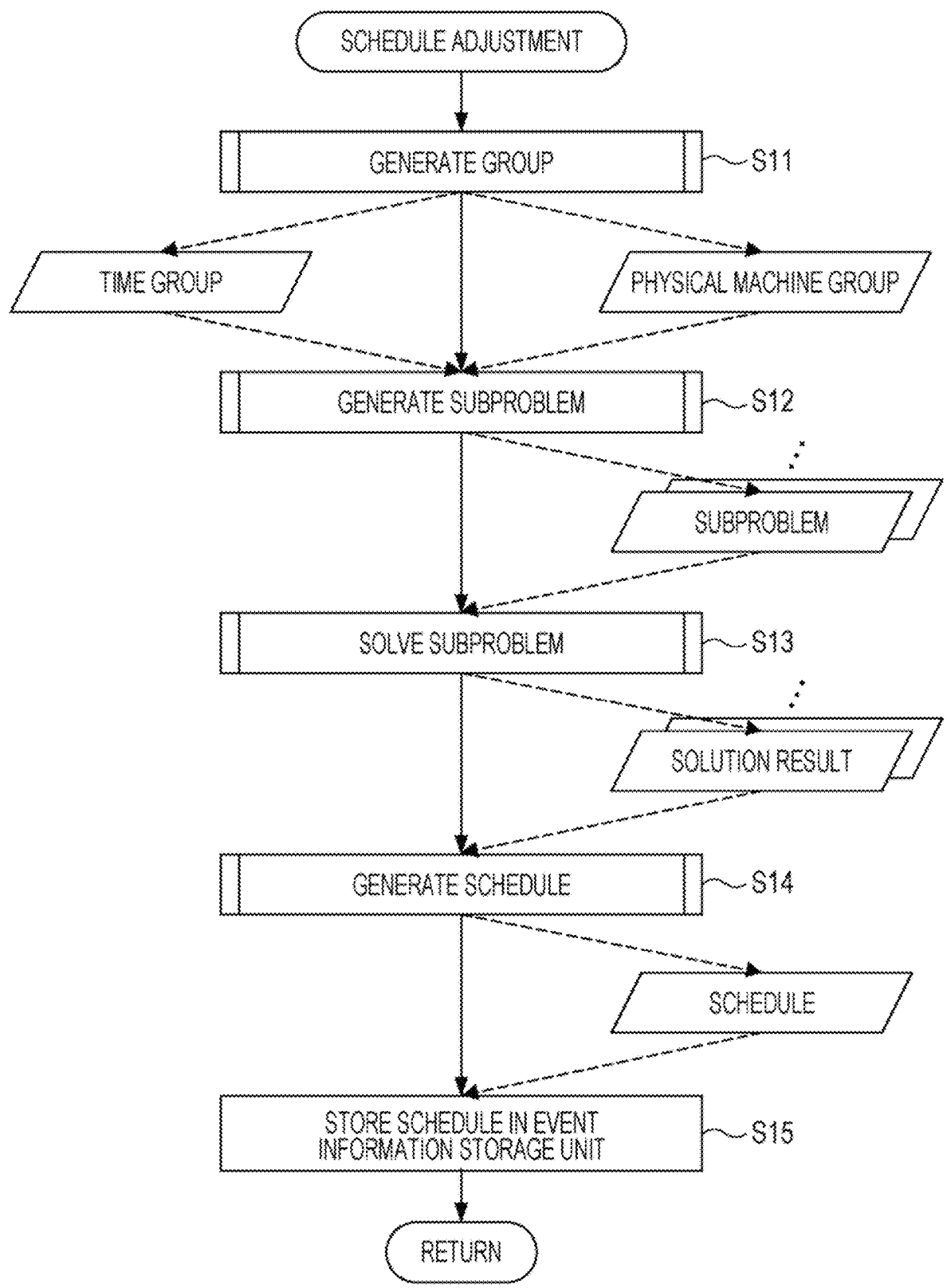
FIG. 35 is a flowchart illustrating exemplary schedule adjustment.

FIG. 35 is a flowchart illustrating exemplary schedule adjustment. The processing illustrated in FIG. 35 will be described below with reference to step numbers. A procedure described below corresponds to Step S3 in FIG. 34.

(S11) The group generation unit 150 groups the physical machine set and the time set to generate time group information M4 and physical machine group information M5. The group generation process will be described in detail later. The group generation unit 150 outputs the generated time group information M4 and physical machine group information M5.

(S12) The subproblem generation unit 160 divides the maintenance scheduling problem based on the time group information M4 and the physical machine group information M5 to generate a plurality of subproblems. The subproblem generation process will be described in detail later. The subproblem generation unit 160 outputs the generated plurality of subproblems.

(S13) The subproblem solving unit 170 calculates a maintenance schedule for each of the generated subproblems. The subproblem solving process will be described in detail later. The subproblem solving unit 170 outputs a solution result for each subproblem.

(S14) The schedule generation unit 180 generates a maintenance schedule for the entire system based on the solution result for each subproblem. The schedule generation process will be described in detail later. The generated schedule includes a maintenance schedule table 191 and an LM schedule table 192.

(S15) The schedule generation unit 180 stores the generated schedule in the event information storage unit 190.

Figure 36:
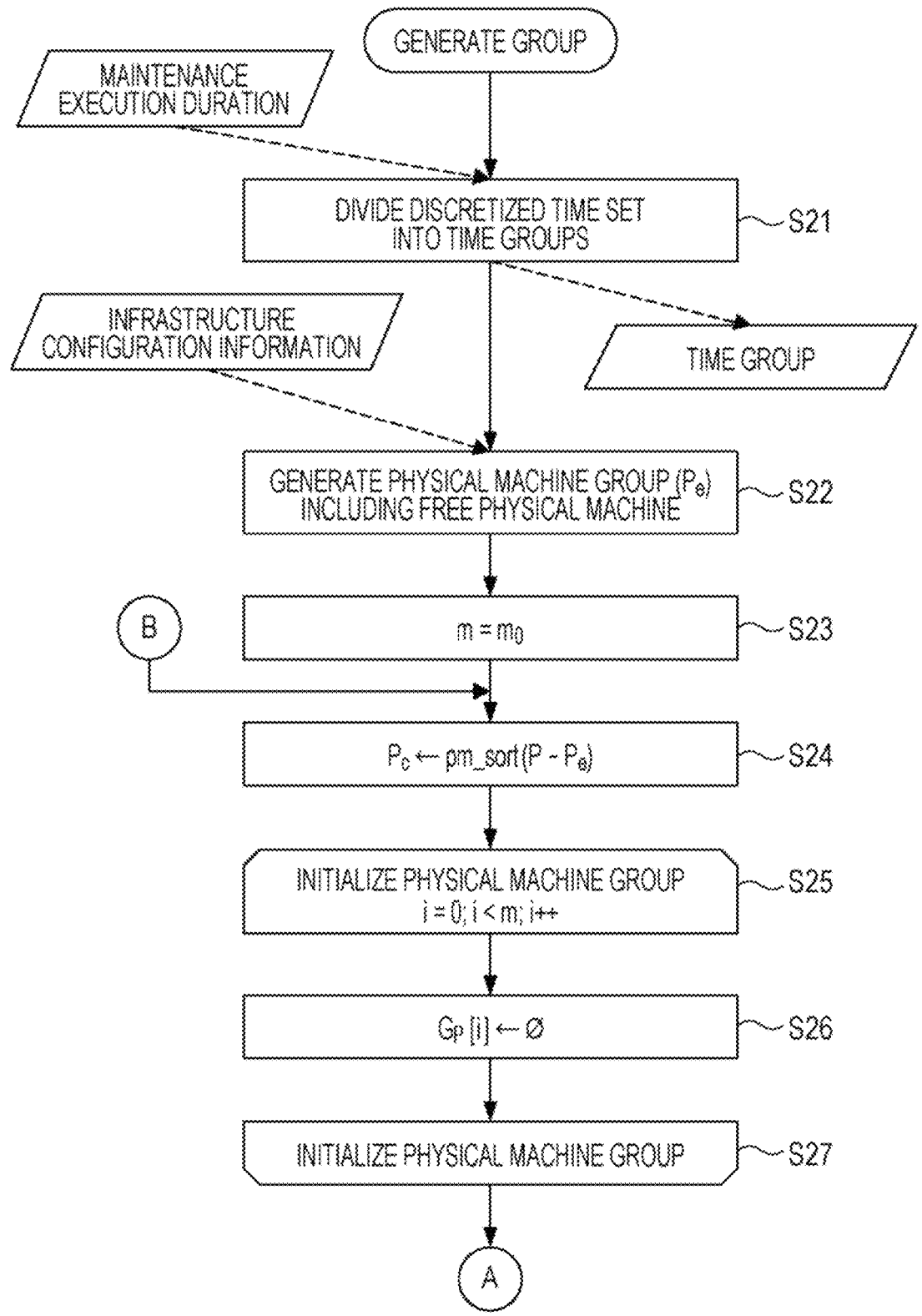
FIG. 36 is the first half of a flowchart illustrating exemplary generation of a group.

FIG. 36 is the first half of a flowchart illustrating exemplary generation of a group. The processing illustrated in FIG. 36 will be described below with reference to step numbers. A procedure described below corresponds to Step S11 in FIG. 35.

(S21) The group generation unit 150 divides a time set (for example, by the minute) obtained by discretizing the maintenance execution duration with a predetermined interval (for example, one minute Interval) into time groups. For example, the group generation unit 150 divides the duration from the start date and time to the end date and time of maintenance indicated by the maintenance execution duration information M1 into a period of a length indicated by the division unit of the time group. The group generation unit 150 generates a time group for each time generated by division. The group generation unit 150 includes, in each generated time group, a time generated by discretization within a period corresponding to the time group.

(S22) The group generation unit 150 generates a physical machine group ($P_e$) Including empty physical machines, based on the infrastructure configuration information. For example, the group generation unit 150 identifies empty physical machines on which no virtual machines are operating, based on the virtual machine operation table 123. The group generation unit 150 selects a predetermined number of physical machines from the empty physical machines, and generates a physical machine group ($P_e$) including the selected physical machines.

(S23) The group generation unit 150 sets the theoretical lower limit $m_0$ of the number of divisions to a variable m indicating the number of divisions of the remaining physical machine groups. Note that the group generation unit 150 calculates the theoretical lower limit $m_0$ of the number of divisions according to the following equation, taking into consideration that the physical machine group ($P_e$) including empty physical machines has already been generated.

$$m_0 = \max(\lceil \Sigma_{p \in P-P_e} a_{i,1} \rceil, \lceil \Sigma_{p \in P-P_e} a_{i,2} \rceil, \ldots, \lceil \Sigma_{p \in P-P_e} a_{i,D} \rceil) \quad (5)$$

That is, the group generation unit 150 replaces the entire physical machine set P represented in Equation (4) with a set of physical machines that are not included in the generated physical machine group ($P_e$), and performs the same calculation as Equation (4).

(S24) The group generation unit 150 sorts the identifiers of physical machines not included in the physical machine group ($P_e$). The group generation unit 150 registers the array of the sorted physical machine identifiers to a list $P_c$. The sorting priority order is, for example, the order of (first criterion) length of time to avoid LM execution (descending order), (second criterion) resource amount (number of CPU cores, memory amount, and the like) (descending order).

(S25) The group generation unit 150 performs a physical machine group initialization process. Specifically, the group generation unit 150 assigns the numbers 0 to m−1 to each of the m physical machine groups to be newly generated. The group generation unit 150 increments the variable i by 1 from 0 every time the process of Step S26 is executed, and terminates the physical machine group initialization process when the value of i reaches m or more.

(S26) The group generation unit 150 sets the i-th physical machine group $G_P$ [i] as an empty set.

(S27) The group generation unit 150 repeatedly executes the process of Step S26 m times, and advances the process to Step S31 (see FIG. 37) upon completion of the initialization of all the m physical machine groups to be newly generated.

The physical machine group generated in Steps S25 to S27 is a temporary physical machine group. If allocation of all physical machines to the created temporary physical machine group has failed, the number is increased to recreate the temporary physical machine group. When all the physical machines may be allocated to the created temporary physical machine group, the temporary physical machine group becomes the final physical machine group.

Figure 37:
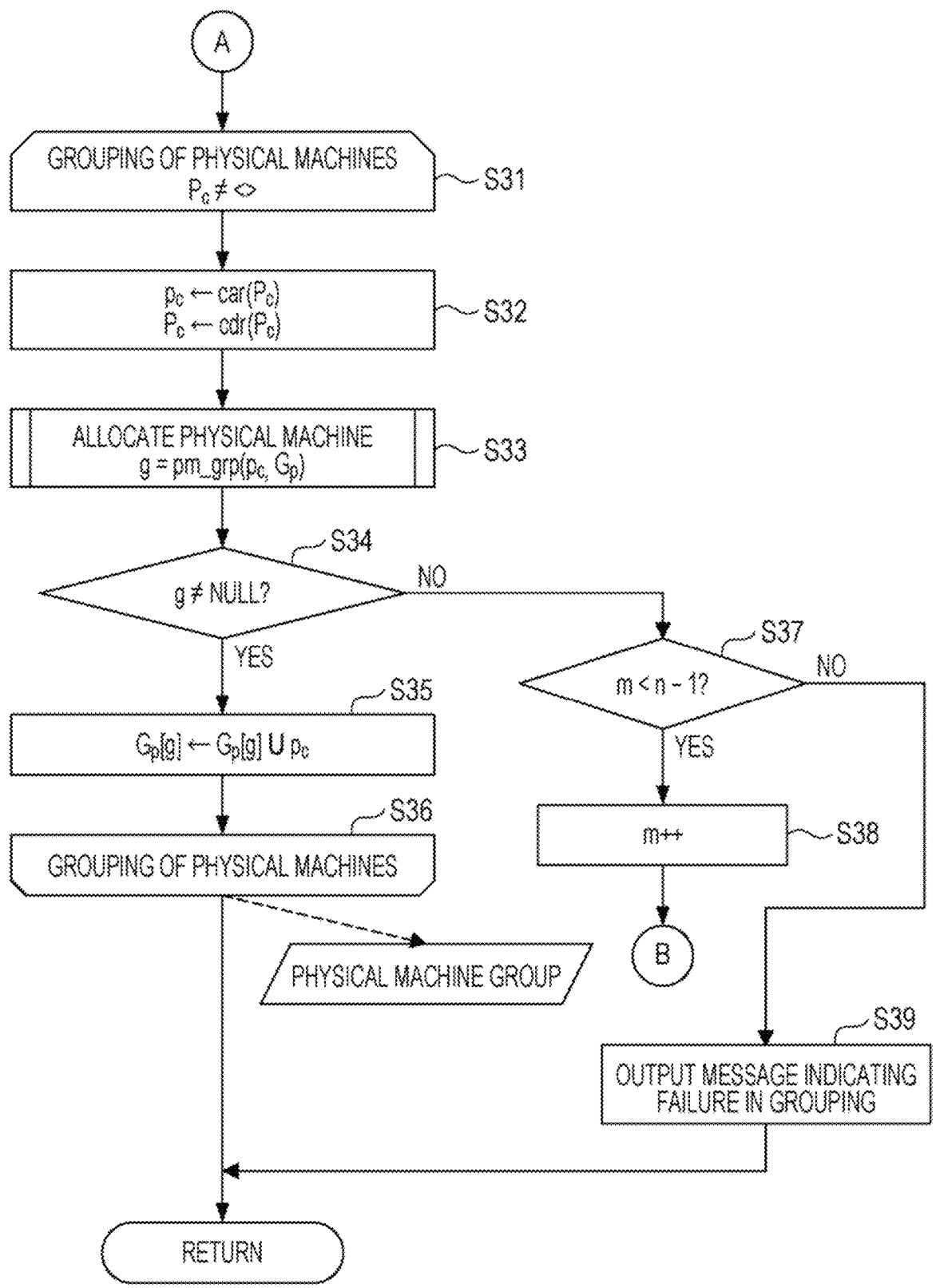
FIG. 37 is the second half of the flowchart illustrating exemplary generation of a group.

FIG. 37 is the second half of the flowchart illustrating exemplary generation of a group. The processing illustrated in FIG. 37 will be described below with reference to step numbers.

(S31) The group generation unit 150 performs a physical machine grouping process. Specifically, the group generation unit 150 repeats the processing of Steps S32 to S36 until there is no physical machine identifier in the list $P_c$ or NO is determined in Step S34.

(S32) The group generation unit 150 sets the identifier of the first physical machine in the list $P_c$ to $p_c$ ($p_c \leftarrow \text{car}(P_c)$). The group generation unit 150 newly sets identifiers of physical machines other than the first physical machine in the list $P_c$ as elements of the list $p_c$ ($P_c \leftarrow \text{cdr}(P_c)$). Thus, the first element is excluded from the list $P_c$.

(S33) The group generation unit 150 allocates the physical machine corresponding to the identifier set in $p_c$ to the physical machine group (g=pm_grp ($p_c$, $G_P$)). The physical machine allocation process will be described in detail later. The number of the physical machine group that is the allocation destination in the allocation process is set to a variable g.

(S34) The group generation unit 150 determines whether or not a value is set for the variable g. When any value is set for the variable g (g≠NULL), the group generation unit 150 advances the processing to Step S35. When no value is set for the variable g (g=NULL), the group generation unit 150 advances the processing to Step S37.

(S35) The group generation unit 150 adds the identifier $p_c$ of the allocation target physical machine to the allocation destination physical machine group $G_p$ [g] ($G_p$ [g]←$G_p$ [g]∪$p_c$).

(S36) The group generation unit 150 outputs a physical machine group when there is no more physical machine identifier in the list $P_c$. When the allocation destination physical machine group may be determined for all the physical machines not included in the physical machine group ($P_e$) of the empty physical machines, it is determined in Step S36 that there is no more physical machine identifier in the list $P_c$. Thereafter, the group generation unit 150 terminates the group generation process.

(S37) When no value is set for the variable g, the group generation unit 150 determines whether the value of the variable m is smaller than the number of divisions n−1 of the time set. When the value of the variable m is smaller than the number of divisions n−1 of the time set, the group generation unit 150 advances the processing to Step S38. On the other hand, when the value of the variable m is equal to or greater than the number of divisions n−1 of the time set, the group generation unit 150 advances the processing to Step S39.

(S38) The group generation unit 150 increments the value of the variable m by 1, and advances the processing to Step S24 (see FIG. 36).

(S39) The group generation unit 150 outputs a grouping failure message and terminates the grouping process. In this case, the schedule adjustment process ends in error without performing the processing of Steps S12 to S15 in FIG. 35.

Figure 38:
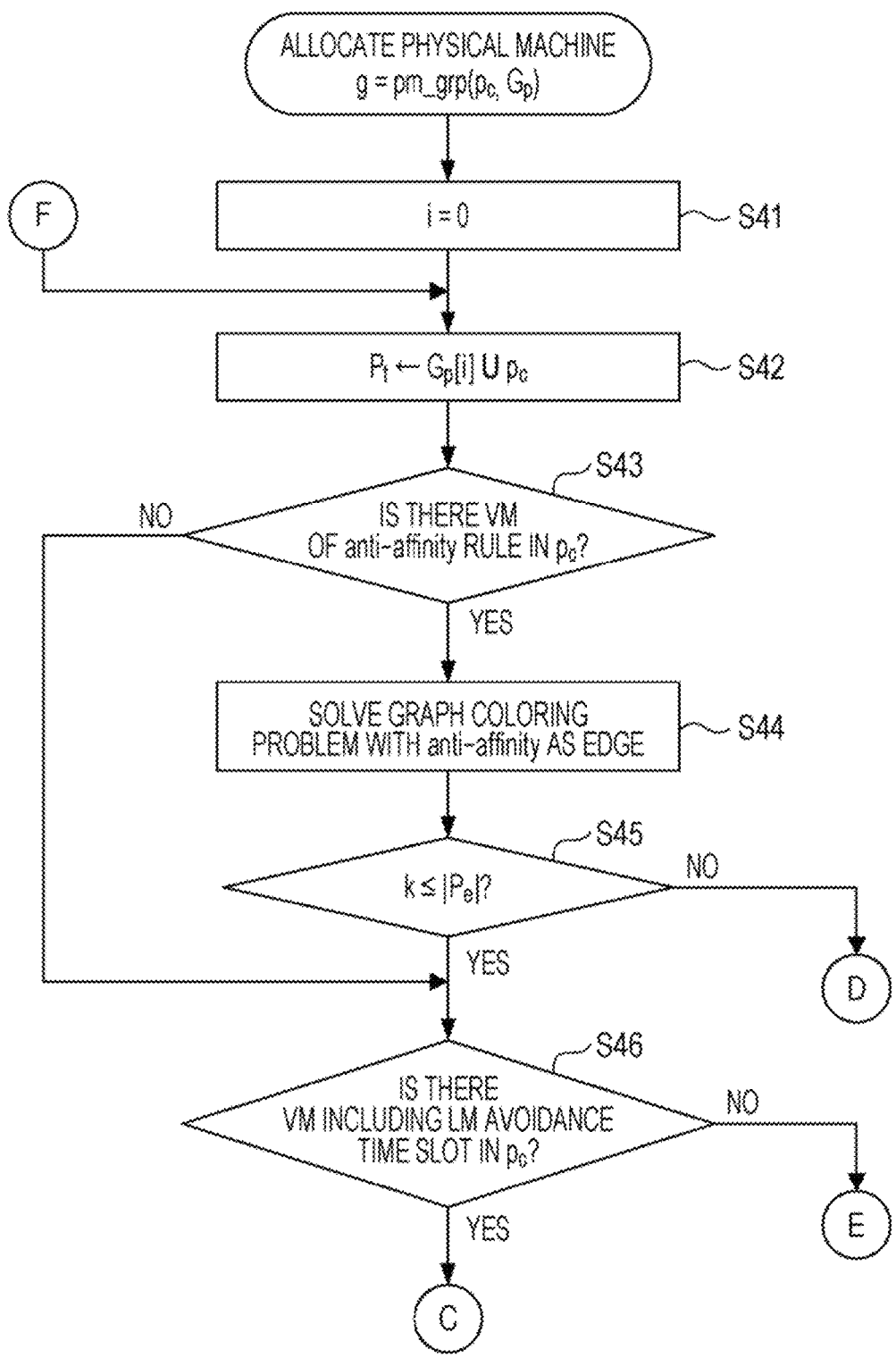
FIG. 38 is the first half of a flowchart illustrating exemplary allocation of physical machines.

FIG. 38 is the first half of a flowchart illustrating exemplary allocation of physical machines. The processing illustrated in FIG. 38 will be described below with reference to step numbers.

(S41) The group generation unit 150 sets an initial value "0" to the variable i.

(S42) The group generation unit 150 registers the identifiers of the physical machines included in the i-th physical machine group $G_p$ [i] and the identifier $p_c$ of the allocation target physical machine as elements of the set $P_t$ of physical machines ($P_t$←$G_p$ [i]∪$p_c$).

(S43) The group generation unit 150 determines whether or not a virtual machine (VM) to which the anti-affinity rule is applied exists in the physical machine indicated by the identifier of $p_c$. For example, the group generation unit 150 acquires the virtual machine name of the virtual machine to which the anti-affinity rule is applied from the dependency relation table 124. The group generation unit 150 refers to the virtual machine operation table 123 to determine whether or not at least one of the acquired virtual machine names is registered as the virtual machine name of the virtual machine operating on the allocation target physical machine. When the acquired virtual machine name is registered, the group generation unit 150 determines that there is a virtual machine to which the anti-affinity rule is applied. When the corresponding virtual machine exists, the group generation unit 150 advances the processing to Step S44. When there is no corresponding virtual machine, the group generation unit 150 advances the processing to Step S46.

(S44) The group generation unit 150 generates a graph coloring problem with anti-affinity as an edge for the virtual machines in the set $P_t$, and solves the generated graph coloring problem. By solving the problem, a chromatic number k of the graph coloring problem is obtained. That is, a minimum number k of physical machines (k is an Integer of 2 or more) to satisfy the anti-affinity rule is obtained.

(S45) The group generation unit 150 determines whether or not the number k of physical machines obtained by solving the graph coloring problem is equal to or less than the number of physical machines ($|P_e|$) in the physical machine group of the empty physical machines. The group generation unit 150 advances the processing to Step S46 when k is equal to or smaller than $|P_e|$. On the other hand, when k is greater than $|P_e|$, the group generation unit 150 advances the processing to Step S57 (see FIG. 39).

(S46) The group generation unit 150 determines whether or not there is a virtual machine including the LM avoidance time slot in the physical machine indicated by the identifier of $p_c$. When the corresponding virtual machine exists, the group generation unit 150 advances the processing to Step S51 (see FIG. 39). When there is no corresponding virtual machine, the group generation unit 150 advances the processing to Step S55 (see FIG. 39).

Figure 39:
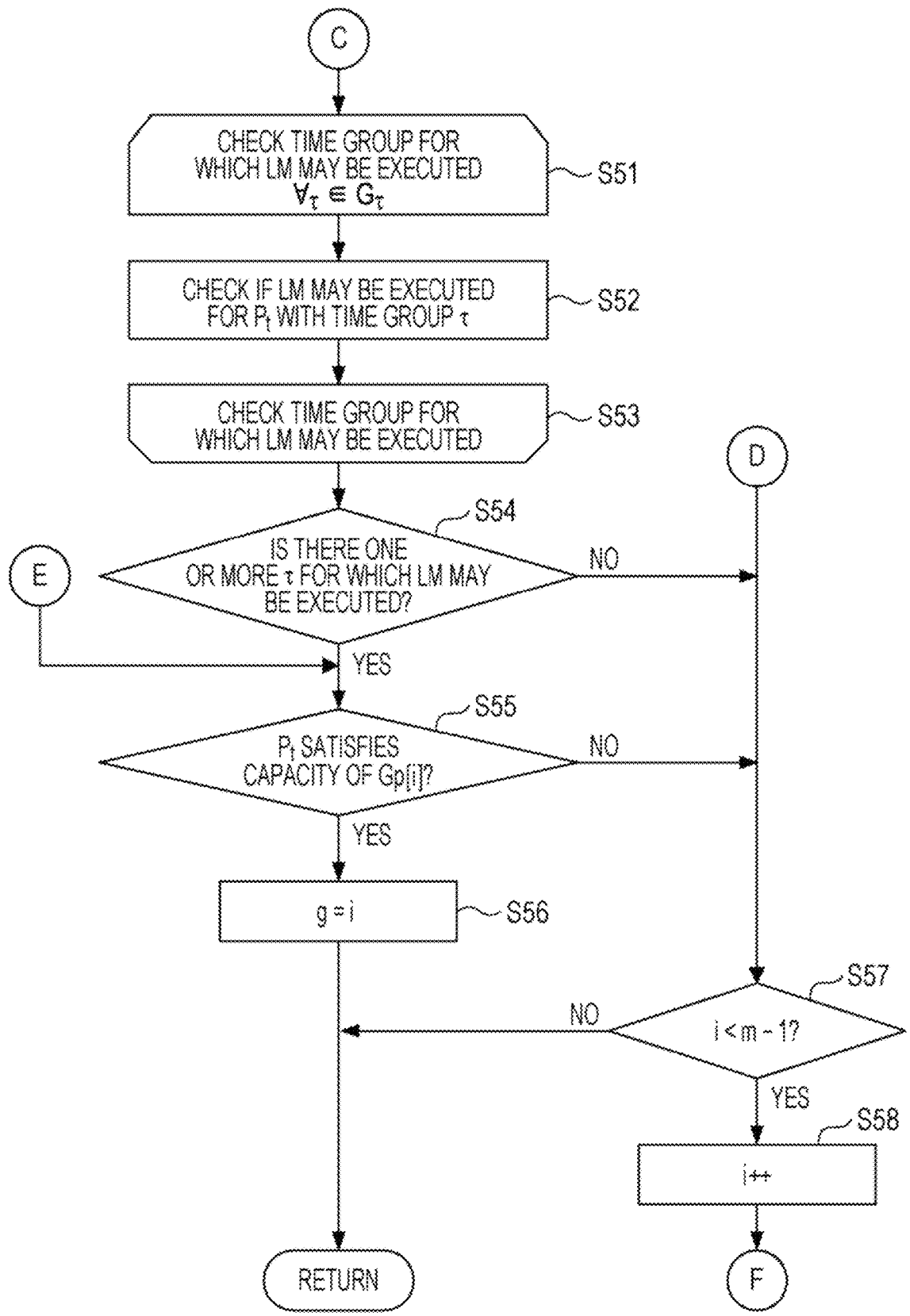
FIG. 39 is the second half of the flowchart illustrating exemplary allocation of physical machines.

FIG. 39 is the second half of the flowchart Illustrating exemplary allocation of physical machines. The processing illustrated in FIG. 39 will be described below with reference to step numbers.

(S51) The group generation unit 150 performs an LM executable time group check process. Specifically, the group generation unit 150 executes the processing of Step S52 for all time groups τ included in the time group set $G_τ$.

(552) The group generation unit 150 checks if LM may be executed to satisfy the constraint with the time group τ when the physical machine set $p_t$ is treated as one physical machine group. This process may be implemented using answer set programming.

As for the answer set programming, the following documents are helpful.

(Document 3) G. Brewka, T. Eiter, and M. Truszczynski, "Answer set programming at a glance", Communications of the ACM, vol. 54, no. 12, pp. 92-103, 2011.

A description example of the process of checking if LM may be performed by answer set programming is as follows.

% Constants
%% Maximum number of virtual machines that may be subjected to LM in parallel
const max_lm=5.
% Facts (definitions)
%% Time: ts(T).
ts(0). ts(1). ts(2). % . . .
%% Virtual machine: vm(V).
vm(0). vm(1). vm(2). % . . .
%% Initial deployment destination of virtual machine V is physical machine Ps: init_accommo(V, Ps).
init_accommo(0,0). init_accommo(1,0). init_accommo(2, 1). % . . .
%% LM turnaround time of virtual machine V is D: lm_duration(V, D).
lm_duration(0,1). lm_duration(1,4). lm_duration(2,2). % . . .
%% Avoid LM of virtual machine V at time T: lm_unavail (V, T).
lm_unavail(0,100). lm_unavail(0,101). lm_unavail(0, 102). % . . .
% Scheduling target atom
%% Virtual machine V on physical machine Ps starts LM at time T: lm(V, T, Ps).
1 {lm(V, T, Ps): ts(T)} 1:-init_accommo(V, Ps).
% Temporary atoms
%% Virtual machine V is in LM at time T: l(V, T).

I(V, T):-ts(T), lm(V, Ts, Ps, Pd), lm_duration(V, D), Ts<=T, T<=Ts+D-1.

%% Physical machine as LM migration source: pm_src (Ps).

pm_src(Ps):-init_accommo(V, Ps).

% Hard constraints

%% Prohibit concurrent LM in physical machine Ps

:-ts(T), pm_src(Ps), not #count {V: I(V, T), init_accommo (V, Ps)}<=1.

%% Limit the number of concurrent LM executions

:-ts(T), not #count {V: I(V, T)}<=max_lm.

%% Execute LM within defined time

:-lm(V, T, Ps, Pd), lm_duration(V, D), not ts(T . . . T+D-1).

%% Avoid LM during the time slot specified by user

:-I(V, T), lm_unavail(V, T).

The above is the description of the process of checking if LM may be executed by answer set programming.

Use of such an answer set programming technique enables execution of processing of determining whether or not LM that satisfies constraints may be executed.

(S53) When the processing of Step S52 ends for the time group τ, the group generation unit 150 advances the processing to Step S54.

(S54) The group generation unit 150 determines whether or not there is one or more LM executable time groups τ. When there is an LM executable time group τ, the group generation unit 150 advances the processing to Step S55. When there is no LM executable time group τ, the group generation unit 150 advances the processing to Step S57.

(S55) The group generation unit 150 determines whether or not the physical machine set $P_t$ satisfies the capacity of the i-the physical machine group $G_p$ [i]. The capacity determination target elements include LM workable time, maintenance workable time, and various resources (the number of CPU cores, the amount of memory, and the like). For example, it is assumed that all physical machine groups have the same capacity. For example, the group generation unit 150 refers to the virtual machine configuration table 122, and determines that the capacity related to the LM workable time is satisfied when the total LM turnaround time of all the virtual machines running on the physical machines included in the set $P_t$ is equal to or less than the capacity of the LM workable time. The group generation unit 150 also refers to the maintenance target machine Information M2, and determines that the capacity related to the maintenance workable time is satisfied when the total maintenance turnaround time of all the physical machines included in the set $P_t$ is equal to or less than the capacity of the maintenance workable time. The group generation unit 150 further refers to the physical machine configuration table 121, and determines that the capacity related to the resources is satisfied when the total resource amount by the resource type of the physical machines included in the set $P_t$ is equal to or less than the resource capacity of the corresponding type.

When the capacity is satisfied for all the elements to be determined, the group generation unit 150 advances the processing to Step S56. On the other hand, when the capacity is not satisfied for at least one element, the group generation unit 150 advances the processing to Step S57.

(S56) The group generation unit 150 determines that the allocation target physical machine $p_c$ may be allocated to the i-th physical machine group $G_p$ [i], and sets the value of the variable i to the variable g. Thereafter, the group generation unit 150 terminates the physical machine allocation process.

(S57) The group generation unit 150 determines that the allocation target physical machine $p_c$ may not be allocated to the i-th physical machine group $G_p$ [i], and determines whether or not the value of the variable i is smaller than the physical machine group number m-1. When "i <m-1", the group generation unit 150 advances the processing to Step 558. When "i<m-1" is not established, the group generation unit 150 sets "g=NULL" and terminates the physical machine allocation process.

(S58) The group generation unit 150 increments the value of the variable i by 1, and advances the processing to Step S42 (see FIG. 38).

Through the grouping process Illustrated in FIGS. 36 to 39, a time group and a physical machine group are generated. Thereafter, the subproblem generation unit 160 executes a subproblem generation process.

In the subproblem generation process, one time group for finding a solution for the physical machine group is allocated to each physical machine group.

In the physical machine allocation process illustrated in FIGS. 38 and 39, the group generation unit 150 selects physical machine groups in ascending order based on the physical machine group number. The group generation unit 150 then allocates the physical machine to the physical machine group that is first determined that the physical machine may be allocated thereto. That is, the group generation unit 150 allocates the allocation target physical machine to the first physical machine group that has satisfied the constraint conditions. This is a technique called first-fit decreasing (FFD), but the method of determining the physical machine allocation destination is not limited to FFD.

In addition to FFD, there is also a method called best-fit decreasing (BFD), for example, as the method of determining a physical machine allocation destination. When adopting BFD, the group generation unit 150 determines a physical machine group having a predetermined reference value that is the best among physical machine groups that may satisfy the constraint conditions, as an allocation destination of the allocation target physical machine. The predetermined reference value is a value indicating a resource empty capacity such as a memory, for example. In this case, the group generation unit 150 allocates the allocation target physical machine to a physical machine group with the smallest resource empty capacity.

Figure 40:
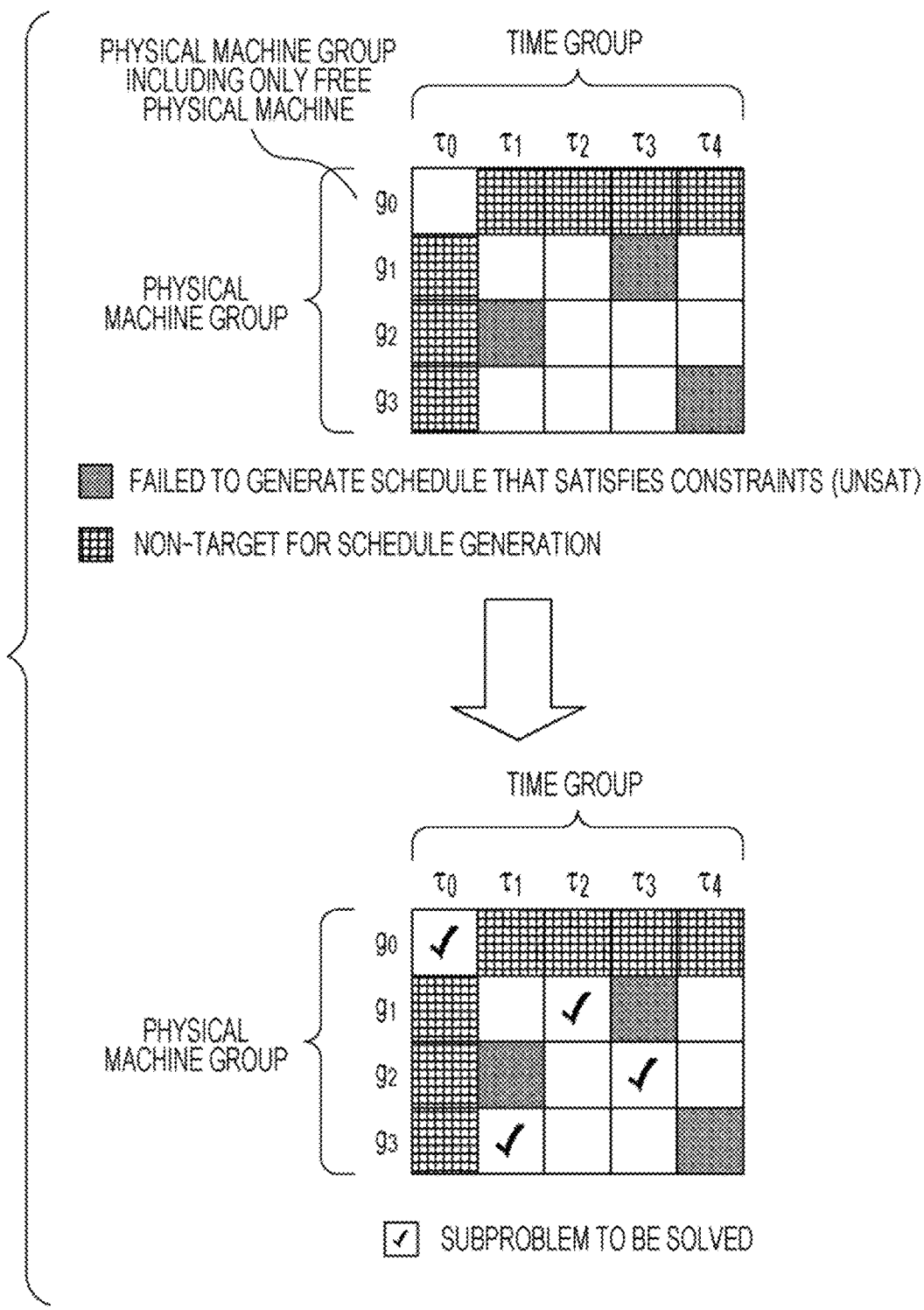
FIG. 40 is a diagram for explaining a subproblem to be generated.

FIG. 40 is a diagram for explaining a subproblem to be generated. In the example of FIG. 40, four physical machine groups $g_0$ to $g_3$ and five time groups $\tau_0$ to $\tau_4$ are generated. In this case, there are 20 combinations of physical machine groups and time groups. In Step S52, the group generation unit 150 checks if LM that satisfies the constraints may be executed for these combinations. The group generation unit 150 sets UNSAT for the combination of the physical machine group and the time group for which the LM that satisfies the constraints may not be executed.

The subproblem generation unit 160 first allocates the time group $\tau_0$ having the earliest corresponding time slot to the physical machine group $g_0$ having only empty physical machines. Next, the subproblem generation unit 160 allocates a time group in the earliest possible time slot to the physical machine groups $g_1$ to $g_3$ on the condition that one time group may be allocated to one physical machine group. However, the subproblem generation unit 160 does not perform allocation that may lead to any UNSAT combination. In the example of FIG. 40, it is assumed that the time group $\tau_2$ is allocated to the physical machine group $g_1$, the time group $\tau_3$ is allocated to the physical machine group $g_2$, and the time group $\tau_1$ is allocated to the physical machine group $g_3$. The subproblem generation unit 160 generates a subproblem to be solved for each combination of the allocated physical machine group and time group.

Figure 41:
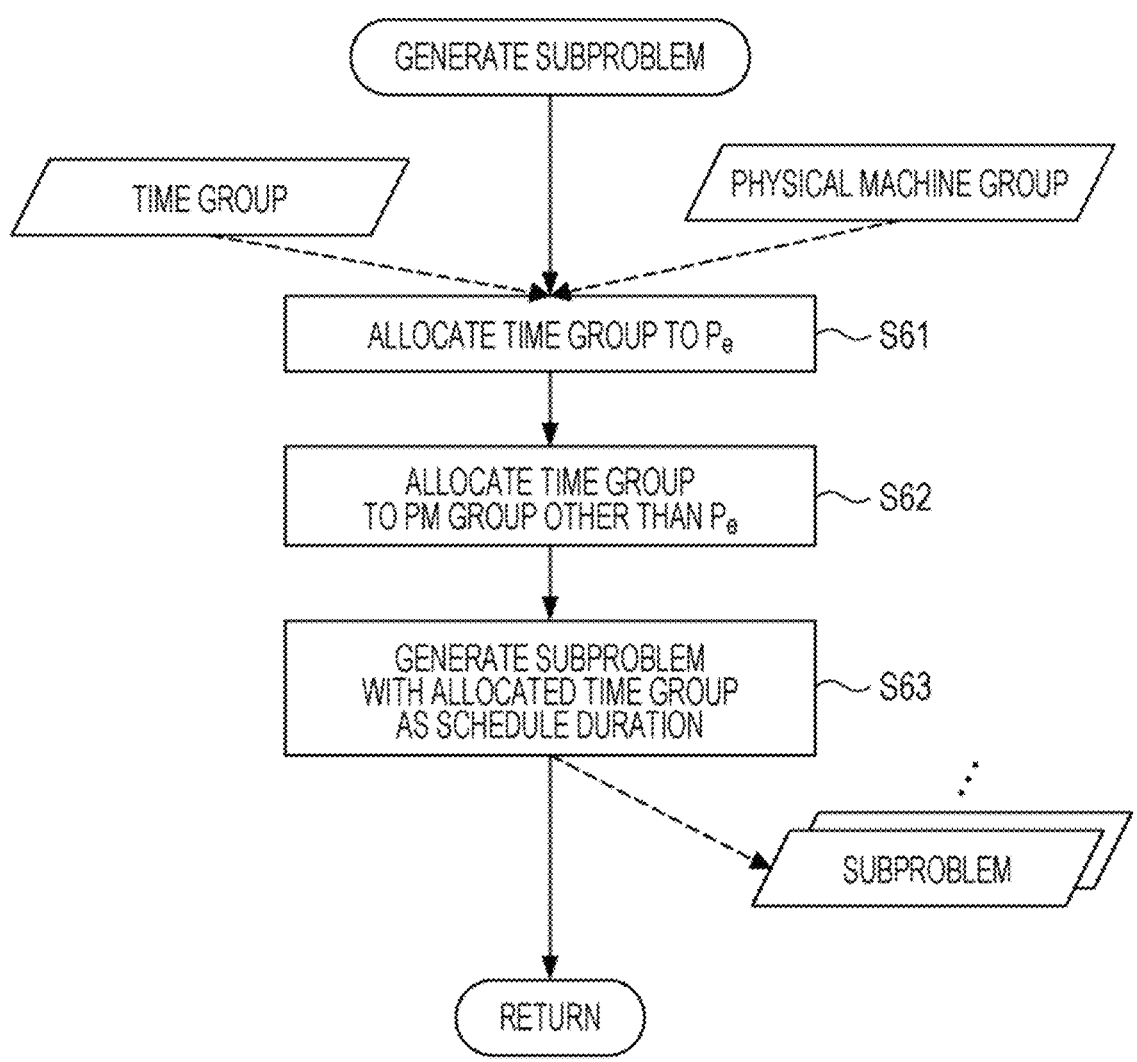
FIG. 41 is a flowchart illustrating exemplary generation of a subproblem.

FIG. 41 is a flowchart illustrating exemplary generation of a subproblem. The processing illustrated in FIG. 41 will be described below with reference to step numbers. A procedure described below corresponds to Step S12 in FIG. 35.

(S61) The subproblem generation unit 160 allocates a time group to the physical machine group $P_e$ including only empty physical machines, based on the time group and the physical machine group.

(S62) The subproblem generation unit 160 allocates each of the plurality of time groups to physical machine groups other than the physical machine group $P_e$ including only empty physical machines.

The time group allocation illustrated in Steps S61 and S62 may be implemented using the answer set programming technique. A description example of time group allocation processing by the answer set programming is as follows.

% Facts (definitions)
%% Physical machine group: pm_group(G).
pmgroup(0). pm_group(1). pm_group(2). % . . .
%% Time group: day(D).
day(1). day(2). day(3). % . . .
%% LM is executable for physical machine group G in time group D: sat(G, D).
sat(1, 1). sat(2, 1). sat(2, 2). % . . .
% Scheduling target atoms
%% Physical machine group G executes LM (maintenance) in time group D: ans(G, D).
1 {ans(G, D): sat(G, D)}1:-pm_group(G).
% Hard constraints
%% At most one physical machine group allocated to each time group
:-day(D), not #count {G: ans(G, D)}<=1.
% Objective function
%% Minimize maintenance execution schedule
:~ Sd=#sum ({D: ans(G, D)}. [Sd]

The above is the description of time group allocation processing by the answer set programming.

(S63) The subproblem generation unit 160 generates a subproblem related to maintenance scheduling, using the allocated time group as a schedule period for each of the plurality of physical machine groups. Thereafter, the subproblem generation unit 160 terminates the subproblem generation process.

The generated subproblem is solved by the subproblem solving unit 170.

Figure 42:
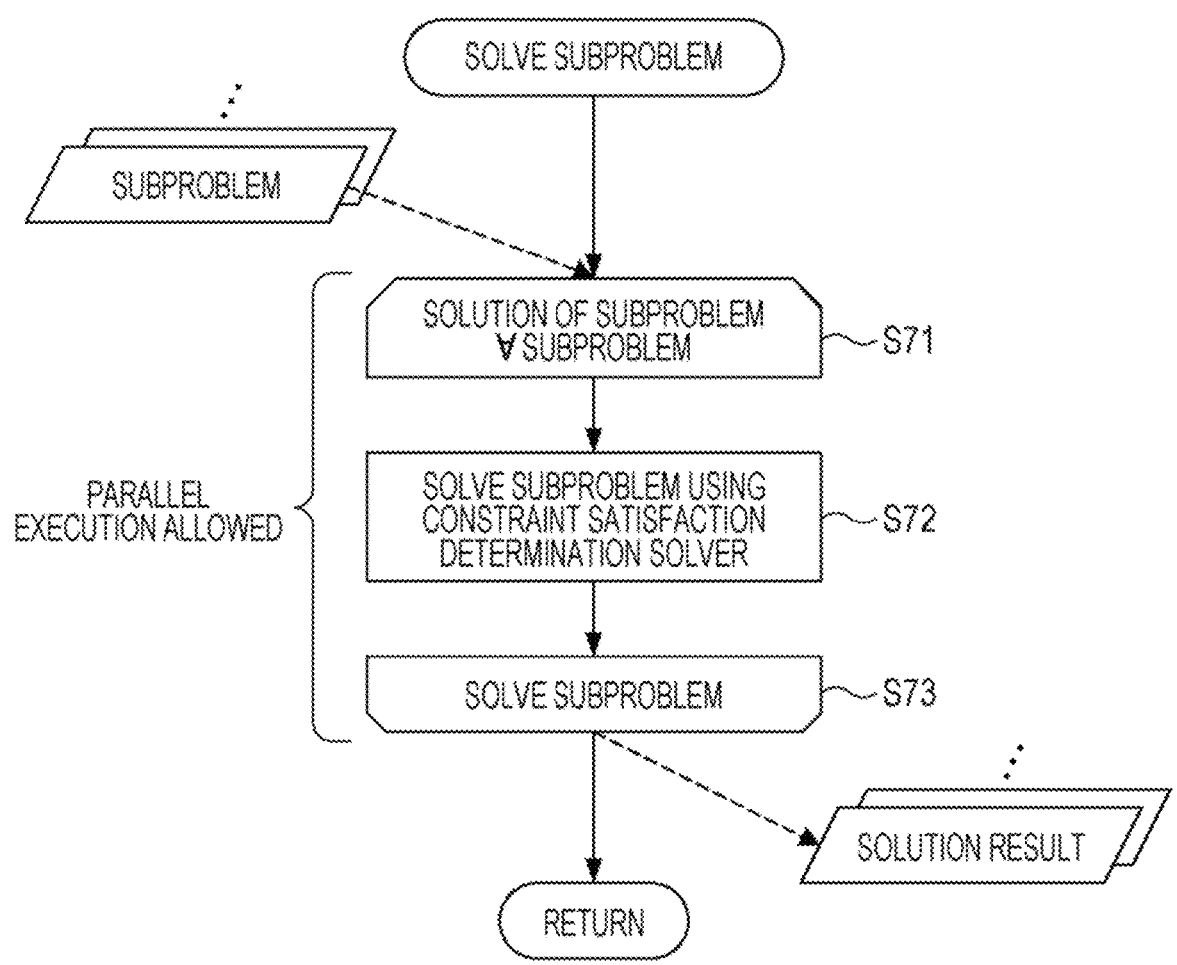
FIG. 42 is a flowchart illustrating exemplary solution of a subproblem.

FIG. 42 is a flowchart illustrating exemplary solution of a subproblem. The processing illustrated in FIG. 42 will be described below with reference to step numbers. A procedure described below corresponds to Step S13 in FIG. 35.

(S71) For each of the generated subproblems, the subproblem solving unit 170 solves the subproblem. Specifically, the subproblem solving unit 170 executes the processing of Step S72 for each subproblem.

(S72) The subproblem solving unit 170 solves the subproblem using a constraint satisfaction determination solver. Subproblem solving may be implemented using the answer set programming technique. A description example of subproblem solution processing by the answer set programming is as follows.

% Constants
%% Time required for maintenance of physical machine
const maint_duration=15.
%% Maximum number of virtual machines that may be subjected to LM concurrently
const max_im=5.
%% Maximum number of physical machines that may perform maintenance concurrently
const max_maint=5.
%% Maximum allowable time difference between LM executed first and last in physical machine
const max_td=120.
% Facts (definitions)
%% Time: ts(T).
ts(0). ts(1). ts(2). % . . .
%% Virtual machine: vm(V).
vm(0). vm(1). vm(2). % . . .
%% Maintenance target physical machine: pm(P).
pm(0). pm(1). pm(2). % . . .
%% LM migration destination candidate physical machine: tmp_pm(P).
tmp_pm(100). tmp_pm(101). tmp_pm(102). % . . .
%% Initial deployment destination of virtual machine V is physical machine Ps: init_accommo(V, Ps).
init_accommo(0, 0). init_accommo(1, 0). init_accommo (2, 1). % . . .
%% LM turnaround time of virtual machine V is D: lm_duration(V, D).
lm_duration(0, 1). lm_duration(1,4). lm_duration (2,2). % . . .
%% Virtual machine resource (the number of CPU cores, the amount of memory): vm_cpu(V, Cv). vm_mem(V, Cm).
vm_cpu(0, 2). vm_cpu(1, 1). vm_cpu(2, 4). % . . .
vm_mem(0, 4096). vm_mem(1, 16384). vm_mem(2, 8192). %
%% Physical machine resources (the number of CPU cores, the amount of memory): pm_cpu(P, Cp). pm_mem(P, Mp).
pm_cpu(0, 56). pm_cpu(1, 56). pm_cpu(2, 56). % . . .
pm_mem(0, 256000). pm_mem(1, 256000). pm_mem(2, 256000). % . . .
%% Avoid LM of virtual machine V at time T: lm_unavail (V, T).
lm_unavail(0, 100). lm_unavail(0, 101). lm_unavail(0, 102). % . . .
%% Avoid maintenance of physical machine P at time T: m_unavail (P, T).
m_unavail(1, 300). m_unavail(1, 301). m_unavail(1, 302). % . . .
%% Anti-affinity group: aa_rule(G).
aa_rule(0). aa_rule(1). aa_rule (2). % . . .
%% Virtual machine V belongs to anti-affinity group G: aa_group(G, V).
aa_group(0, 10). aa_group(0, 11). aa_group (0, 20). % . . .
% Scheduling target atoms
%% Virtual machine V starts LM at time T (migrate from physical machine Ps to Pd): lm(V, T, Ps, Pd).
1 {lm(V, T, Ps, Pd): ts(T), pm(Pd), Ps !=Pd} 1:-init_accommo(V, Ps).
%% Maintenance of physical machine P starts at time T: maint(P, T).
1 {maint(P, T): ts(T)} 1:-pm(P), not tmp_pm(P).
% Temporary Atoms
%% Virtual machine V is in LM at time T: I(V, T).
I(V, T):-ts(T), lm(V, Ts, Ps, Pd), lm_duration(V, D), Ts<=T, T<=Ts+D-1.
%% Physical machine P is under maintenance at time T: m(P, T).
m(P, T):-ts(T), maint(P, Tm), Tm<=T, T<=Tm+maint_duration-1.
%% LM migration source (destination) physical machine: pm_src(Ps). pm_dst(Pd).

pm_src(Ps):-init_accommo(V, Ps).
pm_dst(Pd):-lm(V, T, Ps, Pd).
%%% Empty physical machine before (after) LM: empty_src(P). empty_dst(P).
empty_src(P):-pm(P), #count {V: lm(V, T, P, Pd)}=0.
empty_dst(P):-pm(P), #count {V: lm(V, T, Ps, P)}=0.
:-Ps=#count {P: empty_src(P)}, not #count {P: empty_dst (P)}>=Ps.
% Hard constraints
%%% Concurrent LM in physical machine Ps is prohibited
:-ts(T), pm_src(Ps), not #count {V: I(V, T), init_accommo (V, Ps)}<=1.
%%% Perform maintenance of Ps after completion of all LM from physical machine Ps
:-pm_src(Ps), maint(Ps, Tm), Ts=#max {T+D−1: lm(V, T, Ps, Pd), lm_duration(V, D)}, not Ts<Tm.
%%% Execute LM on physical machine Pd after maintenance of Pd
:-pm_dst(Pd), maint(Pd, Tm), Td=#min {T: lm(V, T, Ps, Pd)}, not Tm+maint_duration−1<Td.
%%% $\Sigma_{V \in Pd}$ virtual machine V resource amount ≤physical machine Pd resource amount
:-pm_dst(Pd), pm_cpu(Pd, Cp), not #sum {Cv, V: vm_cpu (V, Cv), lm(V, T, Ps, Pd)}<=Cp.
:-Pm_dst(Pd), pm_mem(Pd, Mp), not #sum {Mv, V: vm_mem(V, Mv), lm(V, T, Ps, Pd)}<=Mp.
%%% Prohibit concurrent LM between virtual machines belonging to anti-affinity group G
:-ts(T), aa_rule(G), not #count {V: I(V, T), aa_group(G, V)}<=1.
%%% Prohibit virtual machines belonging to anti-affinity group G from running on the same physical machine
:-aa_rule(G), Vaa=#count {V: aa_group(G, V)}, Paa=#count {Pd: lm(V, T, Ps, Pd), aa_group(G, V)}, not Vaa=Paa.
%%% Limit the number of concurrent LM executions
:-ts(T), not #count {V: I(V, T)}<=max_lm.
%%% Limit the number of concurrent maintenance executions
:-ts(T), not #count {P: m(P, T)}<=max_maint.
%%% Perform LM within specified time
:-lm(V, T, Ps, Pd), lm_duration(V, D), not ts(T . . . T+D−1).
%%% Avoid LM during time slot specified by user
:-I(V, T), lm_unavail(V, T).
%%% Perform maintenance within defined time
:-maint(P, T), not $t_8$ (T . . . T+maint_duration−1).
%%% Avoid maintenance during time slot specified by the operator
:-m(P, T), m_unavail(P, T).
%%% Limit time difference between LM executed first and last in physical machine Ps
:-pm_src(Ps), Tmax=#max {T+D−1: lm(V, T, Ps, Pd), lm_duration(V, D)}, not #min {T+max_td: lm(V, T, Ps, Pd)}>=Tmax.
% Soft constraints
%%% LM destination should be the same between virtual machines which is initially operated on the same physical machine
:~ pm_src(Ps), P=#count {Pd: lm(V, T, Ps, Pd)}. [P@1, Ps]
The above is the description of the subproblem solution processing by the answer set programming.
(S73) When the solution of all the subproblems is completed, the subproblem solving unit 170 outputs the solution result and terminates the subproblem solving process. Note that the processing of Steps S71 to S73 may also be executed in parallel for each subproblem.

When the solution results of all the subproblems are obtained, the schedule generation unit 180 performs schedule generation processing based on the solution results.

Figure 43:
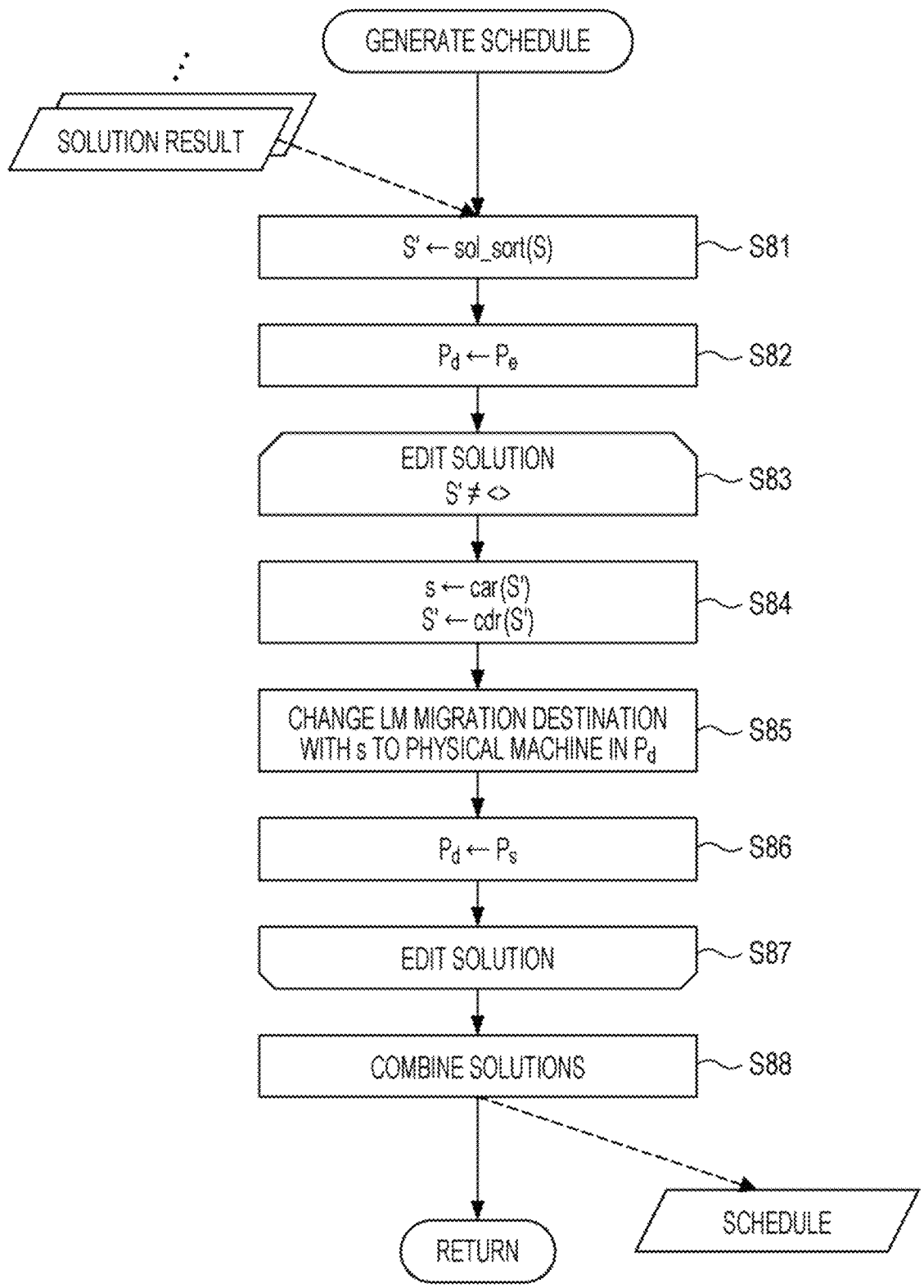
FIG. 43 is a flowchart illustrating exemplary generation of a schedule.

FIG. 43 is a flowchart illustrating exemplary generation of a schedule. The processing illustrated in FIG. 43 will be described below with reference to step numbers. A procedure described below corresponds to Step S14 in FIG. 35.

(S81) The schedule generation unit 180 sorts the solution results included in the solution set S other than the solution results for the physical machine group including only the empty physical machines, in order of time slot from the earliest time slot of the corresponding time group, and registers solution results to the list S' (S'←sol_sort(S)).

(S82) The schedule generation unit 180 sets the physical machine group $P_e$ including only empty physical machines to the migration destination physical machine group $P_d$.

(S83) The schedule generation unit 180 performs a solution editing process. Specifically, the schedule generation unit 180 executes the processing of Steps S84 to S86 until there is no more solution result in the list S'.

(S84) The schedule generation unit 180 sets the first solution result in the list S' to the solution result s to be edited (s←car(S')). The schedule generation unit 180 also newly sets solution results other than the first solution result in the list S' as elements of the list S' (S'←cdr(S')). Accordingly, the first element is excluded from the list S'.

(S85) The schedule generation unit 180 changes the LM migration destination in the solution result s to be edited to a physical machine in the physical machine group $P_d$.

(S86) The schedule generation unit 180 sets the physical machine group $P_s$ scheduled with the solution result s to the migration destination physical machine group $P_d$.

(S87) When there is no more solution result in the list S', the schedule generation unit 180 advances the processing to Step S88.

(S88) The schedule generation unit 180 combines the solution results of the physical machine group including only the empty physical machines with the solution results edited in Steps S83 to S87, and outputs a maintenance schedule for the entire system.

Thus, the maintenance schedule may be efficiently created. When the user specifies the LM execution avoidance date and time for the virtual machine, a schedule is created for the virtual machine to perform LM at a date and time other than the LM execution avoidance date and time. Note that the user may specify the LM execution avoidance date and time using, for example, the LM avoidance date and time setting screen displayed on the user terminals 500 and 600.

Figure 44:
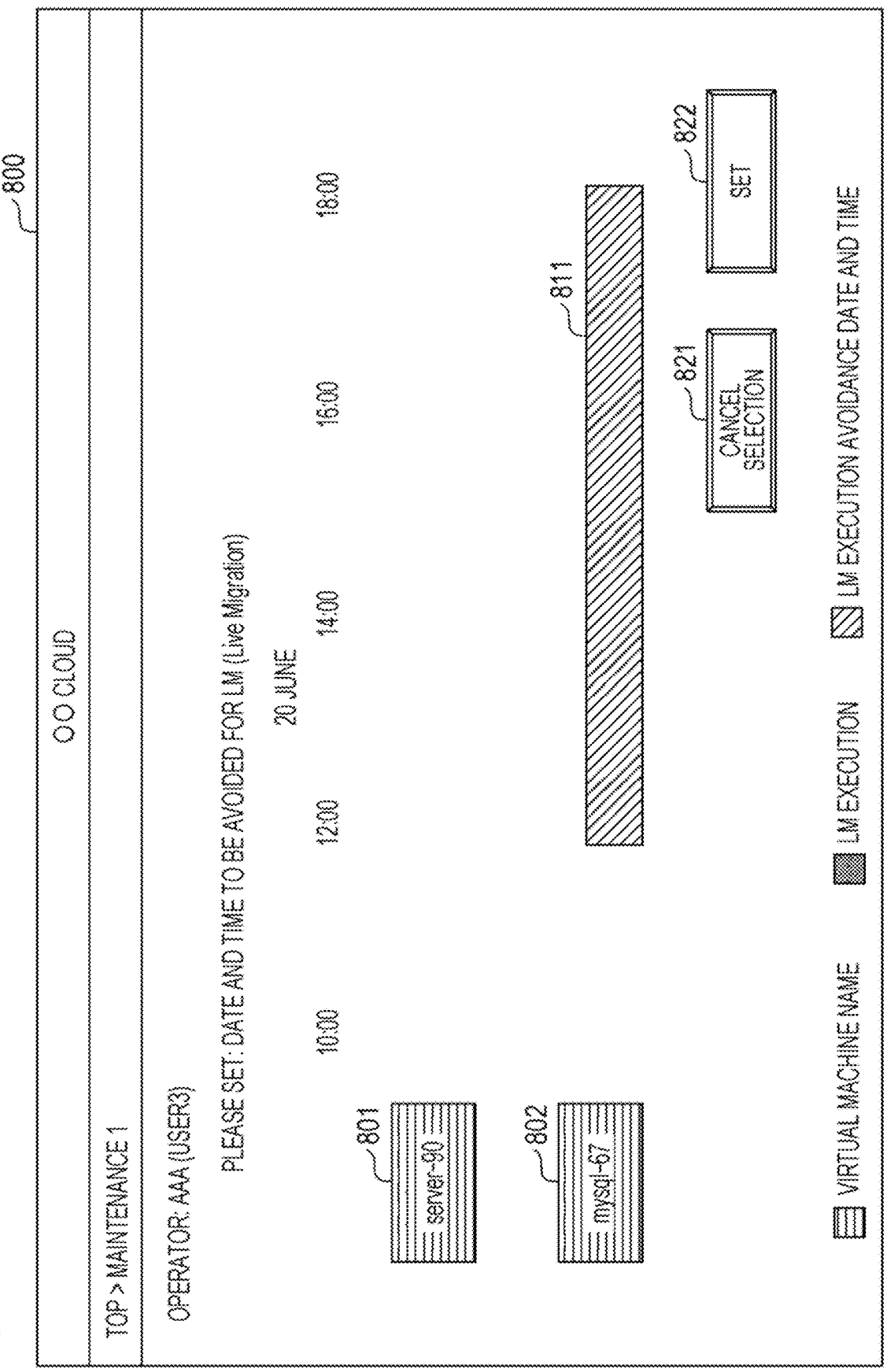
FIG. 44 is a diagram illustrating an exemplary LM execution avoidance date and time setting screen.

FIG. 44 is a diagram illustrating an exemplary LM execution avoidance date and time setting screen. The screen 800 is displayed on the user terminal 500 based on screen information provided from the management server 100 to the user terminal 500, for example. For example, the user terminal 500 receives screen information corresponding to the screen 800 from the management server 100, and displays the screen 800 on a display (display device) built in or coupled to the user terminal 500 based on the screen information. It is assumed that the user terminal 500 is used by the user with the user ID "user3".

The scheduler 112 identifies the user ID of the user of each virtual machine registered to the LM schedule table 192 based on the virtual machine configuration table 122 (or the virtual machine operation table 123). The user name of the user and terminal address information corresponding to the user ID is stored in the RAM 102 or HDD 103 in advance. The scheduler 112 identifies the transmission destination of the user name and the screen information by referring to the information.

The screen 800 includes VM symbols 801 and 802, an LM execution avoidance date and time symbol 811, and buttons 821 and 822.

The VM symbols 801 and 802 indicate LM target virtual machines used by the corresponding user. For example, the VM symbol 801 indicates a virtual machine with the virtual machine name "server-90". The VM symbol 802 indicates a virtual machine with a virtual machine name "mysql-67". In the example of the screen 800, the LM execution avoidance date and time for each virtual machine is indicated with the direction from the left side to the right side of each row of the VM symbols 801 and 802 as a time-series positive direction.

The LM execution avoidance date and time symbol 811 is a symbol for accepting selection of the LM execution avoidance date and time by the user. For example, the user uses a pointing device coupled to the user terminal 500 to place the LM execution avoidance date and time symbol 811 in a desired virtual machine row. The user selects the LM execution avoidance date and time for the virtual machine by changing the horizontal width of the LM execution avoidance date and time symbol 811 using the pointing device. In the example of the LM execution avoidance date and time symbol 811, 11:50 to 17:59 on Jun. 20, 2018 is selected as the LM execution avoidance date and time for the virtual machine with the virtual machine name "mysql-67".

The button 821 is a button for canceling the selection of the LM execution avoidance date and time by the LM execution avoidance date and time symbol 811.

The button 822 is a button for setting the LM execution avoidance date and time selected using the LM execution avoidance date and time symbol 811. When having received an input to the button 822, the user terminal 500 transmits an avoidance date and time message including LM execution avoidance date and time information M3 indicating the selected LM execution avoidance date and time for the virtual machine to the management server 100.

Figure 45:
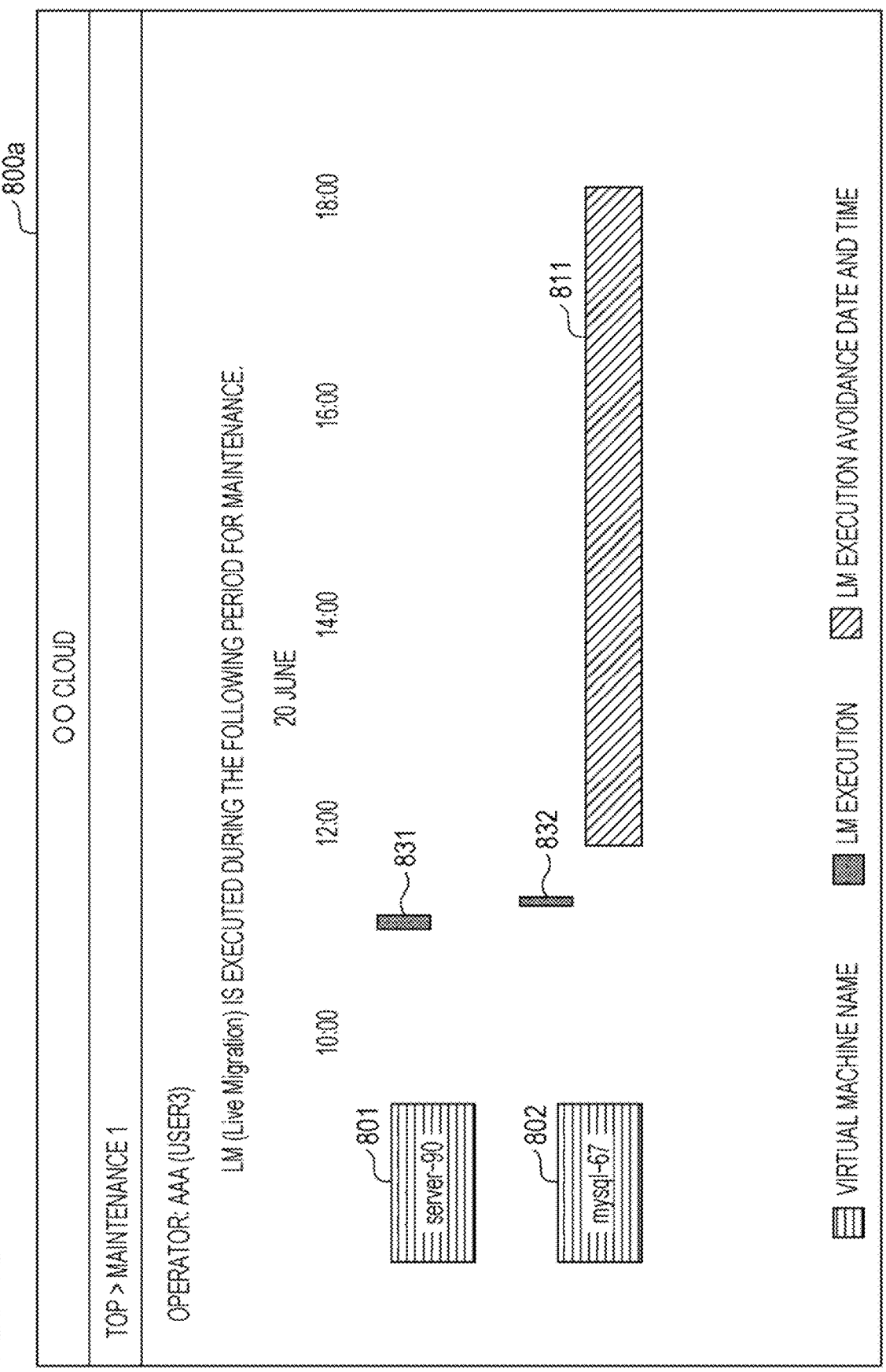
FIG. 45 is a diagram illustrating an exemplary LM schedule screen for a user.

FIG. 45 is a diagram illustrating an exemplary LM schedule screen for a user. The screen 800a is an example of a screen provided to the user terminal 500 by the management server 100. The screen 800a displays an LM schedule adjusted according to the selection of the LM execution avoidance date and time on the screen 800. The screen 800a includes VM symbols 801 and 802, LM symbols 831 and 832, and an LM execution avoidance date and time symbol 811.

The LM symbols 831 and 832 indicate the scheduled LM date and time for each virtual machine. For example, the LM symbol 831 indicates that LM is executed between 11:06 and 11:09 on Jun. 20, 2018 for the virtual machine with the virtual machine name "server-90". The LM symbol 832 also indicates, for example, that LM is executed between 11:10 and 11:11 on Jun. 20, 2018 for the virtual machine with the virtual machine name "mysql-67".

Although FIGS. 44 and 45 illustrate the screens 800 and 800a provided to the user terminal 500, an LM execution avoidance date and time setting screen or an LM schedule screen is also provided to the user terminal 600 for the virtual machine used by the user of the user terminal 600.

Figure 46:
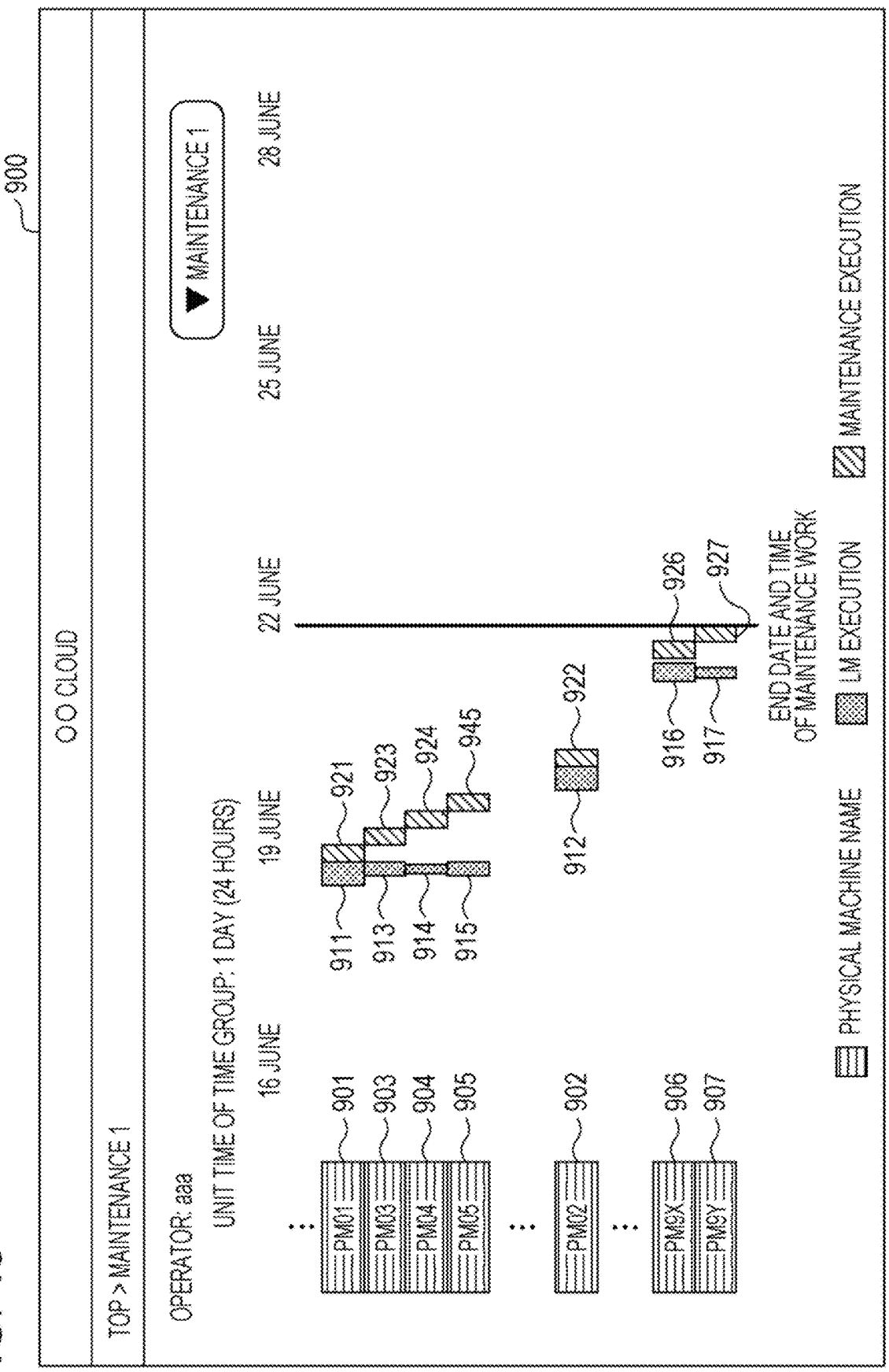
FIG. 46 is a diagram illustrating an exemplary maintenance schedule screen for an operator.

FIG. 46 is a diagram illustrating an exemplary maintenance schedule screen for an operator. A screen 900 is an example of a screen provided to the operator terminal 700 by the management server 100. The screen 900 indicates a physical machine maintenance schedule corresponding to the LM schedule of the entire system. The operator terminal 700 receives screen information for drawing the screen 900 from the management server 100, and displays the screen 900 on a display (display device) built in or coupled to the operator terminal 700 based on the screen information.

The screen 900 has PM symbols 901 to 907, LM schedule symbols 911 to 917, and maintenance symbols 921 to 927.

The PM symbols 901 to 907 indicate maintenance target physical machines. For example, the PM symbol 901 indicates a physical machine with a physical machine name "PM01". In the example of the screen 900, the LM schedule for the virtual machines on each physical machine and the maintenance work schedule are indicated with the direction from the left side to the right side of each row of the PM symbols 901 to 907 as the time-series positive direction.

The LM schedule symbols 911 to 917 indicate the LM schedule for each virtual machine. The LM schedule symbols 911 to 917 reflect the contents of the LM schedule table 192. For example, the LM schedule symbol 911 indicates LM schedules of a plurality of virtual machines on the physical machine with the physical machine name "PM01".

The maintenance symbols 921 to 927 are symbols indicating the maintenance schedule of the physical machine. The maintenance symbol 921 reflects the contents of the maintenance schedule table 191, and the maintenance symbol 921 indicates, for example, a maintenance schedule for the physical machine with the physical machine name "PM01".

Having referred to the screen 900, the operator knows that LM is executed on the physical machines such as those with the physical machine names "PM01", "PM03", "PM04", and "PM05" on June 19 and maintenance work on those physical machines is executed on the same day. The operator also knows that LM is executed on the physical machine such as that with the physical machine name "PM02" on June 20 and maintenance work on that physical machine is executed on the same day. The operator further knows that LM is executed on the physical machines such as those with physical machine names "PM9X" and "PM9Y" on June 21 and maintenance work on those physical machines is executed on the same day.

According to such a maintenance schedule, the maintenance of the entire system is completed on June 21. That is, since the number of physical machine groups is suppressed, the number of physical machines that execute maintenance per time group increases, and the maintenance turnaround time of the entire system is shortened.

The operator terminal 700 may also display details of the maintenance schedule in the specified time group.

Figure 47:
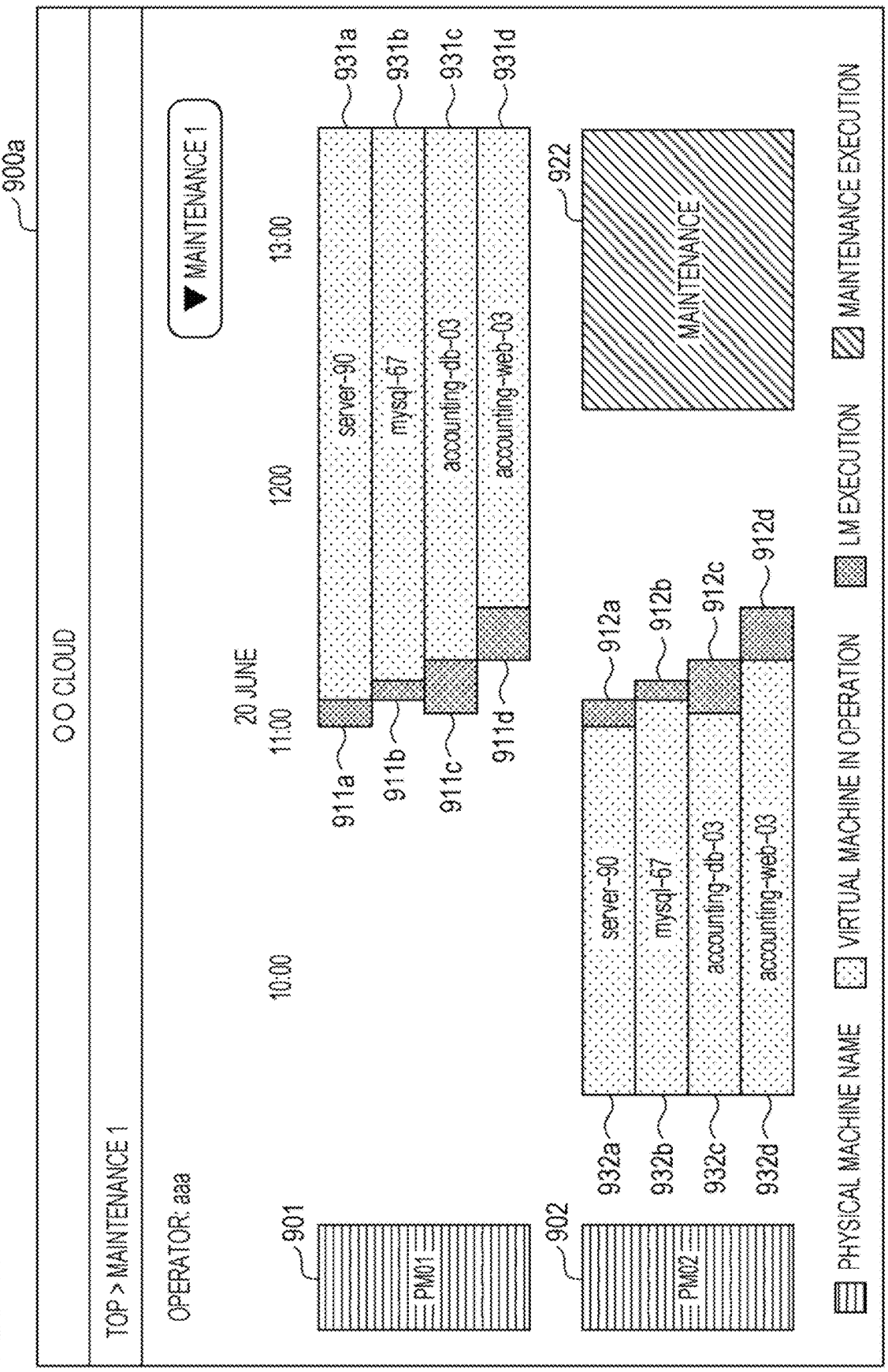
FIG. 47 is a diagram illustrating an exemplary maintenance schedule detail display screen for the operator.

FIG. 47 is a diagram Illustrating an exemplary maintenance schedule detail display screen for the operator. A screen 900a is an example of a screen provided to the operator terminal 700 by the management server 100. The screen 900a displays details of the June 20th schedule among the schedules displayed on the screen 900. The operator terminal 700 receives screen information for drawing the screen 900a from the management server 100, and displays the screen 900a on a display (display device) built in or coupled to the operator terminal 700 based on the screen information.

The screen 900a includes PM symbols 901 and 902, LM schedule symbols 911a to 911d and 912a to 912d, a maintenance symbol 922, and VM operation schedule symbols 931a to 931d and 932a to 932d.

The LM schedule symbols 911a to 911d indicate LM schedules for migrating a plurality of virtual machines to the physical machine with the physical machine name "PM01" as the migration destination. The LM schedule symbols 912a to 912d indicate LM schedules for migrating a plurality of virtual machines from the physical machine with the physical machine name "PM02" as the migration source. The LM schedule symbols 911a to 911d and 912a to 912d reflect the contents of the LM schedule table 192.

VM operation schedule symbols 931a to 931d indicate the operation schedules of the plurality of virtual machines on the physical machine with the physical machine name "PM01". The VM operation schedule symbols 932a to 932d indicate operation schedules of the plurality of virtual machines on the physical machine having the physical machine name "PM02". In the VM operation schedule symbols 931a to 931d and 932a to 932d, virtual machine names of corresponding virtual machines are displayed.

The physical machine as the LM migration destination has a schedule for operating each virtual machine after LM of the virtual machine. The physical machine as the LM migration source has a schedule for executing LM of each virtual machine after activation of the virtual machine. For example, the virtual machine name "server-90" is operating on the physical machine with the physical machine name "PM02" before execution of LM, and is migrated to the physical machine with the physical machine name "PM01" between 11:06 and 11:09. Thereafter, the virtual machine name "server-90" operates on the physical machine with the physical machine name "PM01".

As described above, since the management server 100 solves the problem related to the maintenance schedule by dividing the problem into a plurality of subproblems, the schedule may be calculated efficiently, and the calculation time is shortened. As a result, even a large-scale system maintenance schedule may be calculated in a practical time.

In addition, since the number of divisions of the physical machine set is set to the minimum number within a range that satisfies the constraints, a maintenance schedule with fewer work days may be created. For example, as the number of divisions of the physical machine set increases, the number of work days increases.

Figure 48:
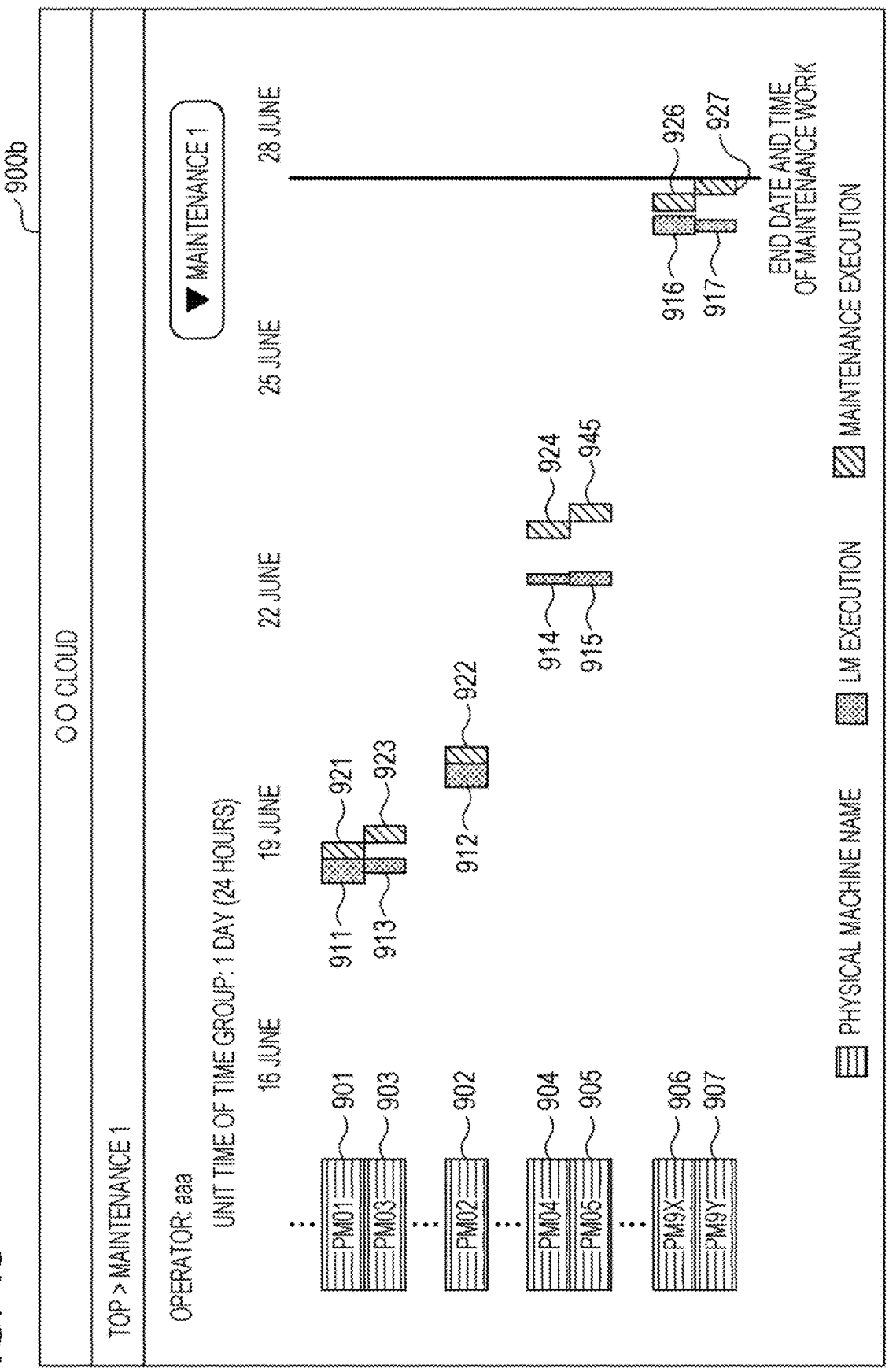
FIG. 48 is a diagram illustrating an exemplary maintenance schedule screen (comparative example) when the number of divisions of the physical machine set is increased.

FIG. 48 is a diagram illustrating an exemplary maintenance schedule screen (comparative example) when the number of divisions of the physical machine set increases. A screen 900b displays a maintenance schedule when the number of divisions of the physical machine set is arbitrarily designated without using the group generation unit 150. The number of divisions of the physical machine set in the example of FIG. 48 is larger than the number of divisions in the example illustrated in FIG. 46.

When the schedule displayed on the screen 900b is compared with the schedule illustrated in FIG. 46, the execution date of LM and maintenance work for the physical machines with the physical machine names "PM04" and "PM05" is shifted from June 19th to June 22nd. Moreover, the execution date of LM and maintenance work for the physical machines with the physical machine names "PM9X" and "PM9Y" is shifted from June 21st to June 27th. If maintenance is performed according to the schedule illustrated in FIG. 48, the maintenance takes until June 27th.

The reason for such a difference in the number of work days is that the number of physical machines that may be maintained per time group (daily) is reduced as the number of divisions of the physical machine set increases. If the number of physical machines that may perform maintenance per day is reduced, it takes more days to perform maintenance on all the physical machines.

On the other hand, in the management server 100, the group generation unit 150 automatically determines the minimum number of divisions within the range that satisfies the constraints as the number of divisions of the physical machine set. Thus, as illustrated in FIG. 46, an efficient schedule may be created with fewer work days. Moreover, if the maintenance may be performed in a short period of time, operations such as patch application to each physical machine are performed at an early stage, and system reliability is improved.

Since scheduling that takes into account the LM execution avoidance date and time is possible, the influence of LM on the user's operations may be suppressed. As a result, the service quality of the entire system is improved.

Note that, although the user specifies a time slot to avoid LM of the virtual machine to be used in the second embodiment, the user may specify a time slot that allows LM. When the time slot that allows LM is specified, the management server 100 determines that a time slot excluding the specified time slot is the LM avoidance time slot.

The information processing according to the first embodiment may be realized by causing the processing unit 1b to execute a program. The information processing according to the second embodiment may be realized by causing the processor 101 to execute a program. The program may be recorded on a computer-readable recording medium 13.

For example, the program may be delivered by distributing the recording medium 13 having the program recorded thereon. The program may be stored in another computer and distributed via a network. For example, the computer stores (installs) a program recorded on the recording medium 13 or a program received from another computer in a storage device such as the RAM 102 or the HDD 103, and reads and executes the program from the storage device.

The scheduling device 1 divides the execution duration into a plurality of unit periods. The scheduling device 1 then allocates each of the plurality of physical machines to a physical machine group that may execute, while satisfying the constraint conditions, migration of the virtual machine operating on the allocated physical machine and maintenance work on the allocated physical machine within one or more unit periods of the plurality of unit periods. Thereafter, for each of the plurality of physical machine groups, the scheduling device 1 creates individual schedule information Indicating a work execution duration migration of the virtual machine operating on the allocated physical machine and maintenance work on the allocated physical machine within one or more unit periods of the plurality of unit periods, and outputs overall schedule information obtained by integrating the individual schedule information on each of the plurality of physical machine groups.

All examples and conditional language provided herein are Intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that, when executed by a processor, causes the processor to be configured to:

upon acquisition of a maintenance execution duration for a plurality of physical machines, divide the maintenance execution duration into a plurality of time periods;

select each of the plurality of physical machines as an allocation target physical machine to be allocated to any of a plurality of physical machine groups; allocate the selected allocation target physical machine based on configuration information related to the plurality of physical machines and a plurality of virtual machines which operate on the plurality of physical machines, and time information indicating a migration turnaround time required to migrate each of the plurality of virtual machines to different physical machines, and a maintenance turnaround time required for maintenance work of each of the plurality of physical machines, and then allocating the allocation target physical machine to a physical machine group in which migrating a virtual machine which operates on the allocated physical machine and performing maintenance work on the allocated physical machine is to be performed when a predetermined constraint condition is satisfied within one or more time periods of the plurality of time periods;

create individual schedule information indicating a work execution duration satisfying the constraint condition for the migration of the virtual machine which operates on the allocated physical machine and the maintenance work of the allocated physical machine for each of the plurality of physical machine groups, based on the configuration information and the time information; and output overall schedule information that integrates the individual schedule information created for each of the plurality of physical machine groups.

2. The non-transitory computer-readable recording medium according to claim 1, wherein the allocating the allocation target physical machine includes allocating the allocation target physical machine to a minimum number of the plurality of physical machine groups that enable each of the plurality of physical machine groups to satisfy the constraint condition in the one or more time periods of the plurality of time periods after the allocation of the plurality of physical machines.

3. The non-transitory computer-readable recording medium according to claim 2, wherein the allocating the allocation target physical machine includes generating a predetermined number of temporary physical machine groups, determining whether or not the constraint condition may be satisfied when the plurality of physical machines are allocated to any of the temporary physical machine groups, increasing the number of temporary physical machine groups when the determining determines that the constraint condition is not satisfied, repeating the determining with the increased number of the temporary physical machine groups, and setting the temporary physical machine group that the determining has determined the constraint condition is satisfied as the plurality of physical machine groups.

4. The non-transitory computer-readable recording medium according to claim 1, wherein the allocating the allocation target physical machine includes allocating the allocation target physical machine to a physical machine group specified according to predetermined criteria from among a plurality of physical machine groups detected that execute migration of the virtual machines operating on the allocated physical machine and maintenance work on the allocated physical machine while satisfying predetermined constraint conditions within the one or more time periods of the plurality of time periods, after allocation of the selected allocation target physical machine.

5. The non-transitory computer-readable recording medium according to claim 1, causing the computer to be further configured to: acquire an avoidance time slot to avoid migration of an operating virtual machine or an allowable time slot to allow the migration of the operating virtual machine; determine a migration avoidance time slot to avoid migration of the operating virtual machine based on the avoidance time slot or the allowable time slot; and include, in the constraint conditions, a migration time slot constraint by which the operating virtual machine is migrated while avoiding the migration avoidance time slot.

6. The non-transitory computer-readable recording medium according to claim 5, wherein the selecting a plurality of physical machines includes selecting a physical machine having a longer migration avoidance time slot as the allocation target physical machine earlier in a sequence of selecting than a physical machine having a shorter avoidance time slot.

7. A scheduling method executed by a computer, comprising: upon acquisition of a maintenance execution duration for a plurality of physical machines, dividing the execution duration into a plurality of time periods;

selecting each of the plurality of physical machines as an allocation target physical machine to be allocated to any of a plurality of physical machine groups; allocating the selected allocation target physical machine based on configuration information and time information, the configuration information being related to the plurality of physical machines and a plurality of virtual machines operating on the plurality of physical machines, the time information indicating a migration turnaround time required to migrate each of the plurality of virtual machines to different physical machines, and a maintenance turnaround time required for maintenance work of each of the plurality of physical machines, and then allocating the allocation target physical machine to a physical machine group in which migrating a virtual machine operating on the allocated physical machine and performing maintenance work on the allocated physical machine are to be performed when a predetermined constraint condition is satisfied within one or more time periods of the plurality of time periods; creating individual schedule information indicating a work execution duration satisfying the constraint condition for the migration of the virtual machine operating on the allocated physical machine and the maintenance work of the allocated physical machine for each of the plurality of physical machine groups, based on the configuration information and the time information; and outputting overall schedule information that integrates the individual schedule information created for each of the plurality of physical machine groups.

8. The scheduling method according to claim 7, wherein the allocating the allocation target physical machine includes allocating the allocation target physical machine to a minimum number of the plurality of physical machine groups that enable each of the plurality of physical machine groups to satisfy the constraint condition in the one or more time periods of the plurality of time periods after the allocation of the plurality of physical machines.

9. The scheduling method according to claim 8, wherein the allocating the allocation target physical machine includes generating a predetermined number of temporary physical machine groups, determining whether or not the constraint condition may be satisfied when the plurality of physical machines are allocated to any of the temporary physical machine groups, increasing the number of temporary physical machine groups when the determining determines that the constraint condition is not satisfied, repeating the determining with the increased number of the temporary physical machine groups, and setting the temporary physical machine group that the determining has determined the constraint condition is satisfied as the plurality of physical machine groups.

10. The scheduling method according to claim 7, wherein the allocating the allocation target physical machine includes allocating the allocation target physical machine to a physical machine group specified according to predetermined criteria from among a plurality of physical machine groups detected that execute migration of the virtual machines operating on the allocated physical machine and maintenance work on the allocated physical machine while satisfying predetermined constraint conditions within the one or more time periods of the plurality of time periods, after allocation of the selected allocation target physical machine.

11. The scheduling method according to claim 7, further comprising:
acquiring an avoidance time slot to avoid migration of an operating virtual machine or an allowable time slot to allow the migration of the operating virtual machine; determining a migration avoidance time slot to avoid migration of the operating virtual machine based on the avoidance time slot or the allowable time slot; and including, in the constraint conditions, a migration time slot constraint that the operating virtual machine is migrated while avoiding the migration avoidance time slot.

12. The computer-readable recording medium according to claim 11, wherein the selecting a plurality of physical machines includes selecting a physical machine having a longer migration avoidance time slot as the allocation target physical machine earlier in a sequence of selecting than a physical machine having a shorter avoidance time slot.

13. A scheduling device comprising: a memory configured to store configuration information related to a plurality of physical machines and a plurality of virtual machines operating on the plurality of physical machines, and time information indicating a migration turnaround time required to migrate each of the plurality of virtual machines to different physical machines and a maintenance turnaround time required for maintenance work on the plurality of physical machines; and a processor configured to perform processing of upon acquisition of a maintenance execution duration for the plurality of physical machines, wherein the processing includes dividing the execution duration into a plurality of time periods, selecting each of the plurality of physical machines as an allocation target physical machine to be allocated to any of a plurality of physical machine groups, allocating the selected allocation target physical machine based on the configuration information and the time information, and then allocating the allocation target physical machine to a physical machine group in which migrating a virtual machine operating on the allocated physical machine and performing maintenance work on the allocated physical machine is to be performed when a predetermined constraint condition is satisfied within one or more time periods of the plurality of time periods, creating individual schedule information indicating a work execution duration satisfying the constraint condition for the migration of the virtual machine operating on the allocated physical machine and the maintenance work of the allocated physical machine for each of the plurality of physical machine groups, based on the configuration information and the time information, and outputting overall schedule information obtained by integrating the individual schedule information created for each of the plurality of physical machine groups.

14. The scheduling device according to claim 13, wherein the allocating the allocation target physical machine includes allocating the allocation target physical machine to a minimum number of the plurality of physical machine groups that enable each of the plurality of physical machine groups to satisfy the constraint condition in the one or more time periods of the plurality of time periods after the allocation of the plurality of physical machines.

15. The scheduling device according to claim 14, wherein the allocating the allocation target physical machine includes generating a predetermined number of temporary physical machine groups, determining whether or not the constraint condition may be satisfied when the plurality of physical machines are allocated to any of the temporary physical machine groups, increasing the number of temporary physical machine groups when the determining determines that the constraint condition is not satisfied, repeating the determining with the increased number of the temporary physical machine groups, and setting the temporary physical machine group that the determining has determined the constraint condition is satisfied as the plurality of physical machine groups.

16. The scheduling device according to claim 13, wherein the allocating the allocation target physical machine includes allocating the allocation target physical machine to a physical machine group specified according to predetermined criteria from among a plurality of physical machine groups detected that execute migration of the virtual machines operating on the allocated physical machine and maintenance work on the allocated physical machine while satisfying predetermined constraint conditions within the one or more time periods of the plurality of time periods, after allocation of the selected allocation target physical machine.

17. The scheduling device according to claim 13, wherein the processing further includes acquiring an avoidance time slot to avoid migration of an operating virtual machine or an allowable time slot to allow the migration of the operating virtual machine; determining a migration avoidance time slot to avoid migration of the operating virtual machine based on the avoidance time slot or the allowable time slot; and including, in the constraint conditions, a migration time slot constraint that the operating virtual machine is migrated while avoiding the migration avoidance time slot.

18. The scheduling device according to claim 17, wherein the selecting a plurality of physical machines includes selecting a physical machine having a longer migration avoidance time slot as the allocation target physical machine earlier in a sequence of selecting than a physical machine having a shorter avoidance time slot.

* * * * *